United States Patent
Tabata et al.

(10) Patent No.: US 8,403,807 B2
(45) Date of Patent: Mar. 26, 2013

(54) CONTROL DEVICE FOR VEHICULAR POWER TRANSMITTING APPARATUS

(75) Inventors: Atsushi Tabata, Okazaki (JP); Tooru Matsubara, Toyota (JP); Hiroyuki Shibata, Toyota (JP); Kenta Kumazaki, Toyota (JP); Yuji Iwase, Mishima (JP); Masakazu Kaifuku, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 679 days.

(21) Appl. No.: 12/450,941

(22) PCT Filed: Mar. 19, 2008

(86) PCT No.: PCT/JP2008/055149
§ 371 (c)(1),
(2), (4) Date: Oct. 19, 2009

(87) PCT Pub. No.: WO2008/132893
PCT Pub. Date: Nov. 6, 2008

(65) Prior Publication Data
US 2010/0125019 A1     May 20, 2010

(30) Foreign Application Priority Data

Apr. 20, 2007    (JP) .................. 2007-112322

(51) Int. Cl.
| | |
|---|---|
| B60K 1/02 | (2006.01) |
| H02P 1/00 | (2006.01) |
| H02P 3/00 | (2006.01) |
| H02P 7/00 | (2006.01) |
| H02P 17/00 | (2006.01) |
| F16H 3/72 | (2006.01) |
| F16H 37/06 | (2006.01) |
| B60W 10/06 | (2006.01) |
| B60W 20/00 | (2006.01) |
| B60W 10/04 | (2006.01) |

(52) U.S. Cl. .................... 477/3; 477/7; 477/15; 477/20; 180/65.28; 180/65.285; 475/4; 475/5

(58) Field of Classification Search .................. 477/3, 7, 477/15, 20; 180/65.1, 65.21, 65.28, 65.285; 475/3–5
See application file for complete search history.

(56) References Cited

U.S. PATENT DOCUMENTS

| | | | |
|---|---|---|---|
| 5,934,395 A | 8/1999 | Koide et al. | |
| 5,982,045 A | 11/1999 | Tabata et al. | |
| 6,018,198 A * | 1/2000 | Tsuzuki et al. | ................. 290/17 |

(Continued)

FOREIGN PATENT DOCUMENTS

| | | |
|---|---|---|
| JP | A-9-170533 | 6/1997 |
| JP | A-9-322308 | 12/1997 |

(Continued)

*Primary Examiner* — Tisha Lewis
(74) *Attorney, Agent, or Firm* — Oliff & Berridge, PLC

(57) ABSTRACT

In a vehicular power transmitting apparatus provided with an electrically-controlled differential portion in which controlling an operating state of an electric motor controls a differential state of a differential mechanism, a control device for starting up a drive force source in an appropriate mode depending on a vehicle condition can be provided. The control device includes drive-force source start control means for switching start modes of an engine depending on a vehicle condition to achieve an appropriate start mode for the engine depending on the vehicle condition, so that for instance a contracted drive range by a second electric motor can be avoided.

20 Claims, 30 Drawing Sheets

U.S. PATENT DOCUMENTS

| | | | |
|---|---|---|---|
| 6,146,302 A | 11/2000 | Kashiwase | |
| 6,383,106 B1 | 5/2002 | Kashiwase | |
| 6,396,165 B1 * | 5/2002 | Nagano et al. | 307/10.6 |
| 6,425,838 B1 | 7/2002 | Matsubara et al. | |
| 6,492,741 B1 * | 12/2002 | Morimoto et al. | 290/40 C |
| 6,722,332 B2 * | 4/2004 | Kojima | 123/179.3 |
| 7,108,630 B2 * | 9/2006 | Ozeki et al. | 477/3 |
| 7,823,668 B2 * | 11/2010 | Ogata et al. | 180/65.265 |
| 7,998,021 B2 * | 8/2011 | Matsubara et al. | 477/3 |
| 2002/0091028 A1 | 7/2002 | Kashiwase | |

FOREIGN PATENT DOCUMENTS

| | | |
|---|---|---|
| JP | A-10-2241 | 1/1998 |
| JP | A-10-136508 | 5/1998 |
| JP | A-11-217025 | 8/1999 |
| JP | A-2001-95103 | 4/2001 |
| JP | A-2001-193612 | 7/2001 |
| JP | A-2002-225578 | 8/2002 |
| JP | A-2004-208417 | 7/2004 |
| JP | A-2004-339943 | 12/2004 |
| JP | A-2005-306238 | 11/2005 |
| JP | A-2006-62569 | 3/2006 |
| JP | A-2006-094617 | 4/2006 |
| JP | A-2006-213149 | 8/2006 |
| JP | B2-3841296 | 8/2006 |
| JP | A-2007-001415 | 1/2007 |

\* cited by examiner

| | C1 | C2 | B1 | B2 | B3 | SPEED RATIO | STEPPING RATIO |
|---|---|---|---|---|---|---|---|
| 1st | O | | | | O | 3.357 | 1.54 |
| 2nd | O | | | O | | 2.180 | 1.53 |
| 3rd | O | | O | | | 1.424 | 1.42 |
| 4th | O | O | | | | 1.000 | SPREAD 3.36 |
| R | | O | | | O | 3.209 | |
| N | | | | | | | |

O ENGAGED

| GEAR POSITION | REVERSE | 1ST-SPEED | 2ND-SPEED | 3RD-SPEED | 4TH-SPEED |
|---|---|---|---|---|---|
| GEAR RATIO | 3.209 | 3.357 | 2.180 | 1.424 | 1.000 |
| ELECTRIC MOTOR TO BE USED | M3 | | | | M1,M2 |

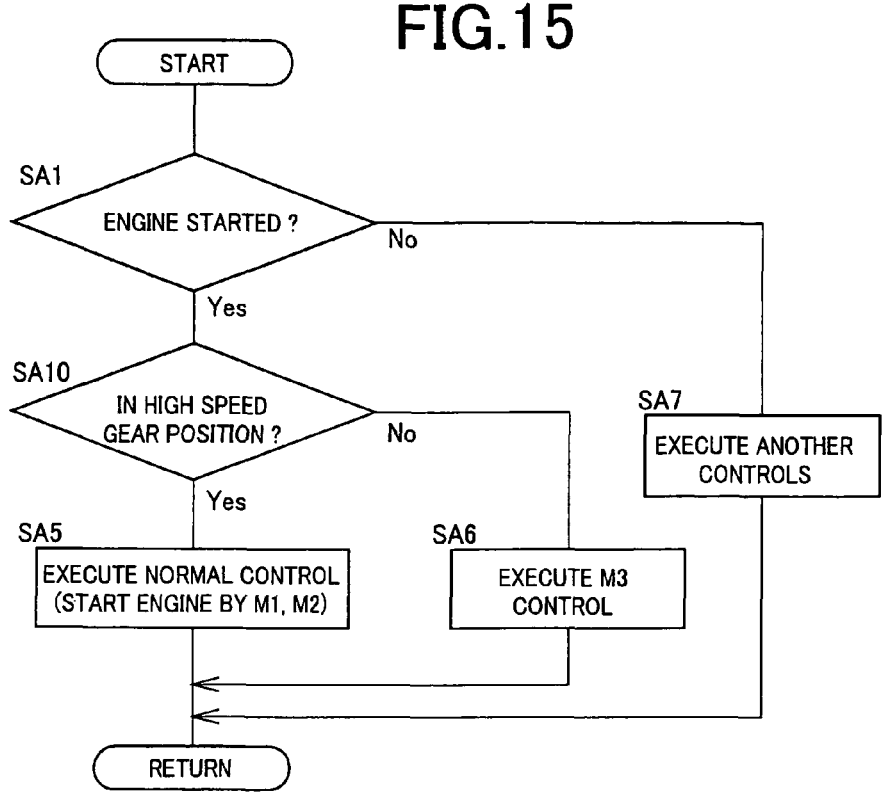
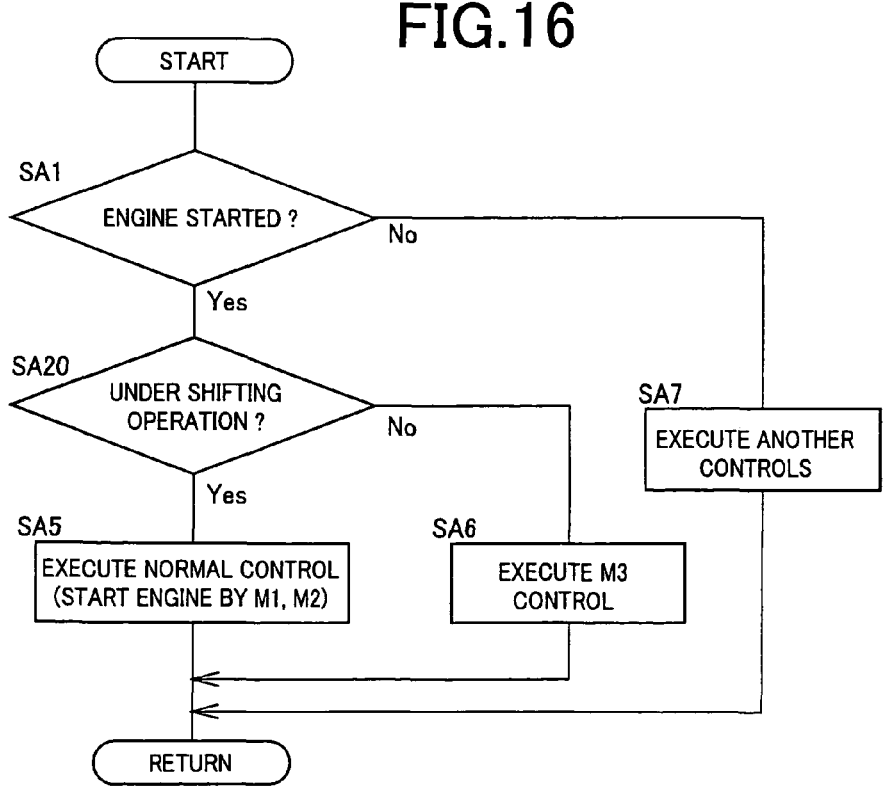

| BATTERY TEMPERATURE | THG<-10°C | -10°C≦THG<120°C | 120°C<THG |
|---|---|---|---|
| ELECTRIC MOTOR TO BE USED | M3 | M1, M2 | M3 |

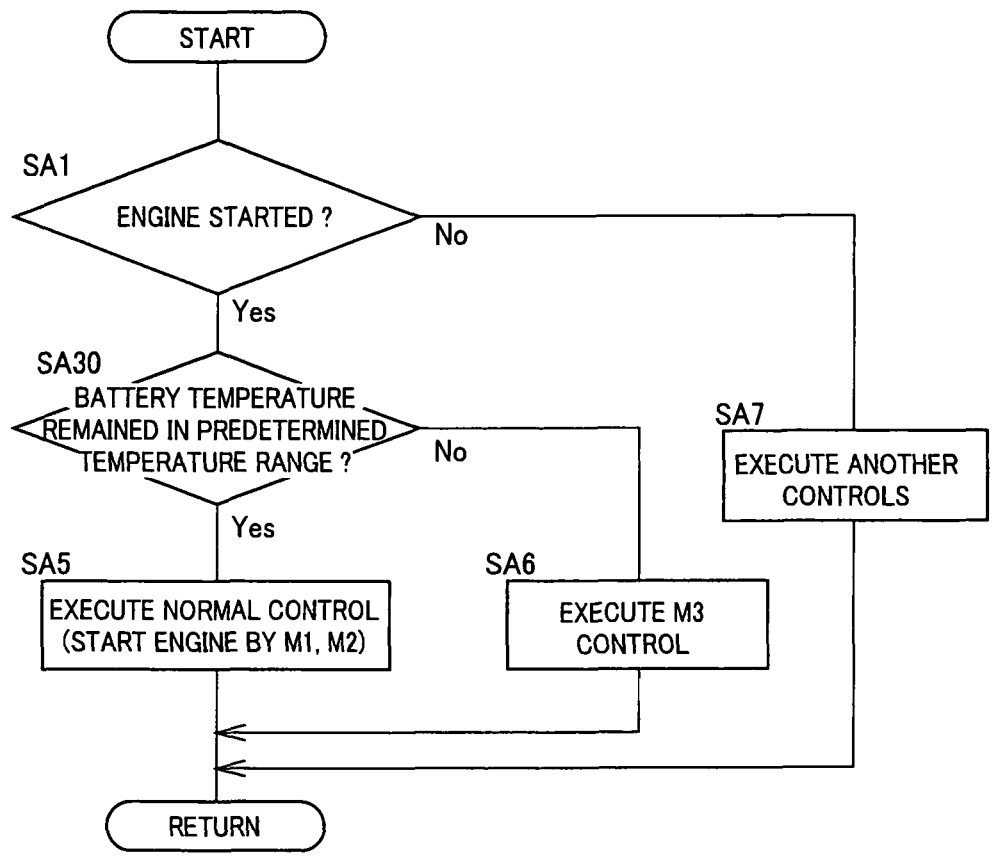

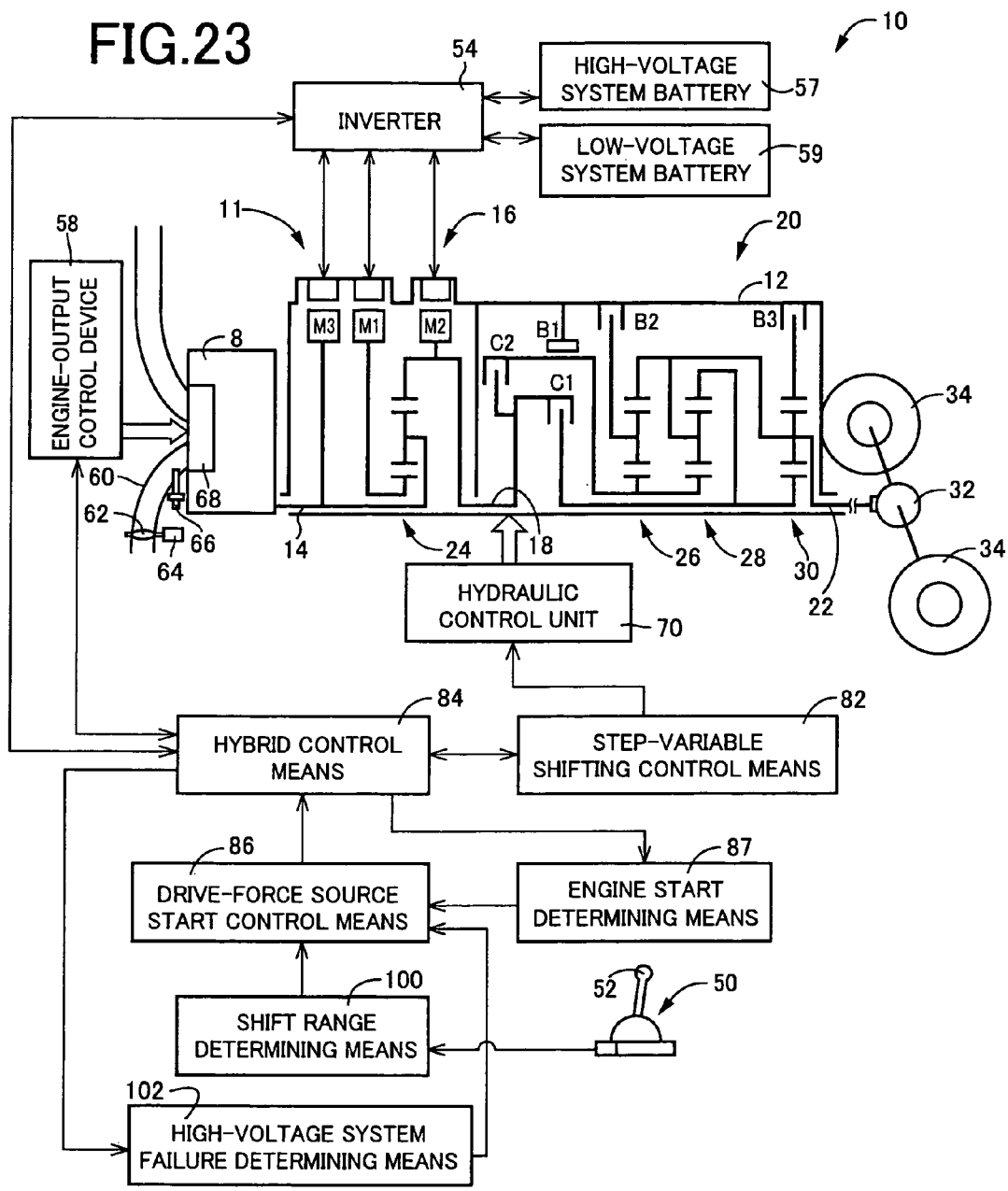

| M1 OR M2 CONDITION (HIGH-VOLTAGE SYSTEM CONDITION) | NORMAL | | FAILURE | |
|---|---|---|---|---|
| M3 CONDITION (LOW-VOLTAGE SYSTEM CONDITION) | NORMAL | FAILURE | NORMAL | FAILURE |
| ELECTRIC MOTOR TO BE USED | M1,M2 | | M3 | ENGINE START IMPOSSIBLE |

| | C0 | C1 | C2 | B0 | B1 | B2 | B3 | SPEED RATIO | STEPPING RATIO |
|---|---|---|---|---|---|---|---|---|---|
| 1st | ◎ | ○ | | | | | ○ | 3.357 | |
| 2nd | ◎ | ○ | | | | ○ | | 2.180 | 1.54 |
| 3rd | ◎ | ○ | | | ○ | | | 1.424 | 1.53 |
| 4th | ◎ | ○ | ○ | | | | | 1.000 | 1.42 |
| 5th | | ○ | ○ | ◎ | | | | 0.705 | 1.42 |
| R | | | ○ | | | | ○ | 3.209 | SPREAD 4.76 |
| N | | | | | | | | | |

○ ENGAGED  ◎ ENGAGED UPON STEP-VARIABLE, DISENGAGED UPON CONTINUOUSLY-VARIABLE

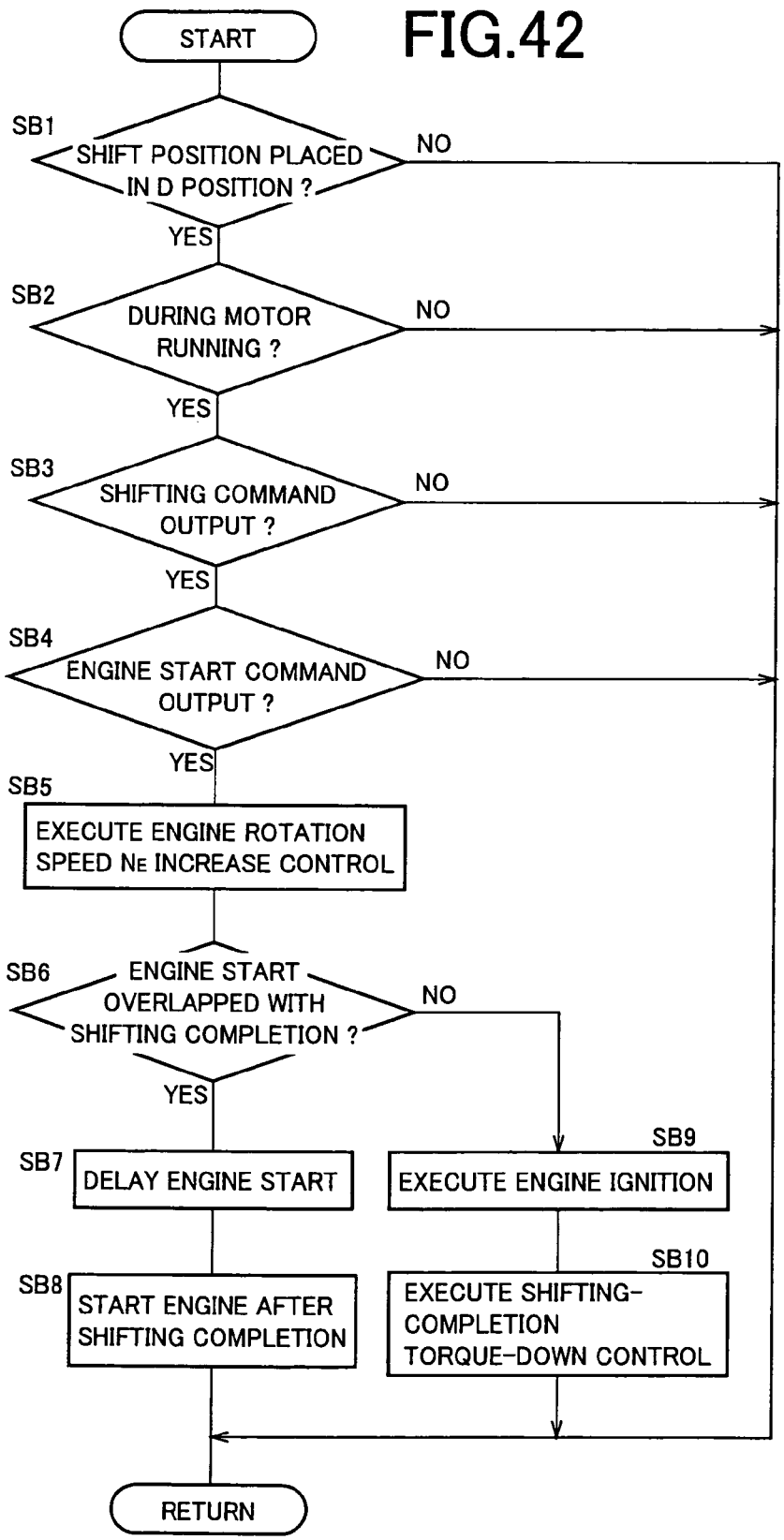

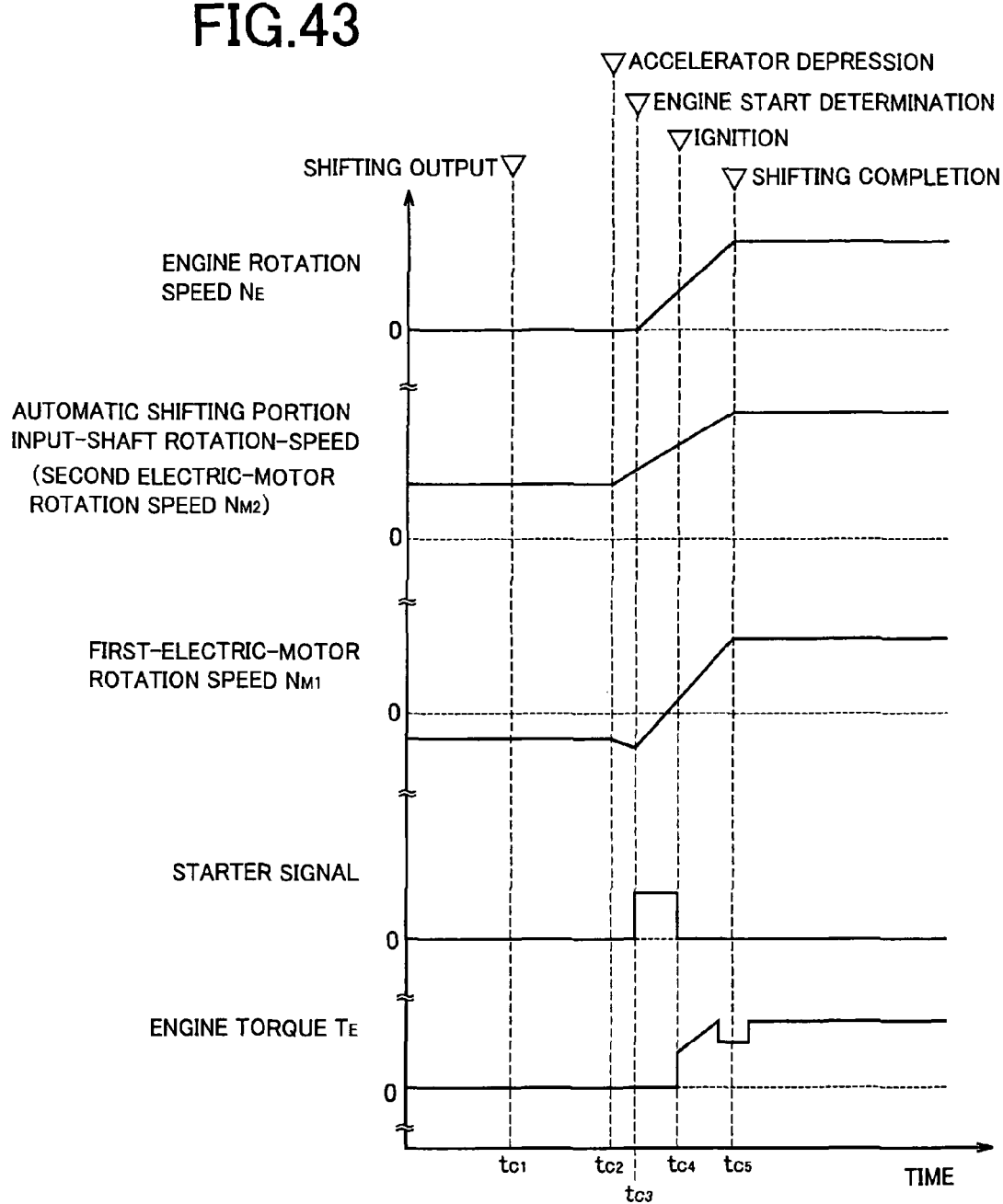

CONTROL DEVICE FOR VEHICULAR POWER TRANSMITTING APPARATUS

TECHNICAL FIELD

The present invention relates to a control device for a vehicular power transmitting apparatus including an electrically controlled differential portion in which controlling an operating state of an electric motor connected to rotary elements of a differential mechanism controls a differential state between a rotation speed of an input shaft connected to a drive-force source, and a rotation speed of an output shaft. More particularly, it relates to a technology of starting a drive-force source of the vehicular power transmitting apparatus.

BACKGROUND ART

There has been known a vehicular power transmitting apparatus including an electrically controlled differential portion in which controlling an operating state of an electric motor connected to rotary elements of a differential mechanism controls a differential state between a rotation speed of an input shaft connected to a drive-force source, and a rotation speed of an output shaft. For instance, a vehicle drive apparatus disclosed in Patent Publication 1 represents one example of such a structure. With such a vehicle drive device, the differential mechanism is comprised of, for instance, a planetary gear unit and performs a differential action. In this case, a major part of drive power delivered from a drive-force source is mechanically transferred to the drive wheels, and remnant drive power of the drive-force source is electrically transferred from a first electric motor to a second electric motor by using an electrical path. This allows the differential state to be electrically controlled, i.e. a shifting ratio of the electrically controlled differential portion is appropriately altered, which allows the vehicle to run with the drive-force source maintained at an optimum rotating state, enabling improvement in fuel consumption.

[Patent Publication 1] Japanese Patent Publication 2006-94617A
[Patent Publication 2] Japanese Patent Publication 2004-208417A
[Patent Publication 3] Japanese Patent No. 3841296
[Patent Publication 4] Japanese Patent Publication 2006-213149A

DISCLOSURE OF THE INVENTION

Subject to be Solved by the Invention

Meanwhile, in a vehicular power transmitting apparatus of a hybrid type disclosed in Patent Publication 1, a drive state using a drive force of a drive-force source and another drive state using a drive force of an electric motor are selectively switched depending on a running state, such as a vehicle speed of a vehicle. During a running of the vehicle at a relatively low speed, for instance, the vehicle is driven with the drive force of the electric motor, and during a running of the vehicle at middle and high speeds, the vehicle is driven with the drive force of the drive-force source. As the vehicle speed of the vehicle shifts from a low vehicle speed to a high vehicle speed, the drive-force source is controllably started or started up even if the vehicle remains in a running condition.

Here, a start method or startup method of the drive-force source is executed by causing the first electric motor to raise a rotation speed of the drive-force source to a rotation speed available to ignite, and by subsequently effectuating complete combustion. Here, if an accelerator pedal is depressed during, for instance, a motor drive mode using the drive force of the electric motor, the drive-force source is started to meet an increase in demanded drive torque. In such a case, there has been a need to begin starting the drive-force source upon taking a drive force, from which torque needed for the second electric motor to drive the drive-force source, as a threshold value.

Therefore, even under a condition where the battery has room in output, the drive-force source is caused to start, thereby contracting a drive region to be achieved with the electric motor. In the conventional start method for the drive force source, thus, not only the electric motor has the contracted drive range but also a problem arises of causing deterioration to occur in startability of the drive-force source and shocks to occur during start of the drive-force source, depending on a running condition of the vehicle.

A hybrid vehicle drive unit disclosed in Patent Publication 4 includes a differential portion, an automatic shifting portion, i.e., transmission portion, and a second electric motor. The differential portion has a differential mechanism including a first rotary element connected to an engine, a second rotary element connected to a first electric motor, and a third rotary element connected to a power transmitting path extending to drive wheels. The automatic shifting portion forms a part of the power transmitting path, and functions as an automatic transmission. The second electric motor included in the differential portion is connected to a third rotary element. When the engine is started, a control device of the hybrid vehicle drive unit drives the first electric motor, considering the rotating speed of the third rotary element, and increases the rotation speed of the engine over a rotation speed at which the engine can be started, using the differential action or operation of the differential mechanism.

According to the controlling apparatus of Patent Publication 4, when the rotation speed of the engine is increased by driving the first electric motor, the differential operation of the differential mechanism is used to start the engine. Therefore, a reaction torque that is a reactive force against the rotational resistance of the engine is required to be predetermined to the third rotary element. In some cases, the rotational resistance of the engine varies greatly depending on the amount or temperature of engine oil, or on individual differences between the engines and the like. In this respect, the drive wheel can give a reaction torque appropriately great enough to correspond to the rotational resistance of the engine to the third rotary element in the completely connected state of a power transmitting path extending from the differential portion to the drive wheel in which the transmitting capacity is not decreased, for example, when the automatic shifting portion is not under shifting.

However, the second electric motor is required to generate a reaction torque, and simultaneously, the first electric motor is required to be controllably driven if the power transmitting path extending from the differential portion to the drive wheel is in a cut-off state or an almost completely cut-off state in which the transmitting capacity of the power transmitting path has decreased, for example, when the automatic shifting portion is under shifting. Therefore, a problem resides that appropriately controlling the engine rotation speed or the rotating speed of the third rotary element which corresponds to the rotating speed of the input shaft of the automatic shifting portion is difficult. Meanwhile, such fact has not been suggested in Patent Publications mentioned above, and is a subject matter newly discovered by the present invention.

The present invention has been completed with the above view in mind and has an object to provide a control device for a vehicular power transmitting apparatus including an electrically controlled differential portion in which controlling an operating state of an electric motor connected to rotary elements of a differential mechanism controls a differential state between a rotation speed of an input shaft connected to a drive-force source, and a rotation speed of an output shaft, for thereby enabling the drive-force source to be started in an appropriate method depending on a vehicle condition.

An another object of the present invention is to provide, in a vehicle including a differential portion whose differential state is controlled by controlling the operating state of an electric motor connected to a power transmitting path extending from an engine to a drive wheel, a control device for a vehicular power transmitting apparatus that easily controls the rotation speed of the engine when the rotation speed of the engine is increased for its start.

Means for Solving the Subject Matter

For achieving the above object, a first aspect of the invention is featured by that (a) in a control device for a vehicular power transmitting apparatus having an electrically controlled differential portion in which controlling an operating state of a first electric motor connected to rotary element of a differential mechanism controls a differential state between a rotation speed of an input shaft connected to a drive force source and a rotation speed of an output shaft, (b) a drive-force source driving electric motor is connected to the drive force source in a power transmissive state; and (c) a drive-force source start control portion, i.e., startup control portion switches start modes, i.e., startup modes of the drive force source depending on a vehicle condition.

A second aspect of the invention is featured by that in the first aspect it further comprises a second electric motor, connected to the drive wheels in a power transmissive state, wherein the drive-force source start control portion is operative to selectively switch the start modes of the drive force source to a drive-force source start mode by the first and second electric motors, or a drive-force source start mode by the drive-force source driving electric motor.

A third aspect of the invention is featured by that in the first or second aspect, the drive-force source start control portion is operative to switch the start modes of the drive force source depending on a rotation speed, torque or power of the first electric motor.

A fourth aspect of the invention is featured by that in the first or second aspect, the drive-force source start control portion is operative to switch the start modes of the drive force source depending on a rotation speed, torque or power of the second electric motor.

A fifth aspect of the invention is featured by that in the first or second aspect, it further comprises a shifting portion that forms a part of a power transmitting path extending from the electrically controlled differential portion to drive wheels, wherein the drive-force source start control portion is operative to switch the start modes of the drive force source depending on a gear ratio of the shifting portion.

A sixth aspect of the invention is featured by that in the first or second aspect, it further comprises a shifting portion that forms a part of a power transmitting path between the electrically controlled differential portion and drive wheels, wherein the drive-force source start control portion is operative to switch the start modes of the drive force source depending on a shifting state of the shifting portion.

A seventh aspect of the invention is featured by that in the first or second aspect, it further comprises a shifting portion that forms a part of a power transmitting path between the electrically controlled differential portion and drive wheels, wherein the drive-force source start control portion is operative to switch the start modes of the drive force source depending on an engaging state of engaging elements of the shifting portion.

A eighth aspect of the invention is featured by that in the first or second aspect, the drive-force source start control portion is operative to switch the start modes of the drive force source depending on a temperature of a battery for supplying electric power to the first and second electric motors.

A ninth aspect of the invention is featured by that in the first or second aspect, the drive-force source start control portion is operative to switch the start modes of the drive force source depending on a power output of a battery for supplying electric power to the first and second electric motors.

A tenth aspect of the invention is featured by that in the first or second aspect, the drive-force source start control portion is operative to switch the start modes of the drive force source depending on a shift range.

A eleventh aspect of the invention is featured by that in the first or second aspect, the drive-force source start control portion is operative to switch the start modes of the drive force source depending on functional degradation in an electric motor control equipment of a high-voltage system.

A twelfth aspect of the invention is featured by that in the first or second aspect, the drive-force source start control portion is operative to switch the start modes of the drive force source depending on a variation amount in a rotation speed of a first electric motor during a start control of the drive-force source.

A thirteenth aspect of the invention is featured by that in the first aspect, (a) the power transmitting apparatus includes a power transmitting/interrupting portion that connects/interrupts a power transmitting path extending from the electrically-controlled differential portion to drive wheels; and (b) the drive-force source start control portion starts the drive force source by using the drive-force source driving electric motor when a transmitting capacity in the power transmitting path extending from the electrically-controlled differential portion to the drive wheels is decreased.

A fourteenth aspect of the invention is featured by that in the thirteenth aspect, (a) the power transmitting apparatus includes a shifting portion that forms a portion of the power transmitting path, (a) a part of which is formed by the power transmitting/interrupting portion.

A fifteenth aspect of the invention is featured by that in the fourteenth aspect, decrease of the transmitting capacity in the power transmitting path extending from the electrically-controlled differential portion to the drive wheel means that the shifting portion is under shifting.

A sixteenth aspect of the invention is featured by that in any of the thirteenth to fifteenth aspects, the electrically-controlled differential portion operates as a continuously-variable transmission by being controlled an operating state of the first electric motor.

A seventeenth aspect of the invention is featured by that in any of the thirteenth to sixteenth aspects, a drive-source force driving electric motor is operatively connected to a crankshaft provided in the drive force source.

A eighteenth aspect of the invention is featured by that in any of the thirteenth to seventeenth aspects, a drive-source force driving electric motor is connected to a crankshaft provided in the drive force source via a gear.

A nineteenth aspect of the invention is featured by that in any of the thirteenth to eighteenth aspects, when the transmitting capacity in the power transmitting path extending from the electrically-controlled differential portion to the drive wheels is not decreased, the drive force source is started by using the first electric motor.

A twentieth aspect of the invention is featured by that in any of the fourteenth to sixteenth aspects, when the shifting portion is under shifting a rotation speed of the drive force source is increased.

A twenty-first aspect of the invention is featured by that in any of the fourteenth to sixteenth aspects, the start of the drive force source is determined based on a shifting progression degree in the shifting portion.

A twenty-second aspect of the invention is featured by that in the twenty-first aspect, the drive force source is started so that a shifting completion of the shifting portion and a start timing of the drive force source are not overlapped.

A twenty-third aspect of the invention is featured by that in the twenty-second aspect, when the shifting completion of the shifting portion and the start timing of the drive force source are overlapped, the drive force source is started after the shifting completion of the shifting portion.

A twenty-fourth aspect of the invention is featured by that in the twenty-first aspect, the drive force source is started when the shifting portion is under shifting.

A twenty-fifth aspect of the invention is featured by that in the thirteenth aspect, the drive force source is started so that an engagement completion of the power transmitting/interrupting portion and the start timing of the drive force source are not overlapped.

A twenty-sixth aspect of the invention is featured by that in the twenty-fifth aspect, when the engagement completion of the power transmitting/interrupting portion and the start timing of the drive force source are overlapped, the drive force source is started after the engagement completion of the power transmitting/interrupting portion.

A twenty-seventh aspect of the invention is featured by that in any of the thirteenth to sixteenth aspects, the power transmitting apparatus includes a second electric motor connected to the power transmitting path extending from the drive force source to the drive wheels.

A twenty-eighth aspect of the invention is featured by that in any of the thirteenth to sixteenth aspects, the power transmitting apparatus includes a second electric motor connected to the electrically-controlled differential portion in a power transmissive state.

Effect of the Invention

According to the control device for the vehicular power transmitting apparatus in the first aspect, there is provided the drive-force source start control portion that switches the start modes of the drive force source depending on the vehicle condition to start the drive-force source in an appropriate method. Thus, avoidance of contraction or reduction in drive region of for instance the electric motor, suppressing a shock during start of the drive force source, and suppressing deterioration in startability of the drive force source, can be realized.

According to the control device for the vehicular power transmitting apparatus in the second aspect, further, the drive-force source start control portion selectively switches the start modes of the drive force source to the drive-force source start mode by the first and second electric motors, or the drive-force source start mode by a third electric motor. This allows an appropriate start method for the drive force source to be executed depending on the vehicle condition.

According to the control device for the vehicular power transmitting apparatus in the third aspect, the drive-force source start control portion switches the start modes of the drive force source depending on the rotation speed, torque and power of the first electric motor, to start the drive force source in an appropriate start method. In starting the drive force source by for instance the first and second electric motors, if the rotation speed of the first electric motor exceeds an allowable rotation speed, then the drive-force source start mode by the third electric motor is executed. In addition, if torque or power available to be generated by the first electric motor is lower than torque and power needed for the first electric motor to perform the drive-force source start mode, then the drive-force source start mode by the third electric motor is executed.

According to the control device for the vehicular power transmitting apparatus in the fourth aspect, the drive-force source start control portion switches the start modes of the drive force source depending on the rotation speed, torque and power of the second electric motor, to execute an appropriate start method for starting the drive force source. In starting the drive force source by for instance the first and second electric motors, if the rotation speed of the second electric motor exceeds an allowable rotation speed, then the drive-force source start mode by the third electric motor is executed. In addition, if torque or power, available to be generated by the second electric motor, is lower than torque and power needed for the second electric motor to perform the drive-force source start mode, then the drive-force source start mode by the third electric motor is executed.

According to the control device for the vehicular power transmitting apparatus in the fifth aspect, the drive-force source start control portion switches the start modes of the drive force source depending on the gear ratio of the shifting portion, to execute an appropriate start method for the drive force source depending on the gear ratio. If the drive force source is started by the first and second electric motors when the shifting portion has a large gear ratio, an increased fluctuation in torque of the second electric motor is delivered to the drive wheels to resultantly increase the shock. In such a case, starting the drive force source by the third electric motor results in a reduction in shock.

According to the control device for the vehicular power transmitting apparatus in the sixth aspect, the drive-force source start control portion switches the start modes of the drive force source depending on the shifting state of the shifting portion, to execute an appropriate start method for the drive force source depending on the shifting state. During the shifting of the shifting portion, deterioration easily occurs on controllability of the second electric motor connected to the output shaft of the differential mechanism, so that starting the drive force source by the first and second electric motors may cause deterioration in startability. In such a case, starting the drive force source by the third electric motor suppresses the occurrence of deterioration in startability.

According to the control device for the vehicular power transmitting apparatus in the seventh aspect, the drive-force source start control portion switches the start modes of the drive force source depending on the engaging state of the engaging elements of the shifting portion, to execute an appropriate start method for starting the drive force source. If the engaging elements of the shifting portion remains under for instance a disengaged state, starting the drive force source by the first and second electric motors may cause deterioration in startability. In such a case, starting the drive force source by the third electric motor suppresses the occurrence of deterioration in startability.

According to the control device for the vehicular power transmitting apparatus in the eighth aspect, the drive-force source start control portion switches the start modes of the drive force source depending on the temperature of the battery for supplying electric power to the first and second electric motors, to execute an appropriate start method for starting the drive force source. If the temperature of the battery stands out of a predetermined temperature range, there are limitations for discharging amount and charging amount of a high-voltage battery. In such a moment, switching the start modes of the drive force source to a mode by the third electric motor available to be supplied with electric power from a low-voltage battery can start the drive force source. Thus, the first and second electric motors are applied with electric power from the high-voltage battery and the third electric motor is applied with electric power from the low-voltage battery.

According to the control device for the vehicular power transmitting apparatus in the ninth aspect, the drive-force source start control portion switches the start modes of the drive force source depending on the power output of the battery for supplying electric power to the first and second electric motors, to execute an appropriate start method for starting the drive force source. Under circumstances where no electric power is supplied from the high-voltage battery or electric power is limited, switching the start modes of the drive force source to a mode by the third electric motor available to be supplied with electric power from the low-voltage battery can start the drive force source.

According to the control device for the vehicular power transmitting apparatus in the tenth aspect, the drive-force source start control portion switches the start modes of the drive force source depending on the shift range, to execute an appropriate start method for starting the drive force source. If the shift range remains in, for instance, a neutral range, the first and second electric motors may rotate in a high-speed rotation during start of the drive force source. In such a moment, switching the start modes of the drive force source to a mode by the third electric motor can start the drive force source without causing the first and second electric motors to reach high-speed rotation.

According to the control device for the vehicular power transmitting apparatus in the eleventh aspect, the drive-force source start control portion switches the start modes of the drive force source depending on functional degradation in the electric motor control equipment of the high-voltage system, to execute an appropriate start method for starting the drive force source. Under a circumstance where, for instance, functional degradation is detected in the electric motor control equipment of the high-voltage system, switching the start modes of the drive force source to a mode by the third electric motor can start the drive force source.

According to the control device for the vehicular power transmitting apparatus in the twelfth aspect, the drive-force source start control portion switches the start modes of the drive force source depending on the variation amount in the rotation speed of the first electric motor during the start control of the drive-force source, to execute an appropriate start method for starting the drive force source. When it is predicted that for instance starting the drive force source by the first and second electric motors may increase the variation amount in the rotation speed of the first electric motor, the start modes of the drive force source is switched to a mode by the third electric motor to start the drive force source.

Here, the differential mechanism preferably includes the planetary gear unit wherein the sun gear is connected to the first electric motor, with the ring gear being connected to the second electric motor and the carrier being connected to the drive force source and the third electric motor. With such a configuration, the rotation speed of the drive force source can be directly raised by the third electric motor, except it is raised by the first and second electric motors. This enables the start modes of the drive force source to be selectively switched to a start mode for the drive force source by the first and second electric motors, or another start mode for the drive force source by the third electric motor.

According to the thirteenth aspect of the present invention, (a) the vehicular power transmitting apparatus includes the power transmitting/interrupting portion that connects/interrupts the power transmitting path extending from the electrically-controlled differential portion to drive wheels; and (b) the drive-force source start control portion starts the drive force source by using the drive force source electric motor when a transmitting capacity in the power transmitting path extending from the electrically-controlled differential portion to the drive wheels is decreased. Accordingly, when the transmitting capacity of the power transmitting path extending from the electrically-controlled differential portion to the drive wheels decreases, the engine is started by using the engine-driving electric motor connected to the engine in the power transmissive state. Therefore, when the engine rotation speed is increased to start the engine, there is no need to control the operating state of the first electric motor to control the differential state of the differential mechanism, so that the rotation speed control to increase the engine rotation speed can be easily performed.

According to the fourteenth aspect of the present invention, the power transmitting apparatus includes the shifting portion, i.e., transmission portion that forms a portion of the power transmitting path, a part of which is formed by the power transmitting/interrupting portion. Therefore, the variation width of the transmission gear ratio of the power transmitting apparatus can be increased by shifting the shifting portion.

According to the fifteenth aspect of the present invention, decrease of the transmitting capacity of the power transmitting path extending from the electrically-controlled differential portion to the drive wheels occurs when the shifting portion is under shifting. Therefore, when the engine rotation speed is increased to start the engine during the shifting, there is no need to control the operating state of the first electric motor and to control the differential state of the differential mechanism, so that the rotation speed control to increase the engine rotation speed can be easily performed.

According to the sixteenth aspect of the present invention, the electrically-controlled differential portion operates as the continuously-variable transmission by being controlled an operating state of the first electric motor. Therefore, the driving torque output from the electrically-controlled differential portion can be smoothly changed. Besides the electrically-controlled differential portion is allowed to function as an electric continuously-variable transmission by continuously changing the transmission gear ratio, and it can be allowed to function as a step-variable transmission by changing the transmission gear ratio step by step, i.e., stepwise.

According to the seventeenth aspect of the present invention, the engine driving electric motor is connected to the crankshaft provided in the engine via a belt. Therefore, when the engine rotation speed is increased to start the engine, the crankshaft is rotated and driven by the engine driving electric motor. Thus, there is no need to control the operating state of the first electric motor to control the differential state of the differential mechanism, so that the rotation speed control to increase the engine rotation speed can be easily performed.

According to the eighteenth aspect of the present invention, the engine driving electric motor is connected to the crankshaft of the engine with a gear provided. Therefore, when the engine rotation speed is increased to start the engine, the crankshaft is rotated and driven by the engine driving electric motor. Thus, there is no need to control the operating state of the first electric motor to control the differential state of the differential mechanism, so that the rotation speed control to increase the engine rotation speed can be easily performed.

According to the nineteenth aspect of the present invention, when the transmitting capacity of the power transmitting path extending from the electrically-controlled differential portion to the drive wheels is not decreased, the engine is started by using the first electric motor. Therefore, the power consumption upon starting the engine can be suppressed using the torque transmitted from the drive wheels and the differential action of the differential mechanism.

According to the twentieth aspect of the present invention, the rotation speed of the engine is increased when the shifting portion is under shifting. Therefore, the engine can be more quickly started upon a request to start the engine, than in a case in which the engine rotation speed is increased after a request to start the engine. Additionally, there is a case in which the engine can be started prior to the shifting completion of the shifting portion, so that a vehicle driver does not feel a delay in the rise of the driving torque.

According to the twenty-first aspect of the present invention, whether to start the engine is determined based on a progression degree of the shifting in the shifting portion. Therefore, the engine can be started so that the shifting shock occurred upon the shifting completion of the shifting portion and the shock upon the engine start are not overlapped.

According to the twenty-second aspect of the present invention, the engine is started so that the shifting completion of the shifting portion and the start timing of the engine are not overlapped. Therefore, the shifting shock occurred upon shifting completion of the shifting portion and the shock occurred upon the engine start are not overlapped, so that the vehicle occupants does not feel these shocks greatly.

According to the twenty-third aspect of the present invention, if the shifting completion of the shifting portion and the start timing of the engine are overlapped, the engine is started after the shifting completion of the shifting portion. Therefore, the shifting shock occurred upon shifting completion of the shifting portion and the shock occurred upon the engine start are not overlapped, so that the vehicle occupants does not feel these shocks greatly.

According to the twenty-fourth aspect of the present invention, the engine is started when the shifting portion is under shifting. Therefore, the shifting shock occurred upon shifting completion of the shifting portion and the shock occurred upon the engine start are not overlapped, so that the vehicle occupants does not feel these shocks greatly. Additionally, the engine torque can be risen more quickly than in a case in which the engine is started after the gear shifting completion, so that a response to, for example, the accelerator operation of a vehicle driver can be increased.

According to the twenty-fifth aspect of the present invention, the engine is started so that the engagement completion of the power transmitting/interrupting portion and the start timing of the engine are not overlapped. Therefore, the engagement shock occurred upon the engagement completion of the power transmitting/interrupting portion and the start shock occurred upon the engine start are not overlapped with each other, so that the vehicle occupant does not feel these shocks greatly.

According to the twenty-sixth aspect of the present invention, if the engagement completion of the power transmitting/interrupting portion and the start time of the engine are overlapped, the engine is started after the engagement completion of the power transmitting/interrupting portion. Therefore, the engagement shock occurred upon the engagement completion of the power transmitting/interrupting portion and the start shock occurred upon the engine start are not overlapped with each other, so that the vehicle occupant does not feel these shocks greatly.

According to the twenty-seventh aspect of the present invention, the vehicular power transmitting apparatus includes the second electric motor connected to the power transmitting path extending from the engine to the drive wheels. Therefore, the driving torque can be generated at the engine as well as at the second electric motor, so that a response to, for example, the accelerator operation of a vehicle driver can be increased. Additionally, the vehicle can be driven by the power transmitted from the second electric motor with stopping the engine, so that the fuel efficiency can be improved.

According to the twenty-eighth aspect of the present invention, the vehicular power transmitting apparatus includes the second electric motor connected to the electrically-controlled differential portion in the power transmissive state. Therefore, sum of the torque output from the second electric motor and the torque output from the electrically-controlled differential portion can be output to the drive wheels. Therefore, a response to, for example, the accelerator operation of the vehicle driver can be increased.

Preferably, the differential mechanism includes a differential limiting apparatus capable of limiting the differential action of the differential mechanism so as to transmit rotations from the drive wheels to the engine. With this structure, when the engine is started, upon the transmitting capacity of the power transmitting path extending from the electrically-controlled differential portion to the drive wheel being not decreased, the rotation speed of the engine can be increased by using the rotations from the drive wheels without driving the first electric motor. Thus, the power consumption of the first electric motor can be suppressed.

Preferably, the differential limiting apparatus can limit the differential action of the differential mechanism so that the rotations of the drive wheels can be transmitted to the engine with being decelerated. With this structure, the rotations transmitted from the drive wheels can be decelerated, if the rotation speed can exceed an rotation speed to allow the engine to start even if the rotations from the drive wheels upon the engine start is decelerated. Therefore, the durability of the differential mechanism can be improved.

BRIEF DESCRIPTION OF THE DRAWINGS

FIG. 15 is a flowchart illustrating a major control operation to be executed with an electronic control device of the present invention, i.e., control operation to switch engine startup modes depending on a condition of a vehicle.

FIG. 16 is a flowchart illustrating a major control operation to be executed with an electronic control device of the present invention, i.e., a control operation to switch engine startup modes depending on a condition of a vehicle.

FIG. 20 is another flowchart illustrating a major control operation to be executed with an electronic control device of the present invention, i.e., a control operation to switch engine startup modes depending on a condition of a vehicle.

FIG. 21 is a view representing the relationship between electric motors to be used for starting up the engine and output power of a battery.

FIG. 23 is a functional block diagram illustrating a major control operation to be executed by the electronic control device in another embodiment of the present invention.

FIG. 24 is a view representing the relationship between electric motors to be used for starting up the engine and shifting ranges.

FIG. 42 is a flow chart illustrating a major control operation of the electronic control device of FIG. 4, i.e., the control operation performed to avoid overlapping between the gear shifting completion and the engine start, which differs from the flow chart according to an embodiment of FIG. 37.

FIG. 43 is a time chart for explaining the control operation illustrated by the flow chart of FIG. 42, showing one example in which the gear position is shifted down from a 3rd-gear position to a 1st-gear position during motor running, and an engine start is not delayed, which corresponds to the time chart of FIG. 39.

EXPLANATION OF REFERENCES

8: engine (drive force source)
10, 109: shifting mechanism (vehicular power transmitting apparatus)
11,110: differential portion (electrically-controlled differential portion)
14: input shaft
16: power distributing mechanism (differential mechanism)
18: power transmitting member (output shaft of differential mechanism)
20: automatic shifting portion (shifting portion)
34: drive wheels
36: crank shaft
57: high voltage system battery device (battery device)
80: electronic control unit (vehicle engine start controlling unit)
86: drive force source startup controlling means
210: shifting mechanism (power transmitting apparatus)
211: differential portion (electrically-controlled differential portion)
M1: first electric motor
M2: second electric motor
M3: third electric motor (drive force source driving electric motor)
C1: first clutch (power transmitting/interrupting means)
C2: second clutch (power transmitting/interrupting means)
B1: first brake (power transmitting/interrupting means)
B2: second brake (power transmitting/interrupting means)
B3: third brake (power transmitting/interrupting means)

DETAILED DESCRIPTION OF THE PREFERRED EMBODIMENTS

Now, various embodiments according to the present invention will be described below in detail with reference to the accompanying drawings.

Embodiment 1

Figures 1, 2:
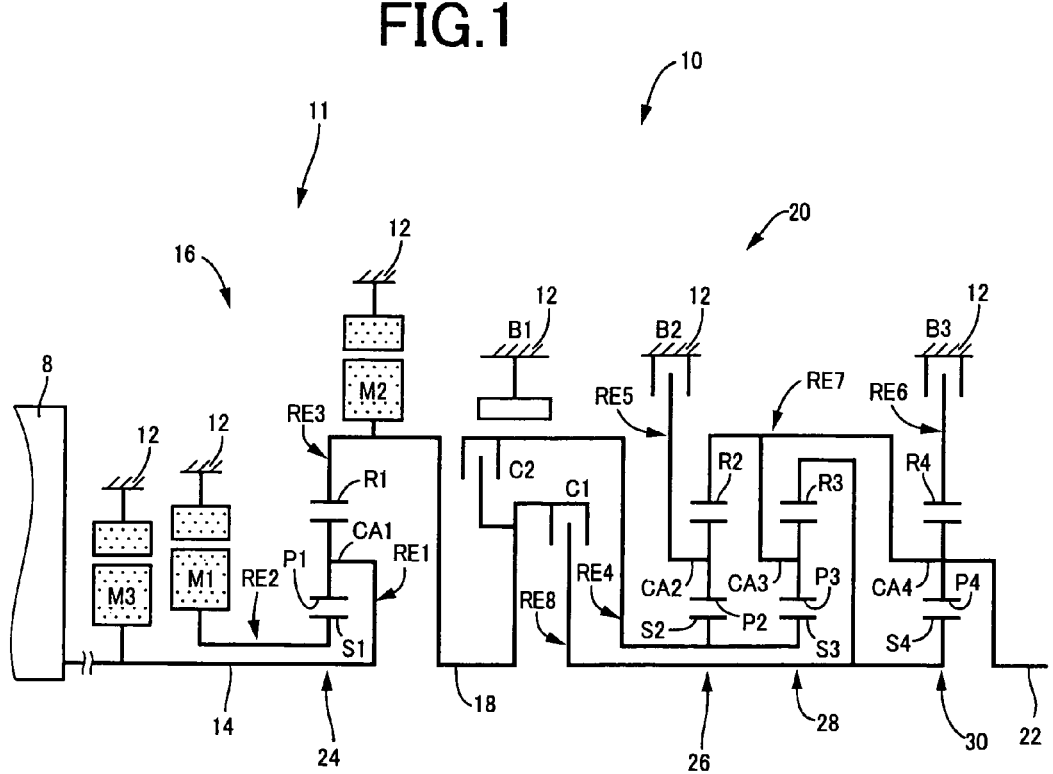
FIG. 1 is a skeleton diagram showing structure of a drive apparatus for a hybrid vehicle which is one embodiment according to the present invention.
FIG. 2 is an operational diagram illustrating combination of hydraulically operated frictional coupling devices for use for shifting operation in the vehicular drive apparatus shown in FIG. 1.

FIG. 1 is a skeleton diagram for illustrating a transmission mechanism i.e., shifting mechanism 10 constituting a part of a drive apparatus, i.e., drive system for a hybrid vehicle to which the present invention is applied. As shown in FIG. 1, the transmission mechanism 10 includes a transmission case 12 (hereinafter referred to as "a case 12") mounted on a vehicle body as a non-rotary member, an input shaft 14 disposed inside the case 12 as an input rotary member, a differential portion 11 coaxially connected to the input shaft 14 either directly, or indirectly via a pulsation absorbing damper (vibration damping device), not shown, and serving as a continuously variable transmission portion, an automatic shifting portion, i.e., automatic shifting portion 20 connected in series in a power transmitting path between the differential portion 11 and drive wheels 34 (see FIG. 7) through a power transmitting member 18 (power transmitting shaft), and an output shaft 22 connected to the automatic shifting portion 20 and serving as an output rotary member.

The transmission mechanism 10 is suitably applied to an FR (front-engine and reverse-drive) type vehicle and mounted on a vehicle along a fore and aft direction thereof. The transmission mechanism 10 is disposed between an engine 8 and a pair of drive wheels 34. The engine 8 includes an internal combustion engine such as a gasoline engine or a diesel engine or the like and serves as a drive-power source. The engine 8 is directly connected to the input shaft 12 in series or indirectly through the pulsation absorbing damper (vibration damping device), not shown. This allows a vehicle drive force to be transferred from the engine 8 to the pair of drive wheels 34 in sequence through a differential gear device 32 (final speed reduction gear) (see FIG. 7) and a pair of drive axles. The engine 8, the shifting mechanism 10, the differential portion 11, and the power transmitting member 18 of this embodiment respectively correspond to a claimed drive force source, power transmitting apparatus, electrically-controlled differential portion and output shaft of the differential mechanism.

In the transmission mechanism 10 of the illustrated embodiment, the engine 8 and the differential portion 11 are directly connected to each other. As used herein, the term "directly connected" or "direct connection" refers to a structure under which a direct connection is established between the associated component parts in the absence of a fluid-operated power transmitting apparatus, such as a torque converter or a fluid coupling device or the like, and a connection including, for instance, the pulsation absorbing damper is involved in such a direction connection. It is noted that since the transmission mechanism 10 has symmetrical structure with respect to its axis, a lower half thereof is omitted in FIG. 1. This is also true for the other embodiments of the invention described below.

The differential portion 11 includes a first electric motor M1, a power distributing mechanism 16, structured in a mechanical mechanism for mechanically distributing an output of the engine 8 applied to the input shaft 14, which functions as a differential mechanism which distributes the engine output to the first electric motor M1 and the power transmitting member 18, and a second electric motor M2 operatively connected to the power transmitting member 18 to be unitarily rotate therewith. Further, a third electric motor M3 is connected to be unitarily rotated with the input shaft 14, i.e., a crankshaft 36 of the engine 8. In the illustrated embodiment, all of the first, second and third electric motors M1, M2 and M3 are so-called motor/generators each having a function to generate electric power. The first electric motor M1 has at least a function as an electric power generator for generating a reaction force. The second electric motor M2 has at least a function as a motor (electric motor) serving as a running drive power source to output a vehicle drive, force. The third electric motor M3 functions as the engine driving electric motor, i.e., the drive force source electric motor.

The power distributing mechanism 16 functioning as the differential mechanism includes, as a major component, a first planetary gear set 24 of a single pinion type having a gear ratio ρ1 of about 0.418, for example. The first planetary gear set 24 has rotary elements (elements) composed of a first sun gear S1, a first planetary gear P1, a first carrier CA1 supporting the first planetary gear P1 such that the first planetary gear P1 is rotatable about its axis and about the axis of the first sun gear S1, and a first ring gear R1 meshing with the first sun gear S1 through the first planetary gear P1. Where the numbers of teeth of the first sun gear S1 and the first ring gear R1 are represented by ZS1 and ZR1, respectively, the above gear ratio ρ1 is represented by ZS1/ZR1.

In the power distributing mechanism 16, a first carrier CA1 is connected to the input shaft 14, i.e., the engine 8 and the third electric motor M3; a first sun gear S1 is connected to the first electric motor M1; and a first ring gear R1 is connected to the power transmitting member 18. With the power distributing mechanism 16 of such a structure, the three elements of the first planetary gear set 24, i.e., the first sun gear S1, the first carrier CA1 and the first ring gear R1 are arranged to rotate relative to each other for initiating a differential action, i.e., in a differential state under which the differential action is initiated. This allows the engine output to be distributed to the first electric motor M1 and the power transmitting mechanism 18. Then, a part of the distributed engine output drives the first electric motor. M1 to generate electric energy, which is stored and used for rotatably driving the second electric motor M2. Thus, the differential portion 11 (power distributing mechanism 16) is caused to function as an electric differential device such that, for instance, the differential portion 11 is placed in a so-called continuously variable shifting state (electrically established CVT state) to continuously vary the rotation of the power transmitting member 18, regardless of the engine 8 operating at a predetermined rotation speed.

That is, the differential portion 11 functions as an electrically controlled continuously variable transmission to provide a speed ratio γ0 (rotation speed $N_{IN}$ of the input shaft 14/rotation speed $N_{18}$ of the power transmitting member 18) that is continuously variable from a minimum value γ0min to a maximum value γ0max. In this way, the driving state of the first electric motor M1, second electric motor M2 and engine 8 connected to the power distributing mechanism 16 (the differential portion 11) are controlled, so that the power distributing mechanism 16 (the differential portion 11) is operated as the continuously variable shifting mechanism in which the differential state between the rotation speed of the input shaft 14 and that of the power transmitting member 18 is controlled.

An automatic shifting portion 20 functioning as the shifting portion is a step variable transmission constituting a part of the power transmitting path between the differential portion 11 and the drive wheels 34. The automatic shifting portion 20 includes a single-pinion type second planetary gear set 26, a single-pinion type third planetary gear set 28 and a single-pinion type fourth planetary gear set 30. The automatic shifting portion 20 is a planetary gear type multiple-step transmission operable as a step-variable automatic transmission. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a predetermined gear ratio ρ2 of about "0.562". The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a predetermined gear ratio ρ3 of about "0.425".

The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a predetermined gear ratio ρ4 of, for instance, about "0.421". With the second sun gear S2, second ring gear R2, third sun gear S3, third ring gear R3, fourth sun gear S4 and fourth ring gear R4 having the numbers of gear teeth represented by ZS2, ZR2, ZS3, ZR3, ZS4 and ZR4, respectively, the gear ratios ρ2, ρ3 and ρ4 are expressed by ZS2/ZR2, ZS3/ZR3, and ZS4/ZR4, respectively.

In the automatic shifting portion 20, the second and third sun gears S2, S3 are integrally connected to each other, selectively connected to the power transmitting member 18 through a second clutch C2, and selectively connected to the casing 12 through a first brake B1. The second carrier CA2 is selectively connected to the casing 12 through a second brake B2, and the fourth ring gear R4 is selectively connected to the casing 12 through a third brake B3. The second ring gear R2, third carrier CA3 and fourth carrier CA4 are integrally connected to each other and connected to the output shaft 22. The third ring gear R3 and the fourth sun gear S4 are integrally connected to each other and selectively connected to the power transmitting member 18 through a first clutch C1.

Thus, the automatic shifting portion 20 and the differential portion 11 (power transmitting member 18) are selectively connected to each other through the first clutch C1 or the second clutch C2, which is used to establish the shift gear position in the automatic shifting portion 20. In other words, the first and second clutches C1 and C2 function as coupling devices i.e., engaging device operable to place the power transmitting path between the power transmitting member 18 and the automatic shifting portion 20, that is, the power transmitting path between the differential portion 11 (power transmitting member 18) and the drive wheels 34, selectively in one of a power transmissive state in which the vehicle drive force can be transmitted through the power transmitting path, and the power cut-off state in which the vehicle drive force cannot be transmitted through the power transmitting path. That is, with at least one of the first and second clutches C1 and C2 brought into coupling engagement, the power transmitting path is placed in the power transmissive state. In contrast, uncoupling both the first and second clutches C1 and C2 places the power transmitting path in the power cut-off state.

In the automatic shifting portion 20, further, uncoupling an uncoupling side coupling device while coupling an coupling side coupling device allows a so-called "clutch-to-clutch" shifting action to be executed for respective gear positions (shift gear position) to be selectively established. This allows a speed ratio γ (rotation speed $N_{18}$ of the power transmitting member 18/rotation speed $N_{OUT}$ of the output shaft 22) to be obtained in equally varying ratio for each gear position. As indicated in the coupling operation table shown in FIG. 2, coupling the first clutch C1 and third brake B3 establishes 1st-speed gear position having a speed ratio γ1 of approximately, for instance, "3.357". With the first clutch C1 and second brake B2 coupled in operation, a 2nd-speed gear position is established with a speed ratio γ2 of, for instance, approximately "2.180", which is lower a value of the speed ratio γ1.

With the first clutch C1 and first brake B1 coupled in operation, a 3rd-speed gear position is established with a speed ratio γ3 of, for instance, approximately "1.424", which is lower a value of the speed ratio γ2. Coupling the first clutch C1 and second clutch C2 establishes a 4th-speed gear position with a speed γ4 of, for instance, approximately "1.000", which is lower than the speed ratio γ3. Coupling the second clutch C2 and third brake B3 establishes a reverse-drive gear position (reverse-drive shift position) with a speed ratio γR of, for instance, approximately 3.209, which is intermediate between those of the 1st-speed gear position and the 2nd-speed gear position. In addition, uncoupling i.e., disengaging or releasing the first clutch C1, second clutch C2, first brake B1, second brake B2 and third brake B3 allows a neutral position N to be established.

The first clutch C1, second clutch C2, first brake B1, second brake B2 and third brake B3 (hereinafter collectively referred to as clutch C, brake B, unless otherwise specified) are hydraulically operated frictional coupling devices that are used in the conventional vehicular automatic transmission. Each of these frictional coupling devices may include a wet-type multiple-disc clutch, having a plurality of mutually overlapping friction plates adapted to be pressurized against each other by a hydraulic actuator, or a band brake including a rotary drum having an outer circumferential surface on which one band or two bands are wound with terminal ends being adapted to be tightened by a hydraulic actuator. Thus, the frictional coupling device serves to selectively provide a drive connection between two component parts between which each clutch or brake is interposed.

In the transmission mechanism 10 of such a structure, the differential portion 11 serving as the continuously variable transmission, and the automatic shifting portion 20 constitute a continuously variable transmission. Further, with the differential portion 11 controlled so as to provide a speed ratio kept at a fixed level, the differential portion 11 and the automatic shifting portion 20 can provide the same state as that of a step-variable transmission.

More particularly, the differential portion 11 functions as the continuously variable transmission, and the automatic shifting portion 20 connected to the differential portion 11 in series, functions as the step-variable transmission. Thus, the rotation speed, input to the automatic shifting portion 20 placed for at least one gear position M, (hereinafter referred to as "input rotation speed of the automatic shifting portion 20"), i.e., the rotation speed of the power transmitting member 18 (hereinafter referred to as "transmitting-member rotation speed $N_{18}$") are caused to continuously vary, thereby enabling the gear position M to have a continuously variable speed width or range. Accordingly, the transmission mechanism 10 provides an overall or total speed ratio γT (rotation speed $N_{IN}$ of the input shaft 14/rotation speed $N_{OUT}$ of the output shaft 22) in a continuously variable width or range. Thus, the continuously variable transmission is established in the transmission mechanism 10. The total or overall speed ratio γT of the transmission mechanism 10 is the total speed ratio γT of a whole of the automatic shifting portion 20 that is established based on the speed ratio γ0 of the differential portion 11 and the speed ratio γ of the automatic shifting portion 20.

For the respective gear positions such as, for instance, the 1st-speed to 4th-speed gear positions of the automatic shifting portion 20 and the reverse-drive gear position as indicated in the coupling operation table shown in FIG. 2, the transmitting-member rotation speed $N_{18}$ is continuously varied with each gear position being obtained in a continuously variable speed width. Accordingly, a continuously variable speed ratio is present between adjacent gear positions, enabling the whole of the transmission mechanism 10 to have the total speed ratio γT in a continuously variable range.

Further, the speed ratio γ0 of the differential portion 11 is controlled so as to lay at a fixed level and the clutch C and brake B are selectively coupled, thereby causing either one of the 1st-speed to 4th-speed gear positions or the reverse-drive gear position (reverse-drive shift position) to be selectively established. This allows the overall speed ratio γT, variable in a nearly equal ratio, of the transmission mechanism 10 to be obtained for each gear position. Thus, the transmission mechanism 10 can be established in the same state as that of the step-variable transmission.

If, for instance, the differential portion 11 is controlled so as to provide the speed ratio γ0 at a fixed value of "1", the transmission mechanism 10 provides the total speed ratio γT for each gear position of the 1st-speed to 4th-speed gear positions and the reverse-drive gear position of the automatic shifting portion 20 as indicated by the coupling operation table shown in FIG. 2. Further, if the automatic shifting portion 20 is controlled under the 4th-speed gear position so as to cause the differential portion 11 to have the speed ratio γ0 of approximately, for instance, "0.7" less than a value of "1", the automatic shifting portion 20 has the total speed ratio γT of approximately, for instance, "0.7" that is less than a value of the 4th-speed gear position.

Figure 3:
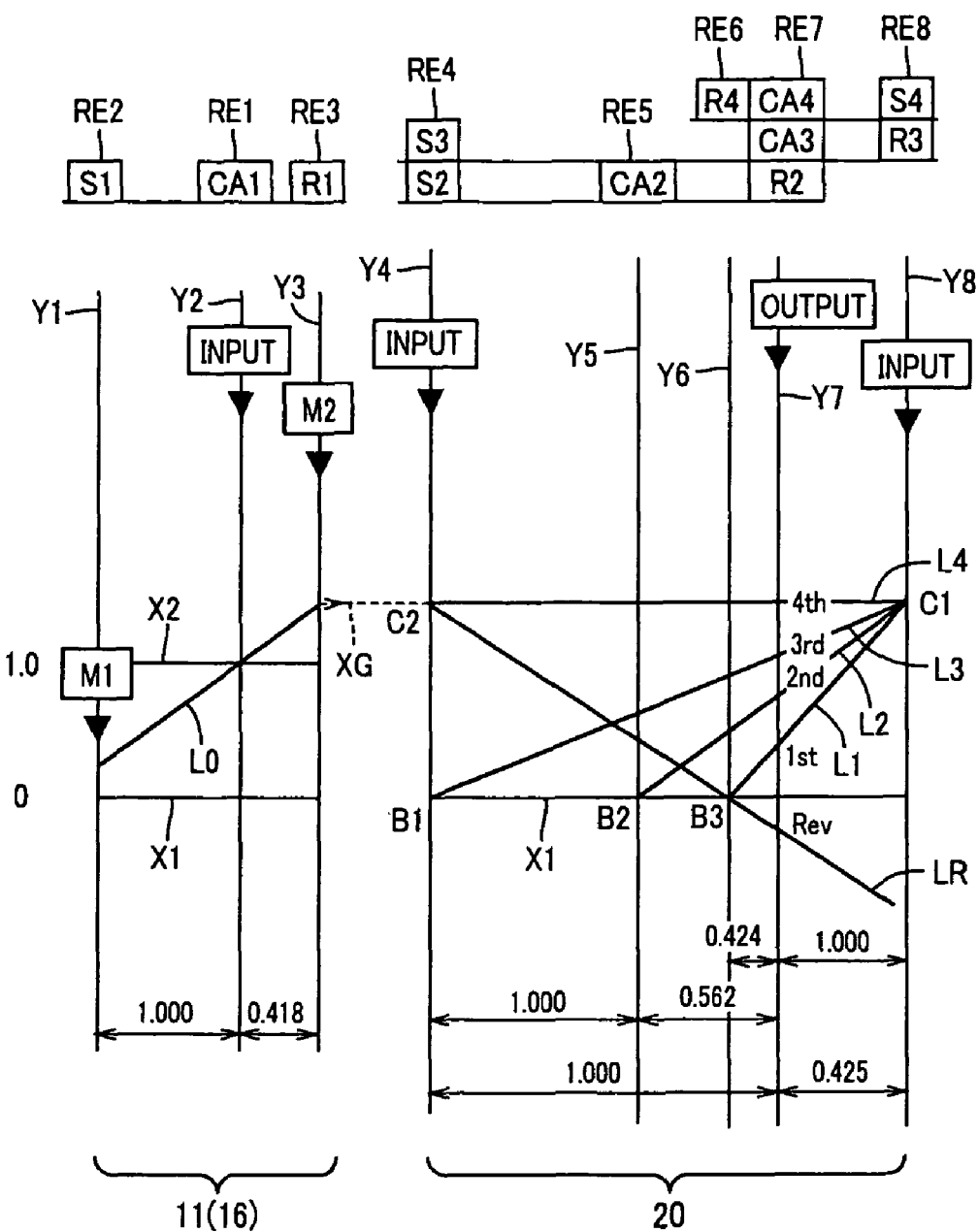
FIG. 3 is a collinear chart indicating mutually relative rotating speeds of rotary elements establishing various gear positions in the vehicular drive apparatus shown in FIG. 1.

FIG. 3 is a collinear chart for the transmission mechanism 10 including the differential portion 11 and the automatic shifting portion 20, wherein the relative motion relationships among the rotation speeds of the various rotary elements in different coupling states for each gear position can be plotted on straight lines. The collinear chart of FIG. 3 takes the form of a two-dimensional coordinate system having the abscissa axis plotted with the gear ratios ρ of the planetary gear sets 24, 26, 28, 30 and the ordinate axis plotted with the mutually relative rotating speeds of the rotary elements. A transverse line X1 indicates the rotation speed that is zeroed; a transverse line X2 the rotation speed of "1.0", that is, the rotating speed NE of the engine 8 connected to the input shaft 14; and a transverse line XG the rotation speed of the power transmitting member 18.

Starting from the left, three vertical lines Y1, Y2 and Y3, associated with the three elements of the power distributing mechanism 16 forming the differential portion 11, represent the mutually relative rotating speeds of the first sun gear S1 corresponding to a second rotary element (second element) RE2, the first carrier CA1 corresponding to a first rotary element (first element) RE1, and the first ring gear R1 corresponding to a third rotary element (third element) RE3, respectively. A distance between the adjacent vertical lines is determined based on the gear ratio ρ1 of the first planetary gear set 24.

Starting from the left, further, five vertical lines Y4, Y5, Y6, Y7 and Y8 for the automatic shifting portion 20 represent the mutually relative rotating speeds of the second and third sun gears S2, S3, connected to each other, which corresponds to a fourth rotary element (fourth element) RE4; the second carrier CA2 corresponding to a fifth rotary element (fifth element) RE5; the fourth ring gear R4 corresponding to a sixth rotary element (sixth element) RE6; the second ring gear R2, third carriers CA3 and fourth carriers CA4 connected to each other, which correspond to a seventh rotary element (seventh element) RE7; and the third ring gear R3 and fourth sun gear S4 connected to each other and corresponding to an eighth rotary element (eighth element) RE8, respectively. Each distance between the adjacent vertical lines is determined based on the gear ratios ρ2, ρ3 and ρ4 of the second, third and fourth planetary gear sets 26, 28, 30.

In the relationship among the vertical lines on the collinear chart, if a space between the sun gear and carrier is set to a distance corresponding to a value of "1", then, a space between the carrier and ring gear lies at a distance corresponding to the gear ratio ρ of the planetary gear set. That is, for the differential portion 11, a space between the vertical lines Y1 and Y2 is set to a distance corresponding to a value of "1", and a space between the vertical lines Y2 and Y3 is set to a distance corresponding to the gear ratio ρ1. For the automatic shifting portion 20, further, the space between the sun gear and carrier is set to the distance corresponding to the value of "1" for each of the second, third and fourth planetary gear sets 26, 28, 30, for which the space between the carrier and ring gear is set to the distance corresponding to the gear ratio ρ.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is connected to the input shaft 14, i.e., the engine 8, and the third electric motor M3, and the second rotary element RE2 is connected to the first electric motor M1. The third rotary element RE3 (first ring gear R1) is connected to the power transmitting member 18 and the second electric motor M2. Thus, a rotation of the input shaft 14 is transmitted (input) to the automatic shifting portion 20 through the power transmitting member 18. A relationship between the rotation speeds of the first sun gear S1 and the first ring gear R1 is represented by an inclined straight line L0 which passes across a point of intersection between the lines Y2 and X2.

Now, description is made of a case in which, for example, the differential portion 11 is placed in a differential state with the first to third rotary elements RE1 to RE3 enabled to rotate relative to each other while the rotation speed of the first ring gear R1, indicated at an intersecting point between the straight line L0 and the vertical line Y1, is bound with the vehicle speed V and remains at a nearly constant level. In this case, as the engine speed NE is controlled with the rotation speed of the first carrier CA1 as represented by an intersecting point between the straight line L0 and the vertical line Y2 being raised or lowered, the rotation speed of the first sun gear S1, i.e., the rotation speed of the first electric motor M1 indicated by an intersecting pint between the straight line L0 and the vertical line Y1 is raised or lowered.

On controlling the rotation speed of the first electric motor M1 so as to allow the differential portion 11 to have the speed ratio γ0 of "1" with the first sun gear S1 rotating at the same speed as the engine speed NE, the straight line L0 is aligned with the horizontal line X2. When this takes place, the first ring gear R1, i.e., the power transmitting member 18, is caused to rotate at the same speed as the engine speed NE. On the contrary, if the rotation speed of the first electric motor M1 is controlled so as to allow the differential portion 11 to have the speed ratio γ0 of a value less than "1", for instance, a value of approximately "0.7" with the rotation speed of the first sun gear S1 being zeroed, the power transmitting member 18 is caused to rotate at an increased transmitting-member rotation speed $N_{18}$ higher than the engine speed NE.

In the automatic shifting portion 20, the fourth rotary element RE4 is selectively connected to the power transmitting member 18 via the second clutch C2 and selectively connected to the casing 12 via the first brake B1 with the fifth rotary element RE5 being selectively connected to the casing 12 via the second brake B2. The sixth rotary element RE6 is selectively connected to the casing 12 via the third brake B3 with the seventh rotary element RE7 connected to the output shaft 22, and the eighth rotary element RE8 is selectively connected to the power transmitting member 18 via the first clutch C1.

Next, description is made of a case wherein in the automatic shifting portion 20, rotation of the power transmitting member 18 (a third rotary element RE3) which is the output rotation member is input to a eighth rotary element RE8 by engagement of the first clutch C1 in the differential portion 11. When this takes places, the first clutch C1 and the third brake B3 are coupled as shown in FIG. 3. In this case, the rotation speed of the output shaft 22 for the 1st-speed gear position is represented by an intersecting point between the inclined line L1, passing across an intersecting point between the vertical line Y8 indicative of the rotation speed of the eighth rotary element RE8, and the horizontal line XG, and a point of intersection between the vertical line Y6 indicative of the rotation speed of the sixth rotary element RE6 and the horizontal line X1, and an intersecting point intersecting the vertical line Y7 indicative of the rotation speed of the seventh rotary element RE connected to the output shaft 22 as indicated in FIG. 3.

Similarly, the rotation speed of the output shaft 22 for the 2nd-speed gear position is represented by an intersecting point between an inclined straight line L2 determined when the first clutch C1 and second brake B2 are coupled, and the vertical line Y7 indicative of the rotation speed of the seventh rotary element RE7 connected to the output shaft 22. The rotation speed of the output shaft 22 for the 3rd-speed gear position is represented by an intersecting point between an inclined straight line L3 determined with the first clutch C1 and first brake B1 being coupled, and the vertical line Y7 indicative of the rotation speed of the seventh rotary element RE7 connected to the output shaft 22. The rotation speed of the output shaft 22 for the 4th-speed gear position is represented by an intersecting point between a horizontal straight line L4, determined with the first clutch C1 and second brake B2 being coupled, and the vertical line Y7 indicative of the rotation speed of the seventh rotary element RE7 connected to the output shaft 22.

Figure 4:
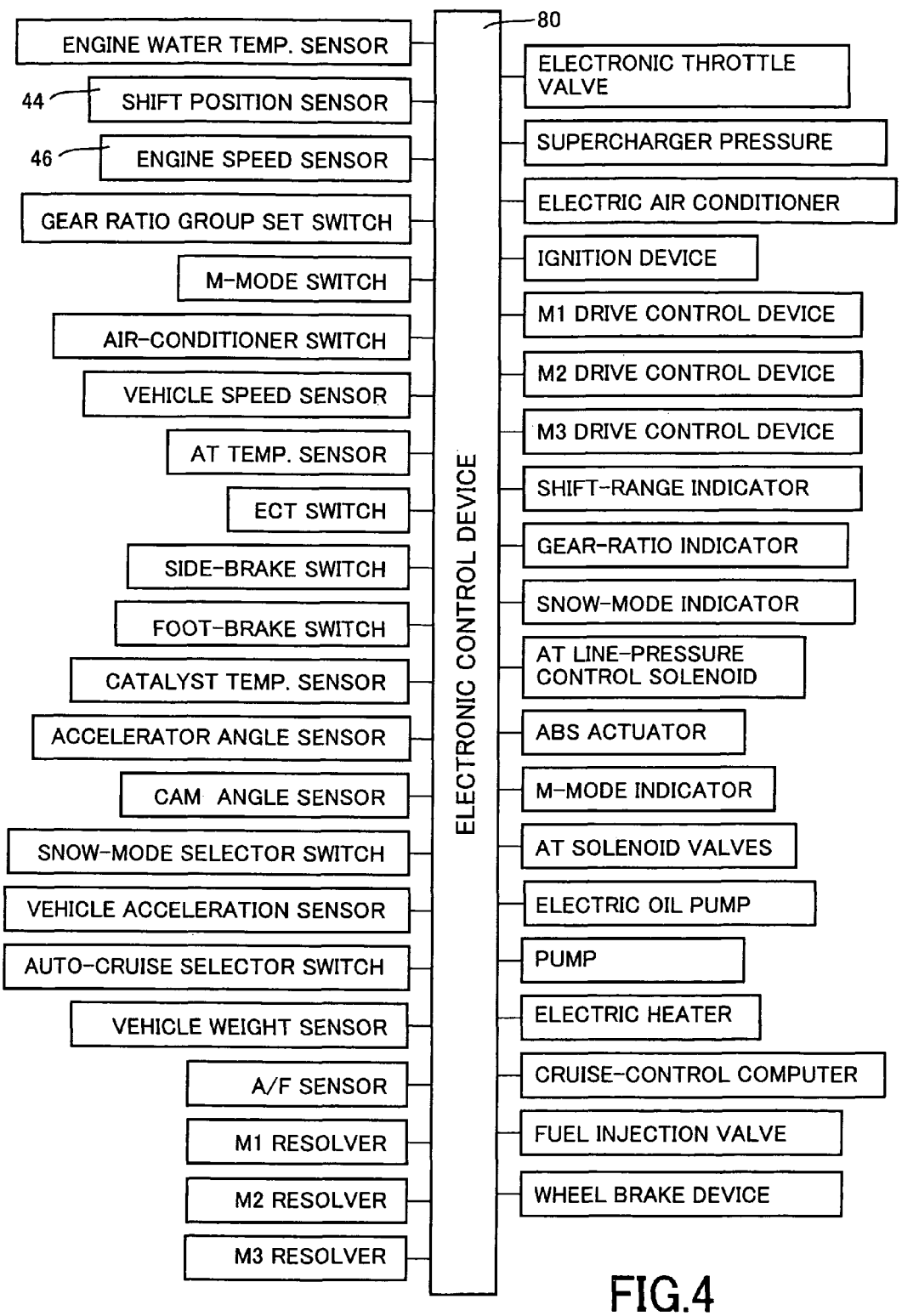
FIG. 4 is a view showing input and output signals of an electronic control unit provided in the vehicular drive apparatus shown in FIG. 1.

FIG. 4 shows an electronic control unit 80 operative to control the transmission mechanism 10 of the present invention for generating various output signals in response to various input signals. The electronic control unit 80 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and first, second and third electric motors M1, M2 and M3, and drive controls such as shifting controls of the automatic shifting portion 20. The electronic control unit 80 functions as the engine startup control device.

The electronic control unit 80, connected to various sensors and switches as shown in FIG. 4, receives various signals such as: a signal indicative of an engine coolant temperature $TEMP_W$; a signal indicative of a shift position SP selected with a shift lever 52 (shown in FIG. 6) and a signal indicative of the number of operations initiated on the "M" position; a signal indicative of the engine speed NE representing the rotation speed of the engine 8; a signal indicative of a gear train preset value; a signal commanding an M mode (manual shift running mode); a signal indicative of an operated state of an air conditioner; a signal indicative of the rotation speed (hereinafter referred to as "output shaft speed") $N_{OUT}$ of the output shaft 22; a signal indicative of a temperature $T_{OIL}$ of working oil of the automatic shifting portion 20.

Figure 7:
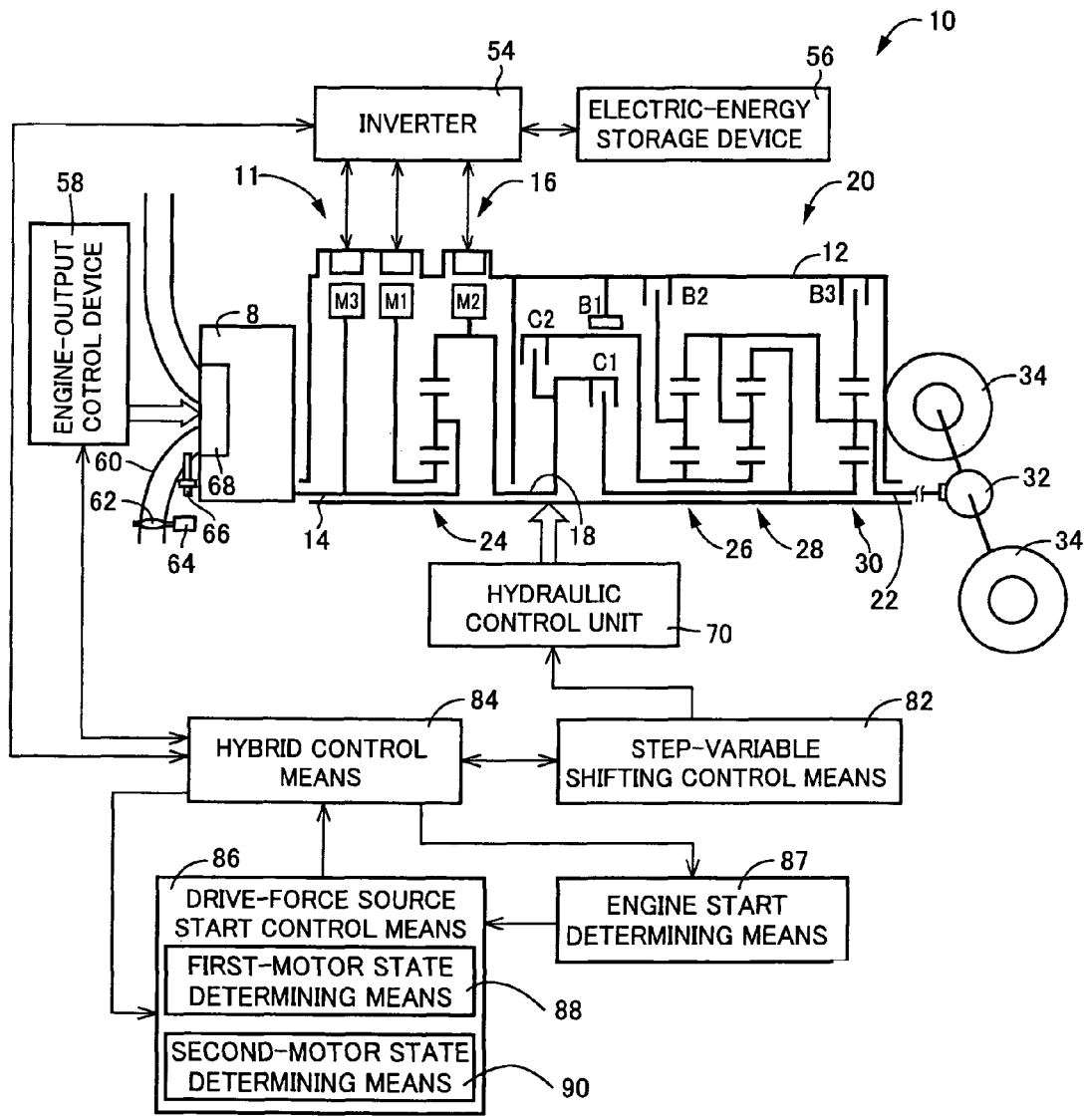
FIG. 7 is a functional block diagram illustrating a major control function to be executed by the electronic control device shown in FIG. 4.

The electronic control unit 80 also receives a signal indicative of a side brake under operation; a signal indicative of a foot brake under operation; a signal indicative of a temperature of a catalyst; a signal indicative of an accelerator opening Acc representing an operating stroke of an accelerator pedal when manipulated by a driver for his output demand value; a signal indicative of a cam angle; a signal indicative of a snow mode under setting; a signal indicative of a fore and aft acceleration value G of the vehicle; a signal indicative of an auto-cruising drive mode; a signal indicative of a weight 'vehicle weight) of the vehicle; a signal indicative of a wheel velocity of each drive wheel; a signal indicative of a rotation speed $N_{M1}$ of the first electric motor M1 (hereinafter referred to as "first-electric motor speed $N_{M1}$); a signal indicative of a rotation speed $N_{M2}$ of the second electric motor M2 (hereinafter referred to as "second-electric motor speed $N_{M2}$); a signal indicative of a rotation speed $N_{M3}$ of the second electric motor M3 (hereinafter referred to as "second-electric motor speed $N_{M3}$); and a signal indicative of a state of charge SOC stored in an electric-energy storage device 60 (see FIG. 7).

The electronic control unit 80 generates various signals including: a control signal applied to an engine output control device 58 (see FIG. 7) for controlling an engine output, i.e., a drive signal applied to a throttle actuator 64 for controlling a throttle valve opening $\theta_{TH}$ of an electronic throttle valve 62 disposed in an intake manifold 60 of the engine 8; a fuel supply quantity signal applied to a fuel injecting device 66 for controlling an amount of fuel injected into the intake manifold 60 or cylinders of the engine 8; an ignition signal applied to an ignition device 68 to control the ignition timing of the engine 8; a supercharger pressure regulation signal for regulating a supercharger pressure of the engine 8; an electric air-conditioner drive signal for actuating an electric air conditioner; command signals for commanding the operations of the first, second and third electric motors M1, M2 and M3; a shift-position (manipulated position) display signal for actuating a shift-range indicator; a gear-ratio indicating signal for displaying the gear ratio.

The electronic control unit 80 also generates snow-mode display signal for displaying the presence of a snow-mode; an ABS actuation signal for operating an ABS actuator to preclude slippages of the drive wheels during a braking phase; an M-mode display signal for displaying an M-mode being selected; valve command signals for actuating electromagnetic valves (linear solenoid valves), incorporated in the hydraulic control unit 70 (see FIGS. 5 and 7) for controlling the hydraulic actuators of the hydraulically operated frictional coupling devices of the differential portion 11 and automatic shifting portion 20; a signal for regulating a regulator valve (pressure regulator valve), incorporated in the hydraulic control unit 70, to regulate a line pressure PL; a drive command signal for actuating an electric hydraulic pump acting as a hydraulic original-pressure source for the line pressure $P_L$ to be regulated; a signal for driving an electric heater; and a signal applied to a cruise-control computer.

Figure 5:
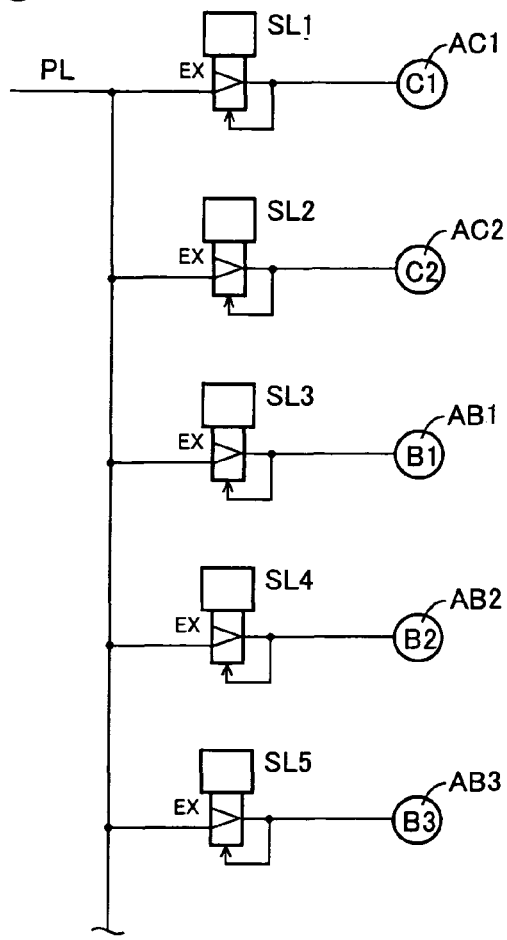
FIG. 5 is a circuit diagram relating to, of a hydraulic control device, linear solenoid valves arranged to control operations of respective hydraulic actuators of clutches C and brakes B.

FIG. 5 is a circuit diagram related to linear solenoid valves SL1 to SL5 of the hydraulic control circuit 70 for controlling the operations of respective hydraulic actuators (hydraulic cylinders) AC1, AC2, AB1, AB2, AB3 of the clutches C1, C2 and brakes B1 to B3.

As shown in FIG. 5, the hydraulic actuators AC1, AC2, AB1, AB2, AB3 are connected to the respective linear solenoid valves SL1-SL5, which are controlled in response to control commands, delivered from the electronic control unit 80. This adjusts the line pressure PL into respective clutch engaging pressures PC1, PC2, PB1, PB2 and PB3 to be applied directly to the respective hydraulic actuators AC1, AC2, AB1, AB2, AB3. The line pressure PL represents an original hydraulic pressure, generated by an electrically-controlled hydraulic oil pump (not shown) or a mechanical oil pump driven by the engine 8, which is regulated by a relief-type pressure regulator valve depending on a load of the engine 8 in terms of an accelerator opening displacement or a throttle valve opening.

The linear solenoid valves SL1 to SL5, fundamentally formed in the same structure, are independently energized or de-energized with the electronic control unit 80. This allows the hydraulic actuators AC1, AC2, AB1, AB2, AB3 to independently and controllably regulate hydraulic pressures, thereby controlling the clutch engaging pressures PC1, PC2, PB1, PB2, PB3. With the automatic shifting portion 20, predetermined coupling devices are coupled in a pattern indicated on, for instance, the coupling-operation indicating table shown in FIG. 2, thereby establishing various gear positions. In addition, during the shifting control of the automatic shifting portion 20, a so-called clutch-to-clutch shifting is executed to simultaneously control the coupling or uncoupling of the clutches C and the brakes B relevant to the shifting operations.

Figure 6:
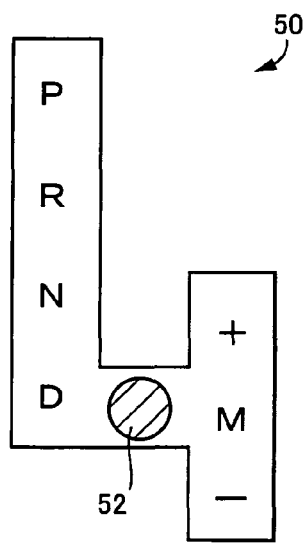
FIG. 6 is a view showing one example of a manually operated shifting device including a shift lever and operable to select one of a plurality of shift positions.

FIG. 6 is a view showing one example of a manually operated shifting device 50 serving as a changeover device operative to shift multiple kinds of shift positions SP on manual operation. The shifting device 50 is mounted in, for instance, an area lateral to a driver's seat and includes a shift lever 52 to be manipulated for selecting one of the plurality of shift positions SP.

The shift lever 52 has a parking position "P" (Parking) under which an inside of the transmission mechanism 10, i.e., the power transmitting path inside the automatic shifting portion 20 is shut off in a neutral condition, i.e., a neutral state with the output shaft 22 of the automatic shifting portion 20 remained in a locked state; a reverse drive position "R" (Reverse) for a reverse drive mode; a neutral position "N" (Neutral) for the power transmitting path of the transmission mechanism 10 to be shut off in the neutral state; an automatic forward-drive running position "D" (Drive); and a manual-shift forward-drive position "M" (Manual). In the automatic forward-drive running position "D", an automatic shift mode is established for executing an automatic shift control within a varying range of a shiftable total speed ratio γT of the transmission mechanism 10 resulting from various gear positions whose automatic shift control is performed in a continuously variable speed ratio width of the differential portion 11 and a range of the 1st-speed to the 4th-speed gear positions of the automatic shifting portion 20. The manual-shift forward-drive position "M" is manually shifted to establish a manual-shift forward-drive mode (manual mode) for setting a so-called shift range to limit a shifting gear position on a high speed range during the operation of the automatic shifting portion 20.

As the shift lever 52 is shifted to the various shift positions SP, the hydraulic control circuit 70 is electrically switched, thereby obtaining the reverse-drive "R" gear position, the neutral position "N" and the various gear shift positions or the like in the forward-drive gear position "D".

Among the various shift positions SP represented in the "P" to "M" positions, the "P" and "N" positions represent non-running positions selected when no vehicle is caused to run. That is, the "P" and "N" positions represent non-drive positions selected when the first and second clutches C1, C2 select to cause the power transmitting path to be switched to a power cut-off state like a situation where as indicated in, for instance, the coupling operation indicating table shown in FIG. 2, both the first and second clutches C1, C2 are uncoupled to interrupt the power transmitting path inside the automatic shifting portion 20 so as to disenable the driving of the vehicle.

The "R", "D" and "M" positions represent running positions selected when the vehicle is caused to run. That is, these positions represent drive positions selected when the first and/or second clutches C1, C2 select to cause the power transmitting path to be switched to a power transmissive state like a situation where as indicated in, for instance, the coupling operation indicating table shown in FIG. 2, at least one of the first and/or second clutches C1 and/or C2 is coupled to establish the power transmitting path inside the automatic shifting portion 20 so as to enable the vehicle to be driven.

More particularly, as the shift lever 52 is manually shifted from the "P" position or the "N" position to the "R" position, the second clutch C2 is coupled to cause the power transmitting path of the automatic shifting portion 20 to be switched from the power cut-off state to the power transmissive state. With the shift lever 52 manually shifted from the "N" position to the "D" position, at least the first clutch C1 is coupled to switch the power transmitting path of the automatic shifting portion 20 from the power cut-off state to the power transmissive state. Further, as the shift lever 52 is manually shifted from the "R" position to the "P" or "N" position, the second clutch C2 is uncoupled to switch the power transmitting path of the automatic shifting portion 20 from the power transmissive state to the power cut-off state. With the shift lever 52 manually shifted from the "D" position to the "N" position, the first clutch C1 or second clutch C2 is uncoupled to switch the power transmitting path of the automatic shifting portion 20 from the power transmissive state to the power cut-off state.

FIG. 7 is a functional block diagram illustrating major control functions to be executed by the electronic control unit 80. In FIG. 7, the step-variable shifting control means 82 determines whether to execute the shifting of the automatic shifting portion 20, i.e., the gear position to be shifted for causing the automatic shifting portion 20 to execute the automatic shift control, based on the vehicle condition, represented by an actual vehicle speed V and the output torque $T_{OUT}$ of the automatic shifting portion 20 by referring to the relationships (shifting lines and shifting map) involving upshift lines (in solid lines) and downshift lines (in single dot lines) that are preliminarily stored as parameters of the vehicle speed V and the output torque $T_{OUT}$ of the automatic shifting portion 20 represented in FIG. 8.

When this takes place, the step-variable shifting control means 82 outputs commands (a shift output command and a hydraulic pressure command) to the hydraulic control circuit 70 for coupling and/or uncoupling the hydraulically operated frictional coupling devices, involved in the shifting of the automatic shifting portion 20 so as to establish the gear position in accordance with the coupling table shown in FIG. 2. That is, the step-variable shifting control means 82 outputs a command to the hydraulic control circuit 70 for uncoupling the uncoupling side coupling device involved in the shifting, while coupling the coupling side coupling device to cause the clutch-to-clutch shifting to be executed. Upon receipt of such commands, the hydraulic control circuit 70 causes the linear solenoid valves SL of the automatic shifting portion 20 to be actuated. This allows the hydraulically operated actuators of the hydraulically operated frictional coupling devices involved in the relevant shifting to be actuated. Thus, for instance, the uncoupling side coupling device is uncoupled and the coupling side coupling device is coupled, causing the automatic shifting portion 20 to execute the shifting.

Hybrid control means 84 operates the engine 8 in an optimum operating range at a high efficiency while distributing the drive forces of the engine 8 and the second electric motor M2 at optimum rates and optimally varying a reacting force of the first electric motor M1 during the operation thereof to generate electric power, thereby controllably operating the differential portion 11 under an electrically controlled continuously variable transmission to control a speed ratio γ0. At a vehicle speed V during the running of the vehicle in one occasion, for instance, a target (demanded) output for the vehicle is calculated based on the accelerator opening Acc and the vehicle speed V both of which represent output demanded variables of the driver, after which a demanded total target output is calculated based on the target output of the vehicle and a battery charge demanded value. Subsequently, a target engine output is calculated in consideration of a loss in power transmission, loads of auxiliary units, assist torque of the second electric motor M2 or the like so as to obtain the total target output. Then, the hybrid control means 84 controls the engine 8, while controlling an amount of electric power being generated by the first electric motor M1, so as to obtain the engine speed NE and engine torque TE such that the target engine output is obtained.

The hybrid control means 84 executes such controls in consideration of, for instance, the gear position of the automatic shifting portion 20 with a view to increasing a dynamic performance and improving fuel consumption. During such hybrid controls, the differential portion 11 is caused to operate as the electrically controlled continuously variable transmission such that the engine speed NE and the vehicle speed V, determined for the engine 8 to operate in the operating range at a high efficiency, match the vehicle speed and the rotation speed of the power transmitting member 18 determined with the gear position in the automatic shifting portion 20.

Figure 9:
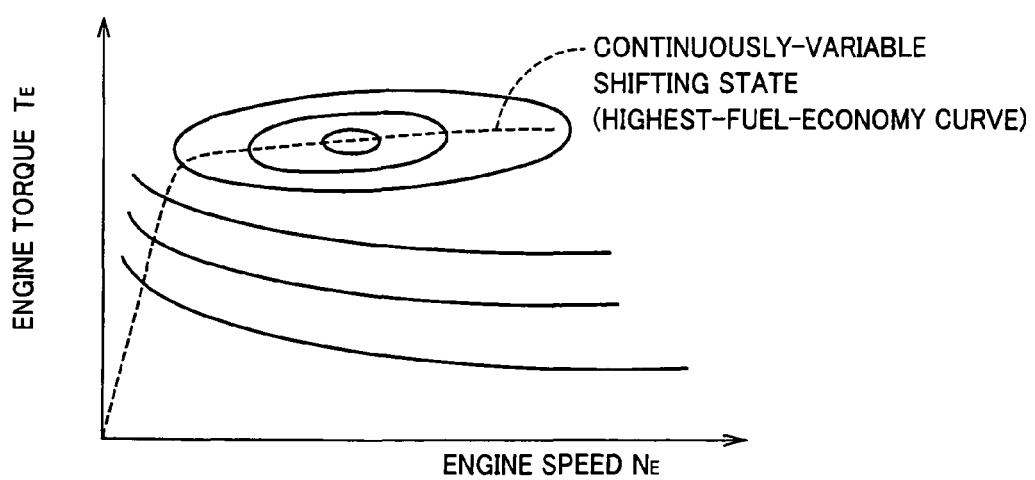
FIG. 9 is a view illustrating one example of a fuel consumption map with a broken line representing an optimum fuel consumption curve of an engine.

That is, the hybrid control means 84 determines a target value of the total speed ratio γT of the transmission mechanism 10 such that the engine 8 is caused to operate along an optimal fuel efficiency curve (a fuel efficiency map and the relationships) of the engine 8 as indicated by a dotted line in FIG. 9 which is preliminarily and experimentally obtained and prestored. This achieves a compromise between driveability and fuel consumption during the running of the vehicle under a continuously variable shifting mode on a two-dimensional coordinate established with the engine speed NE and output torque (engine torque) TE of the engine 8. For instance, the target value of the total speed ratio γT of the transmission mechanism 10 is determined so as to obtain engine torque TE and the engine speed NE for generating the engine output demanded for satisfying target outputs (a total target output and demanded drive torque). Then, the speed ratio γ0 of the differential portion 11 is controlled in consideration of the gear position in the automatic shifting portion 20 so as to obtain the relevant target value, thereby controlling the total speed ratio γT within a variable shifting range.

When this takes place, the hybrid control means 84 allows electric energy generated by the first electric motor M1 to be supplied through an inverter 54 to a battery device 56 and the second electric motor M2. Thus, a major part of drive power of the engine 8 is mechanically transferred to the power transmitting member 18. However, a part of drive power of the engine 8 is consumed with the first electric motor M1 for the generation of electric power and converted into electric energy. Resulting electric energy is supplied through the inverter 54 into the second electric motor M2, which is consequently driven. Therefore, the part of drive power is transferred through the second electric motor M2 to the power transmitting member 18. Equipment, involved in the operations starting from the step of generating electric power to the step of causing the second electric motor M2 to consume resultant electric energy, establishes an electric path in which the part of the drive power of the engine 8 is converted into electric energy and resultant electric energy is converted into mechanical energy.

The hybrid control means 84 allows the differential portion 11 to perform an electrically controlled CVT function for controlling, for instance, a first-electric-motor rotation speed $N_{M1}$ and/or a second-electric-motor rotation speed $N_{M2}$ to maintain the engine speed NE at a nearly constant level or to control the rotation speed at an arbitrary level regardless of the vehicle remaining under a halted condition or a running condition. In other words, the hybrid control means 84 controls the first-electric-motor rotation speed $N_{M1}$ and/or a second-electric-motor rotation speed $N_{M2}$ at an arbitrary level while maintaining the engine speed NE at the nearly constant level or the arbitrary rotation speed.

As will be apparent from the collinear chart shown in FIG. 3, for instance, when raising the engine speed NE during the running of the vehicle, the hybrid control means 84 raises the first-electric-motor rotation speed $N_{M1}$ while maintaining a second-electric-motor rotation speed $N_{M2}$ at a nearly fixed level that is bound with the vehicle speed V (represented by the drive wheels 34). In addition, when maintaining the engine speed NE at the nearly fixed level during the shifting of the automatic shifting portion 20, the hybrid control means 84 varies the first-electric-motor rotation speed $N_{M1}$ in a direction opposite to that in which the second-electric-motor rotation speed $N_{M2}$ varies with the shifting of the automatic shifting portion 20 while maintaining the engine speed NE at the nearly fixed level.

The hybrid control means 84 causes the throttle actuator 64 to controllably open or close the electronic throttle valve 62 for performing a throttle control. In addition, the hybrid control means 84 functionally includes engine output control means that outputs commands to an engine output control device 58 singly or in combination. This causes a fuel injection device 66 to control a fuel injection quantity and a fuel injection timing for fuel injection control while causing an ignition device 68 to control an ignition timing of an ignition device 68 such as an igniter or the like for an ignition timing control. Upon receipt of such commands, the engine output control device 58 executes an output control of the engine 8 so as to provide a demanded engine output.

For instance, the hybrid control means 84 basically drives the throttle actuator 64 in response to the accelerator opening Acc by referring to the prestored relationship (not shown). The throttle control is executed such that the greater the accelerator opening Acc, the larger will be the throttle valve opening $\theta_{TH}$. Upon receipt of the commands from the hybrid control means 84, further, the engine output control device 58 allows the throttle actuator 64 to controllably open or close the electronic throttle valve 62 for throttle control while controlling the ignition timing of the ignition device 68 such as the igniter or the like for ignition timing control, thereby executing an engine torque control.

Further, the hybrid control means 84 is operative to cause the differential portion 11 to perform the electrically controlled CVT function (differential action) to achieve the motor drive mode regardless of the engine 8 remaining under the halted condition or an idling state. For instance, the hybrid control means 84 executes the motor-drive running mode in a relatively low output torque range $T_{OUT}$, i.e., a low engine torque TE regarded to be generally lower in engine efficiency than that of the engine operating in a high output torque range, or a relatively low vehicle speed range of the vehicle speed V, i.e., a low load range. In order to suppress a drag of the engine 8 being halted for improving fuel consumption during such a motor-drive running mode, the hybrid control means 84 controls the first-electric-motor rotation speed $N_{M1}$ in a negative rotation speed to render, for instance, the first electric motor M1 operative under an unloaded condition, thereby achieving an idling state. By so doing, the engine speed NE is zeroed or nearly zeroed depending on needs due to the electrically controlled CVT function (differential action) of the differential portion 11.

Figure 8:
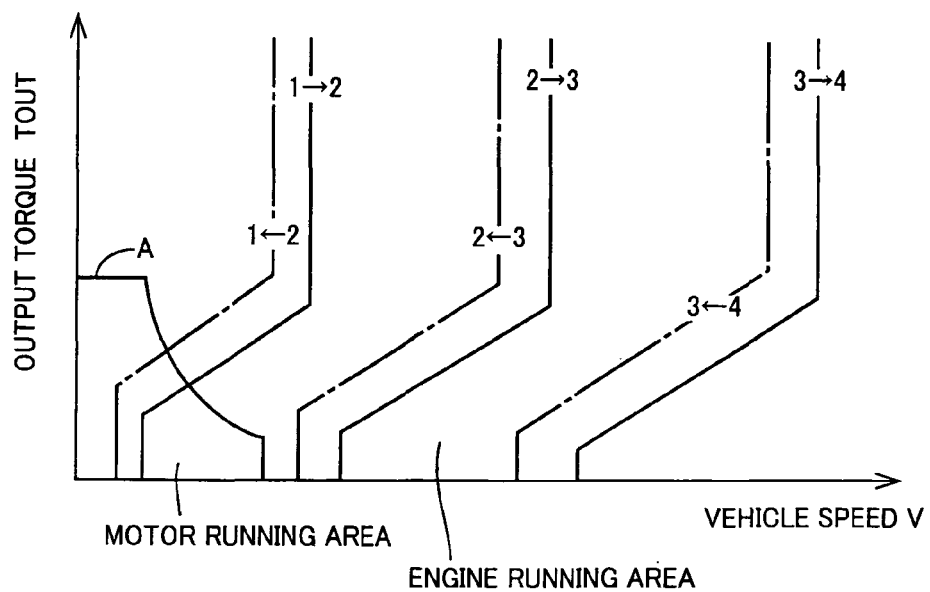
FIG. 8 is a view illustrating one example of a shifting map for use in a shifting control of the power transmitting apparatus and one example of drive-power-source map for use in a drive-power-source switching control between an engine-drive mode and a motor-drive mode, with relation between those maps being shown.

A solid line A, shown in FIG. 8, represents a boundary line for a drive-force source to be switched to the engine 8 and the electric motor such as, for instance, the second electric motor M2 for starting/running (hereinafter, referred to as "running") the vehicle. In other words, the solid line "A" represents the boundary line between an engine drive region and a motor drive region. This allows the operation to be switched between a so-called engine drive mode, enabling the engine 8 to operate as a running drive-force source to start/run (hereinafter, referred to as "running") the vehicle, and a so-called motor drive mode in which the second electric motor M2 is rendered operative as the running drive-force source to drive the vehicle. Such a boundary line (indicated by the solid line "A"), shown in FIG. 8, for the engine drive mode and the motor drive mode to be switched is preliminarily stored as the relationship. This relationship represents one example of a drive-force source switching diagram (drive-force source map) plotted on two-dimensional coordinates taking parameters such as a vehicle speed V and output torque $T_{OUT}$ representing a drive-force correlated value. The drive-force source switching diagram is preliminarily stored together with the shifting diagram (shifting map) plotted in, for instance, solid lines and single-dot lines in FIG. 8.

The hybrid control means 84 executes the operation, based on a vehicle condition represented by the vehicle speed V and demanded output torque $T_{OUT}$ by referring to the drive-force source switching diagram, for instance, shown in FIG. 8, to make a determination as to whether the vehicle belongs to either one of the motor drive region and the engine drive region for executing the motor drive mode or the engine drive mode. As will be apparent from FIG. 8, thus, the hybrid control means 84 executes the motor drive mode during relatively low output torque $T_{OUT}$ with the engine being generally regarded to have lower efficiency than that of the engine achieved during a high torque range. That is, the motor drive mode is executed under low engine torque TE or when the vehicle speed V remains at a relatively low vehicle speed, i.e. under a low load range.

With a view to precluding the occurrence of a drag resulting from the halted engine 8 to improve fuel consumption, during the motor drive mode, the hybrid control means 84 allows the differential portion 11 to perform an electrically controlled CVT function (differential action). This causes a rotating speed $N_{M1}$ of the first electric motor M1 to be controlled at a negative rotating speed, i.e. to be freewheeled to render the differential portion 11 operative to achieve the differential action such that an engine rotation speed NE is maintained at a zeroed or nearly zeroed state.

Further, the hybrid control means 84 renders the differential portion 11 operative to perform the electrically controlled CVT function regardless of the vehicle remaining under a halted state or a running state. This allows the rotating speed $N_{M1}$ of the first electric motor M1 and/or the rotating speed $N_{M2}$ of the second electric motor. M2 to be controlled such that the engine rotation speed NE is maintained at an arbitrary rotation speed. As will be understood from, for instance, the collinear chart shown in FIG. 3, when raising the engine rotation speed NE, the hybrid control means 84 allows the rotating speed $N_{M1}$ of the first electric motor M1 to increase while permitting the rotating speed $N_{M2}$ of the second electric motor M2, bounded with the vehicle speed V, to be maintained at a nearly fixed level.

Even if the engine drive region is present, furthermore, the hybrid control means 84 allows electric energy delivered from the first electric motor M1 due to the electrical path mentioned above, and/or electric energy delivered from the battery 56, to be supplied to the second electric motor M2. Thus, the second electric motor M2 is driven to apply torque to the drive wheels 34, capable of achieving a so-called torque-assist for drive power of the engine 8 to be assisted.

The hybrid control means 84 renders the first electric motor M1 operative under the unloaded condition to freely rotate in the idling state. This can cause the differential portion 11 to interrupt a torque transfer, i.e., the differential portion 11 is rendered inoperative with no output being provided under the same state as that in which the power transmitting path is disconnected in the differential portion 11. That is, the hybrid control means 84 places the first electric motor M1 in the unloaded condition, making it possible to place the differential portion 11 in a neutral condition (neutral state) in which the power transmitting path is electrically disconnected.

During a coast running state (during a coasting state) with an accelerator pedal being released or during a braking condition with a foot brake being depressed, moreover, the hybrid control means 84 has a function to act as regeneration control means. With a view to improving fuel consumption, the hybrid control means 84 performs the function to allow kinetic energy of the vehicle, i.e. a reverse drive force delivered from drive wheels 34 to the engine 8, to rotatably drive the second electric motor M2, which consequently serves as an electric generator to generate electric power. Resulting electric energy, i.e., a second-motor generated electric current, is applied through an inverter 54 to the battery 56 to be charged therein. Such a regeneration control is executed to achieve a rate of regeneration determined based on a braking force distribution for a braking force attained with a hydraulic brake to obtain a braking force distribution pattern for a braking force obtained by a hydraulic brake for the purpose of obtaining the a braking force depending on a state of charge SOC of the battery 56 and a brake pedal depressing stroke.

As set forth above, during the motor drive mode, if a running condition of the vehicle passes across the boundary line to reach the engine drive region as indicated by the solid line "A" in FIG. 8, then the operation is switched to the engine drive mode. Under such a state, the hybrid control means 84 controls the first and second electric motors M1 and M2 to raise the engine rotation speed NE up to a rotation speed available to achieve engine ignition, upon which complete combustion is accomplished to start up the engine 8. In starting up the engine 8 by such first and second electric motors M1 and M2, these electric motors need to have torques and powers at rates to increase the engine rotation speed NE, respectively.

In particular, the second electric motor M2 has been required to have drive torque and drive power at rates needed for running the vehicle and drive torque and drive power at rates needed for starting up the engine. Therefore, a need has been arisen to achieve engine start on a boundary value (threshold value) based on which the engine drive mode is effectuated with a drive force obtained by subtracting torque needed for the second electric motor M2 to start up the engine 8. Due to such a need, the engine drive mode has been switched in effect even under a condition where the battery 56 has room to provide a great deal of output, causing the motor drive region to be narrowed.

In the present embodiment, therefore, engine start modes are appropriately switched depending on the vehicle condition, thereby expanding the motor drive region. Depending on the vehicle condition, further, it is likely that deterioration occurs in startability of the engine during start thereof to easily cause shocks to occur. To address such a fear, appropriately switching the engine start modes can suppress deterioration in startability of the engine and the occurrence of shocks. Hereunder, description is made with a focus on such a control.

Drive-force source start control means 86 switches the start modes of the engine 8 to a proper method depending on the vehicle condition. More particularly, the drive-force source start control means 86 executes the operation to selectively switch the start modes of the engine 8 to a method of starting up the engine 8 by the first and second electric motors M1 and M2 or another method of starting up the engine 8 by a third electric motor M3.

Figure 10:
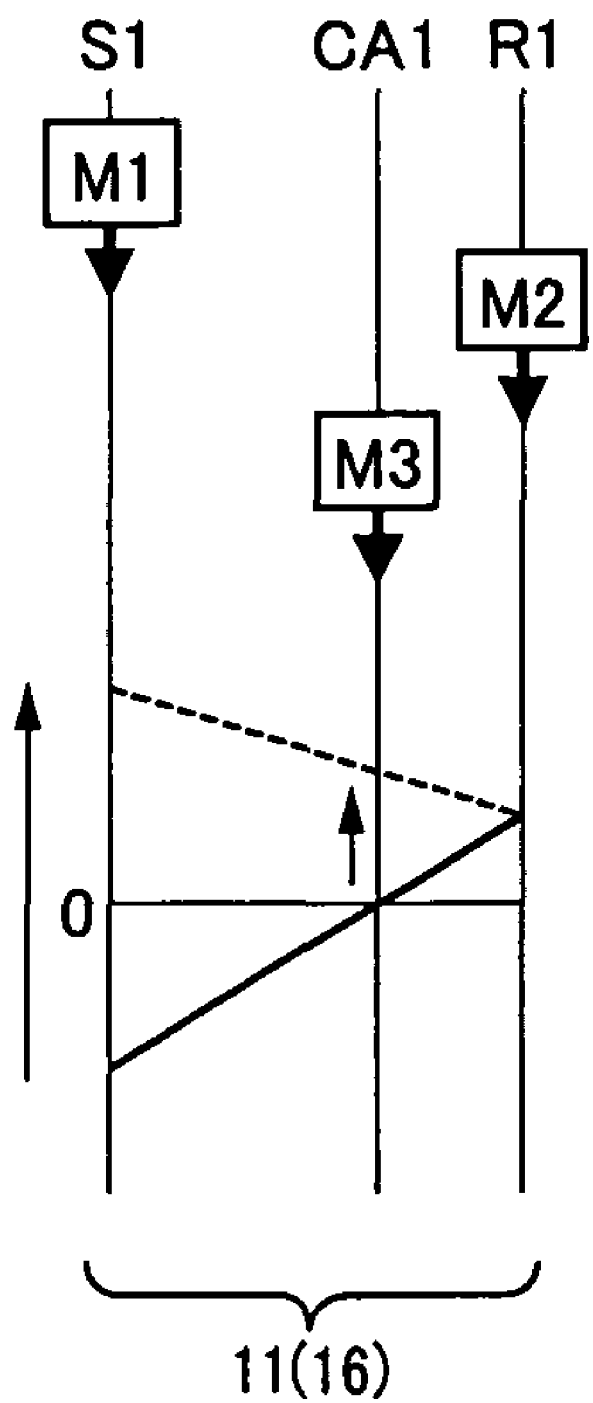
FIG. 10 is a collinear chart, illustrating a rotating state of a differential portion when a drive mode is switched from a motor drive mode to an engine drive mode, which corresponds to the collinear chart shown in FIG. 3 for the differential portion.

FIG. 10 is a collinear chart, representing a rotating state of the differential portion 11 when the motor drive mode is switched to the engine drive mode, which corresponds to the collinear chart for the differential portion 11 shown in FIG. 3. In FIG. 10, solid lines represent rotation speeds of various rotary elements of the differential portion 11 during the motor drive mode. During the motor drive mode, the engine rotation speed NE (a rotation speed of a first carrier CA1) remains zeroed in rotation with the first electric motor M1 caused to freewheel in a reverse direction. In addition, the vehicle is caused to run with the drive force of the second electric motor M2.

Under such a state, when raising the engine rotation speed NE up to a rotation speed available to achieve engine ignition as indicated by a broken line, the engine start method is performed using, for instance, the first and second electric motors M1 and M2. This allows the first electric motor M1 to raise a rotation speed of the first sun gear S1, thereby raising the engine rotation speed NE to the rotation speed available to achieve engine ignition. When this takes place, the first electric motor M1 needs to have torque to raise the rotation speed of the first sun gear S1, and the second electric motor M2 needs to overcome reactive torque of the first electric motor M1 while having a need to have drive torque to run the vehicle.

For the engine start mode by the third electric motor M3, the third electric motor M3 is directly connected to the engine 8 to deliver torque thereto with which the engine rotation speed NE is directly raised up to a rotation speed available to perform engine ignition. In this moment, the first electric motor M1 falls in a freewheeling state and the second electric motor M2 output only drive torque for the running of the vehicle. That is, with the engine start mode using the third electric motor M3, no need arises to overcome reactive torque of the second electric motor M2 during the engine start mode. Thus, output torque of the second electric motor M2 can be taken as drive torque for the motor drive mode. This enables the motor drive mode to be expanded.

The drive-force source start control means 86 allows the startup modes of the engine 8 to be switched to an appropriate method based on various determination results of engine start determining means 87, first-motor state determining means 88 and second-motor state determining means 90.

The engine start determining means 87 makes a query by referring to the shifting diagram shown in FIG. 8 or in accordance with the state of charge SOC of the battery 56 as to whether the engine 8 is to be started up. More particularly, the query is made as to whether the running state of the vehicle moves from the motor drive region to the engine drive region across the boundary line "A" due to an increase in, for instance, output torque $T_{OUT}$ or the vehicle speed V. In an alternative, a query is made as to whether the state of charge SOC of the battery 56 falls below a predetermined lower limit capacity.

The first-motor state determining means 88 detects the rotation speed $N_{M1}$, torque and power of the first electric motor M1 to determine a startup mode of the engine 8 depending on resulting detected values. For instance, when the rotation speed $N_{M1}$ of the first electric motor M1 goes beyond an operating region with a resultant drop in controllability, a determination is made to allow the engine startup method to be switched to the engine startup mode by the third electric motor M3. In contrast, when the rotation speed $N_{M1}$ of the first electric motor M1 falls in the operating region, a determination is made to allow the engine startup method to be switched to another engine startup mode by the first and second electric motors M1 and M2.

Further, if demanded torque of the first electric motor M1 needed for raising the rotation speed of the first sun gear S1 is less than possible torque output of the first electric motor M, then a determination is made to allow the engine startup method to be switched to the engine startup mode by the third electric motor M3. On the contrary, if demanded torque of the first electric motor M1 needed for raising the rotation speed of the first sun gear S1 is greater than possible torque output of the first electric motor M1, then a determination is made to allow the engine startup method to be switched to the engine startup mode by the third electric motor M3.

Furthermore, if power required for the first electric motor M1 to raise the rotation speed of the sun gear S1 is less than a possible power output of the first electric motor M1, then a determination is made to allow the engine startup method to be switched to the engine startup mode by the first and second electric motors M1 and M2. In contrast, if power required for the first electric motor M1 to raise the rotation speed of the sun gear S1 is greater than the possible power output of the first electric motor M1, then a determination is made to allow the engine startup method to be switched to the engine startup mode by the third electric motor M3.

The second-motor state determining means 90 detects the rotation speed $N_{M2}$, torque and power of the second electric motor M2 to determine the startup modes of the engine 8 depending on resulting detected values. When the rotation speed $N_{M2}$ of the second electric motor M2 falls in, for instance, the operating region, a determination is made to allow the engine startup method to be switched to the engine startup mode by the first and second electric motors M1 and M2. In contrast, if the rotation speed $N_{M2}$ of the second electric motor M2 goes beyond the operating region, a determination is made to allow the engine startup method to be switched to another engine startup mode by the third electric motor M3. In addition, since the rotation speed $N_{M2}$ of the second electric motor M2 corresponds to the vehicle speed V, it is assentient? that the engine startup mode is determined based on the vehicle speed V.

Moreover, when a sum of torques including reactive torque needed for the second electric moor M2 to raise the rotation speed of the first electric motor M1, and drive torque used for the motor drive mode is less than the possible torque output of the second electric motor M2, a determination is made to allow the engine startup method to be switched to the engine startup mode by the first and second electric motors M1 and M2. On the contrary, when the sum of torques including reactive torque needed for the second electric moor M2 to raise the rotation speed of the first electric motor M1, and drive torque used for the motor drive mode becomes greater than the possible torque output of the second electric motor M2, a determination is made to allow the engine startup method to be switched to the engine startup mode by the third electric motor M3.

Further, if a sum of powers including power needed for the second electric moor M2 to raise the rotation speed of the first electric motor M1, and drive power used for the motor drive mode is less than a possible power output of the second electric motor M2, a determination is made to allow the engine startup method to be switched to the engine startup mode by the first and second electric motors M1 and M2. On the contrary, if the sum of powers including power needed for the second electric moor M2 to raise the rotation speed of the first electric motor M1, and drive power used for the motor drive mode becomes greater than the possible power output of the second electric motor M2, a determination is made to allow the engine startup method to be switched to the engine startup mode by the third electric motor M3.

Figure 11:
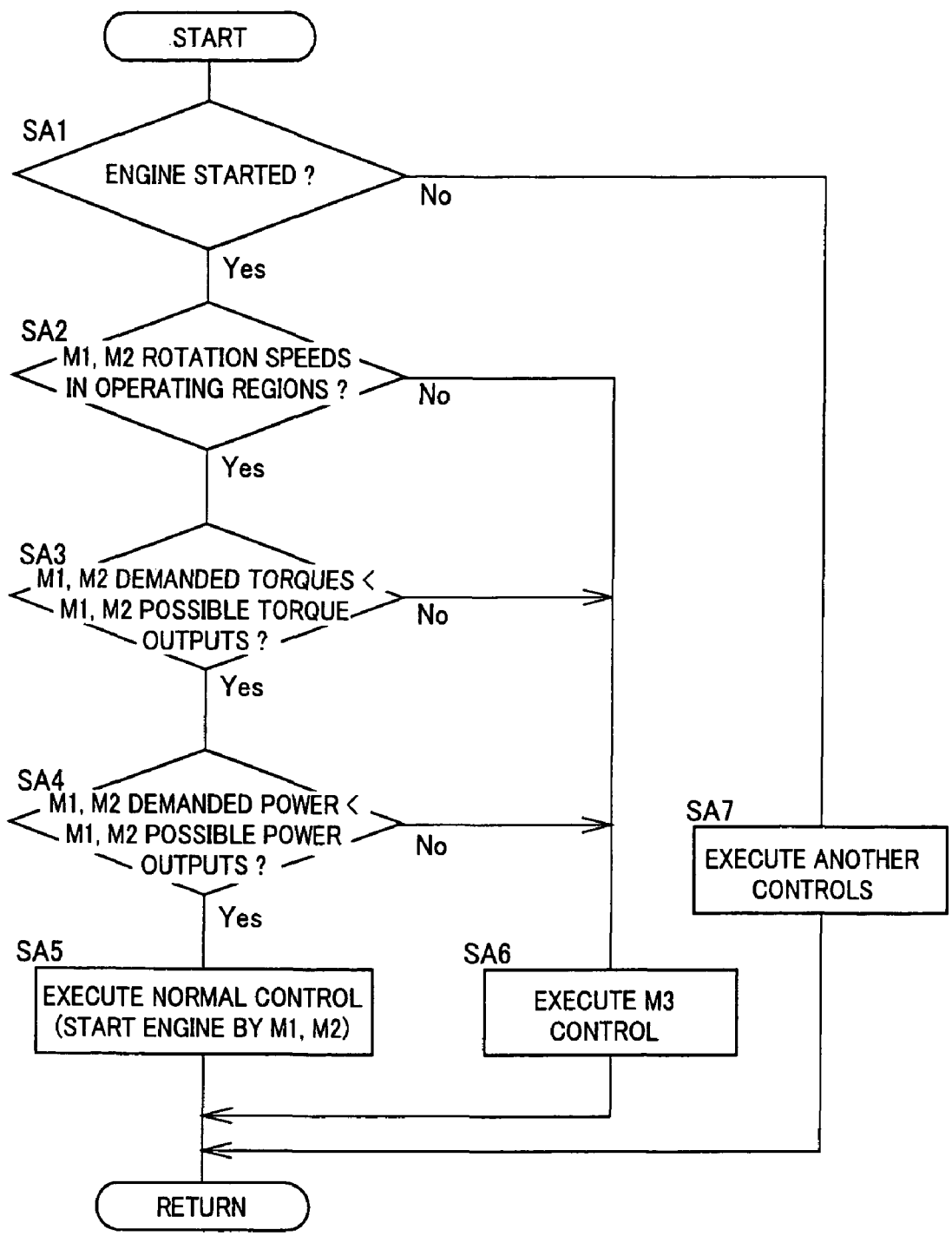
FIG. 11 is a flowchart illustrating a major control operations to be executed with an electronic control device, i.e., control operations to switch engine startup modes depending on a condition of a vehicle.

FIG. 11 is a flow chart, illustrating a basic sequence of major control operation to be executed with the electronic control device 80, i.e., the control operation for switching the engine startup modes depending on the vehicle condition. This basic sequence is repeatedly executed in an extremely short period of time in the order of approximately, for instance, several milliseconds to several tens milliseconds.

First at step SA1 (the term "step" will be omitted hereinafter) corresponding to the engine start determining means 87, a query is made as to whether the motor drive mode is to be switched to the engine drive mode. If the answer is NO at SA1, then the other control is executed at SA7 under the motor drive mode. If the answer is YES at SA1, then at SA2, corresponding to the first and second-motor state determining means 88 and 90, a query is made as to whether the rotation speeds ($N_{M1}$ and $N_{M2}$) of the first and second electric motors M1 and M2 fall in the respective operating regions. If any one of the rotation speeds of the first and second electric motors M1 and M2 go beyond the respective operating regions, then the present determination is negatively made.

Meanwhile, if both the rotation speeds ($N_{M1}$ and $N_{M2}$) of the first and second electric motors M1 and M2 fall in the respective operating regions, then the answer is YES at SA2. Subsequently at SA3 corresponding to the first-motor state determining means 88 and the second-motor state determining means 90, a query is made as to whether demanded torques of the first and second electric motors M1 and M2 are less than the possible torque outputs of the first and second electric motors M1 and M2. If any one of demanded torques of the first and second electric motors M1 and M2 is greater than the possible torque outputs, the present determination is negatively made.

On the contrary, if both demanded torques of the first and second electric motors M1 and M2 are less than the relevant possible torque outputs, the present determination is positively made. Consecutively at SA4 corresponding to the first-motor state determining means 88 and the second-motor state determining means 90, a query is made as to whether demanded powers of the first and second electric motors M1 and M2 are less than the possible power outputs of the first and second electric motors M1 and M2. If any one of demanded powers of the first and second electric motors M1 and M2 is greater than the possible power outputs, then the present determination is negatively made. If the answers are YES at all of SA2, SA3 and SA4, then at SA5 corresponding to the drive-force source start control means 86, a normal engine startup control is executed. In particular, the engine startup mode by the first and second electric motors M1 and M2 is selected and executed in operation.

In contrast, if any one of SA2, SA3 and SA4 is negatively made, then at SA6 corresponding to the drive-force source start control means 86, the engine startup control by the third electric motor M3 is selected and executed in operation.

Figure 12:
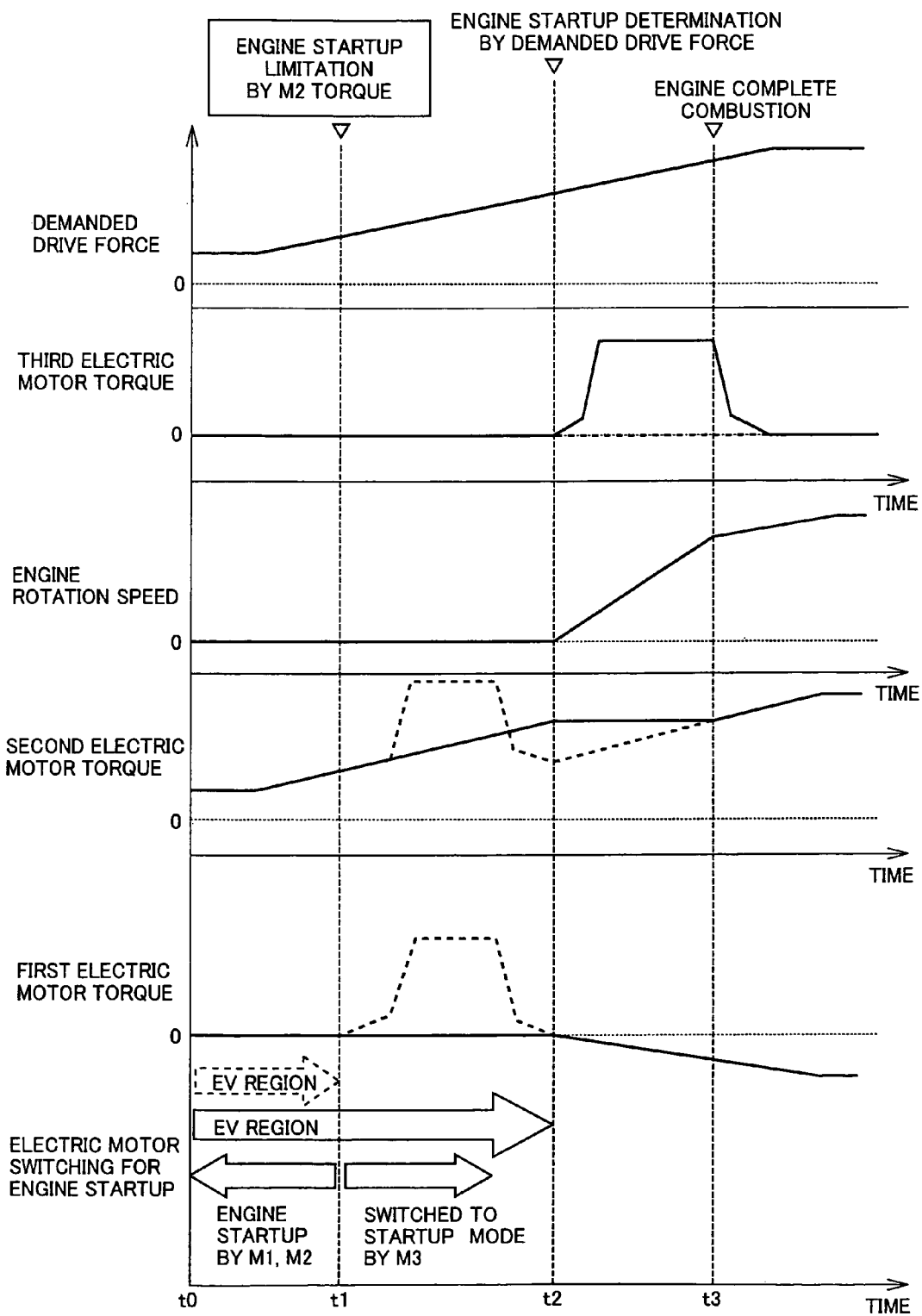
FIG. 12 is a timing chart, illustrating the major control operation to be executed with the electronic control device in accordance with the flow chart shown in FIG. 11, representing an exemplary condition under which the motor drive mode is switched to the engine drive mode with an accelerator pedal being depressed.

FIG. 12 is a timing chart, illustrating the control operation to be executed with the electronic control device 80 by referring to the flow chart shown in FIG. 11, which represents a condition under which the motor drive mode is switched to the engine drive mode with, for instance, the accelerator pedal being depressed. With the accelerator pedal being depressed, during a period from time t0 to time t1, a determination is made to allow the engine drive mode to be selected. Thus, the engine startup is initiated by the first and second electric motors M1 and M2.

At time t1, if the second-motor state determining means 90 determines that for instance the possible torque output of the second electric motor M2 is less than demanded torque required for the engine startup to be initiated, then at time t1 and later, the engine startup mode is selected to be initiated by the third electric motor M3. At time t2, for instance, if a determination is positively made to initiate engine startup, then the torque control of the third electric motor M3 is executed to raise the engine rotation speed NE. In this moment, if the engine rotation speed NE is raised to a rotation speed available to initiate engine ignition, then the engine 8 accomplishes a complete combustion. After the complete combustion is accomplished in the engine 8, the torque control of the third electric motor M3 is completed.

At time t1 and later, here, by selecting the engine startup mode by the third electric motor M3, the motor drive region (EV region), remained in a period from time t0 to time t1 with the conventional art as indicated by a broken line, is extended in time to continue even at time t1 and later to expand the motor drive region (EV region).

As set forth above, the present embodiment incorporates the drive-force source start control means 86 to switch the startup modes of the engine 8 depending on the vehicle condition. This results in startup of the engine 8 in an appropriate startup mode depending on the vehicle condition, thereby precluding the drive region of the second electric motor M2 from being contracted.

With the present embodiment, further, the drive-force source start control means 86 selectively switches the startup modes of the engine 8 to either the startup mode by the first and second electric motors M1 and M2 or the engine startup mode by the third electric motor M3. This enables the engine 8 to be started up in an appropriate startup mode depending on the vehicle condition.

With the present embodiment, furthermore, the drive-force source start control means 86 selectively switches the startup modes of the engine 8 depending on the rotation speed $N_{M1}$ or power of the first electric motor M1. This enables the engine 8 to be started up in an appropriate startup mode depending on the condition described above. For instance, during the engine startup by the first and second electric motors M1 and M2, if the rotation speed $N_{M1}$ of the first electric motor M1 is deviated from the operating region, then the operation is executed to perform the engine startup by the third electric motor M3. In addition, if torque and power output of the first electric motor M1 are less than torque or power required for the first electric motor M1 to perform the engine startup, then the operation is executed to perform the engine startup by the third electric motor M3.

With the present embodiment, moreover, the drive-force source start control means 86 selectively switches the startup modes of the engine 8 depending on the rotation speed $N_{M2}$ or power of the second electric motor M2. This enables the engine 8 to be started up in an appropriate startup mode depending on the condition mentioned above. For instance, during the engine startup by the first and second electric motors M1 and M2, if the rotation speed $N_{M2}$ of the second electric motor M2 goes beyond the operating range, then the operation is executed to perform the engine startup by the third electric motor M3. In addition, if torque and power output of the second electric motor M2 are less than the possible torque output or the possible power output of the second electric motor M2, then the operation is executed to perform the engine startup by the third electric motor M3.

With the present embodiment, further, the power distributing mechanism (differential portion 11) is comprised of the first planetary gear set 24, which has the first sun gear S1 connected to the first electric motor M1, the first ring gear R1 connected to the second electric motor M2 and the first carrier CA1 connected to the third electric motor M3. With such a structure, the first and second electric motors M1 and M2 can raise the rotation speed NE of the engine 8 and, in addition thereto, the third electric motor M3 can raise the rotation speed NE of the engine 8. This enables the startup mode of the engine 8 by the first and second electric motors M1 and M2 and the startup mode of the engine 8 by the third electric motor M3 to be selectively switched.

Next, description is made of another embodiments according to the present invention. In the following description, the component parts common to various embodiments bear like reference numerals to omit redundant description.

Second Embodiment

Figures 13, 14:
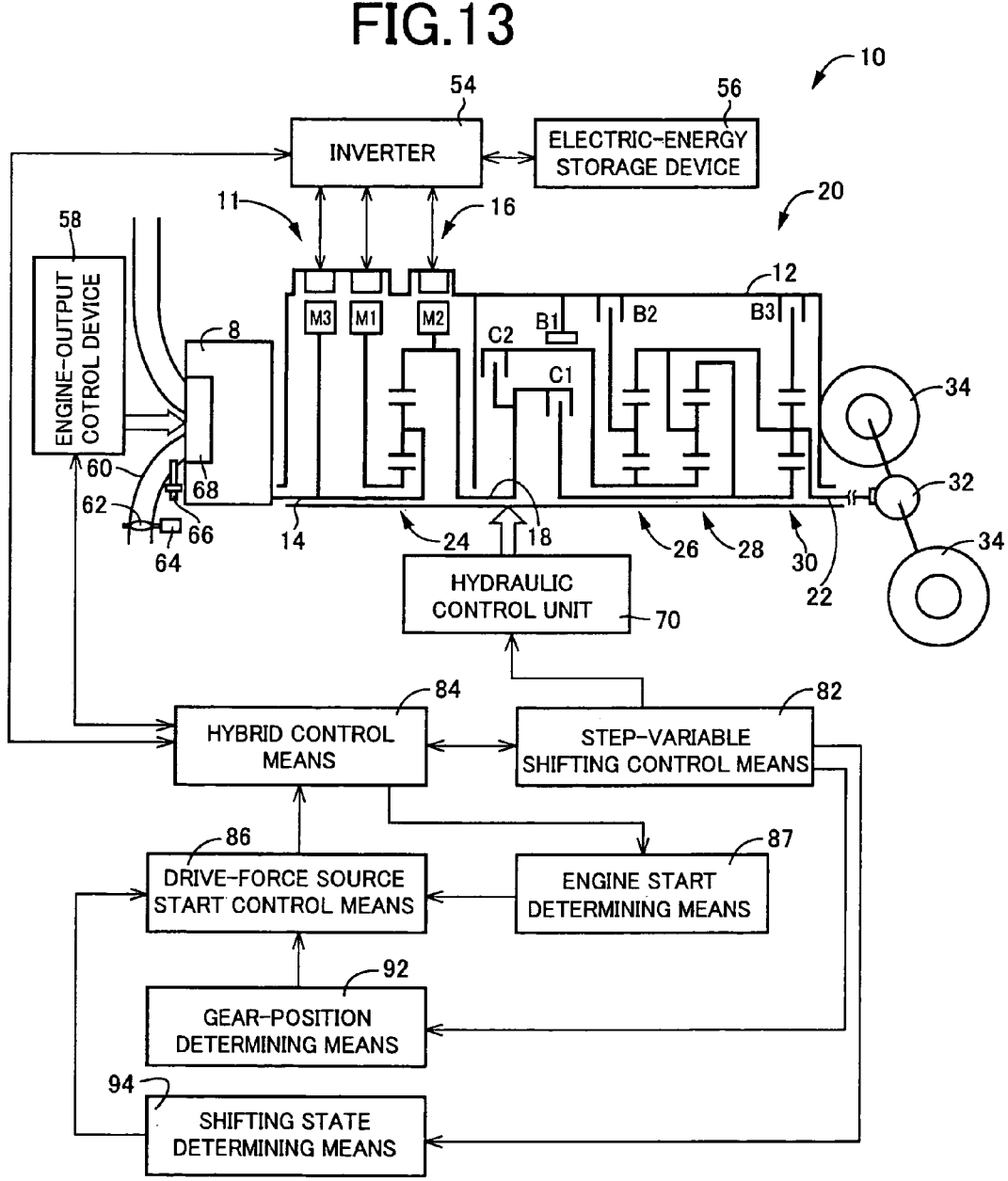
FIG. 13 is a functional block diagram illustrating a major control function to be executed by the electronic control device in another embodiment of the present invention.
FIG. 14 is a Table representing the relationship between gear positions (gear ratios) and operating modes of an electric motor used upon starting up an engine.

In the present embodiment, the drive-force source start control means 86 appropriately switches the engine startup modes depending on a gear position (gearshift position), i.e., a gear ratio (gearshift ratio) of the automatic shifting portion 20. In addition, since the present embodiment has the same mechanical structure as that of the first embodiment in a skeletal frame view, description of the same is herein omitted. FIG. 13 is a functional block diagram illustrating a major control function of an electronic control device 80 of the present embodiment according to the present invention.

Gear-position determining means 92 detects a gear position of the automatic shifting portion 20 for determining whether the relevant gear position belongs to one of a 1st-speed gear position to a 3rd-speed gear position, reverse drive gear position and a 4th-speed gear position. If the relevant gear position is found to belong to the 4th-speed gear position, then drive-force source start control means 86 renders the first and second electric motors M1 and M2 operative to start up the engine 8. Meanwhile, if the relevant gear position is found to belong to one of the 1st-speed gear position to the 3rd-speed gear position or the reverse drive gear position, then the drive-force source start control means 86 renders the third electric motor M3 operative to start up the engine 8.

FIG. 14 is a table representing the relationship between the gear positions (gear ratios) and the electric motors to be used when starting up the engine. As will be apparent from FIG. 14, under a situation where the automatic shifting portion 20 has a relatively high gear ratio, the engine startup mode is selected to be initiated by the third electric motor M3. With the automatic shifting portion 20 having a low gear ratio, the engine startup mode is selected to be initiated by the first and second electric motors M1 and M2.

During engine startup by the first and second electric motors M1 and M2, the second electric motor M2 is subjected to torque control with the occurrence of resultant fluctuating torque. This fluctuating torque is transferred to the drive wheels 34 via the automatic shifting portion 20 with an increased likelihood of causing shocks to occur during the engine startup. Particularly, as the gear ratio of the automatic shifting portion 20 increases, there is an increase in shocks to be transferred to the drive wheels 34. To address such an issue, with the automatic shifting portion 20 having the gear position in a relatively high gear ratio, the third electric motor M3 is rendered operative to start up the engine 8. In moment, no output torque is delivered from the third electric motor M3 to the automatic shifting portion 20, thereby alleviating the occurrence of such socks.

FIG. 15 is a flow chart for illustrating a basic sequence of major control operation to be executed with the electronic control device 80 of the present embodiment, i.e., the control operation for switching the engine startup modes depending on the vehicle condition.

First, at SA1 corresponding to the engine start determining means 87, if a determination is made to start up the engine 8, then at SA10 corresponding to gear-position determining means 92, a query is made as to whether the gear position of the automatic shifting portion 20 belongs to the 4th-speed gear position in a high-speed gear position. If the answer is YES at SA10, then at SA5 corresponding to the drive-force source start control means 86, the engine startup is conducted using the first and second electric motors M1 and M2. On the contrary, if the answer to SA10 is NO, then at SA6 corresponding to the drive-force source start control means 86, the engine startup is conducted using the third electric motor M3.

With the present embodiment, as set forth above, the drive-force source start control means 86 switches the startup modes of the engine 8 depending on the gear ratio of the automatic shifting portion 20. This enables the engine 8 to be started up in an appropriate method depending on the gear ratio. If the engine 8 is started up using the first and second electric motors M1 and M2 with the automatic shifting portion 20 having, for instance, the high gear ratio, fluctuation in torque of the second electric motor M2 increases. Such fluctuating torque is transferred to the drive wheels 34 with the resultant increase in shocks. Under such a situation, causing the third electric motor M3 to start up the engine 8 minimizes the occurrence of shocks.

Third Embodiment

With the present embodiment, the drive-force source start control means 86 properly switches the startup modes of the engine 8 to execute the same depending on a shifting condition of the automatic shifting portion 20. In particular, the drive-force source start control means 86 properly switches the startup modes of the engine 8 for executing the same depending on whether the automatic shifting portion 20 is under a shifting operation or whether the engaging elements of the automatic shifting portion 20 remain engaged.

In the functional block diagram shown in FIG. 13, shifting state determining means 94 makes a query as to whether the automatic shifting portion 20 is under a shifting control or whether the engaging elements of the automatic shifting portion 20 remain disengaged, i.e., whether the power transmitting path between the differential portion 11 and the drive wheels 34 is interrupted. Then, if the automatic shifting portion 20 is under the non-shifting operation or the engaging elements of the automatic shifting portion 20 remain engaged (under a power transmissive state), then the engine startup is conducted using the first and second electric motors M1 and M2. In contrast, if the automatic shifting portion 20 is under the shifting operation or the engaging elements of the automatic shifting portion 20 remain disengaged (under a power interrupting state), the drive-force source start control means 86 initiates the engine startup by the electric motor M3.

FIG. 16 is another flow chart illustrating a basic sequence of major control operation to be executed with an electronic control device 80 of the present embodiment, i.e., the control operation for switching the engine startup modes depending on the vehicle condition.

First, at SA1 corresponding to the engine start determining means 87, if a determination is made to start up the engine 8, then at SA20 corresponding to the shifting state determining means 94, a query is made as to whether the automatic shifting portion 20 is under the shifting operation or whether the engaging elements of the automatic shifting portion 20 remain disengaged. If the answer to SA20 is NO, then at SA5 corresponding to the drive-force source start control means 86, the engine startup is initiated by the first and second electric motors M1 and M2. On the contrary, if the answer to SA20 is YES, then at SA6 corresponding to the drive-force source start control means 86, then the engine startup is conducted by the electric motor M3.

Figure 17:
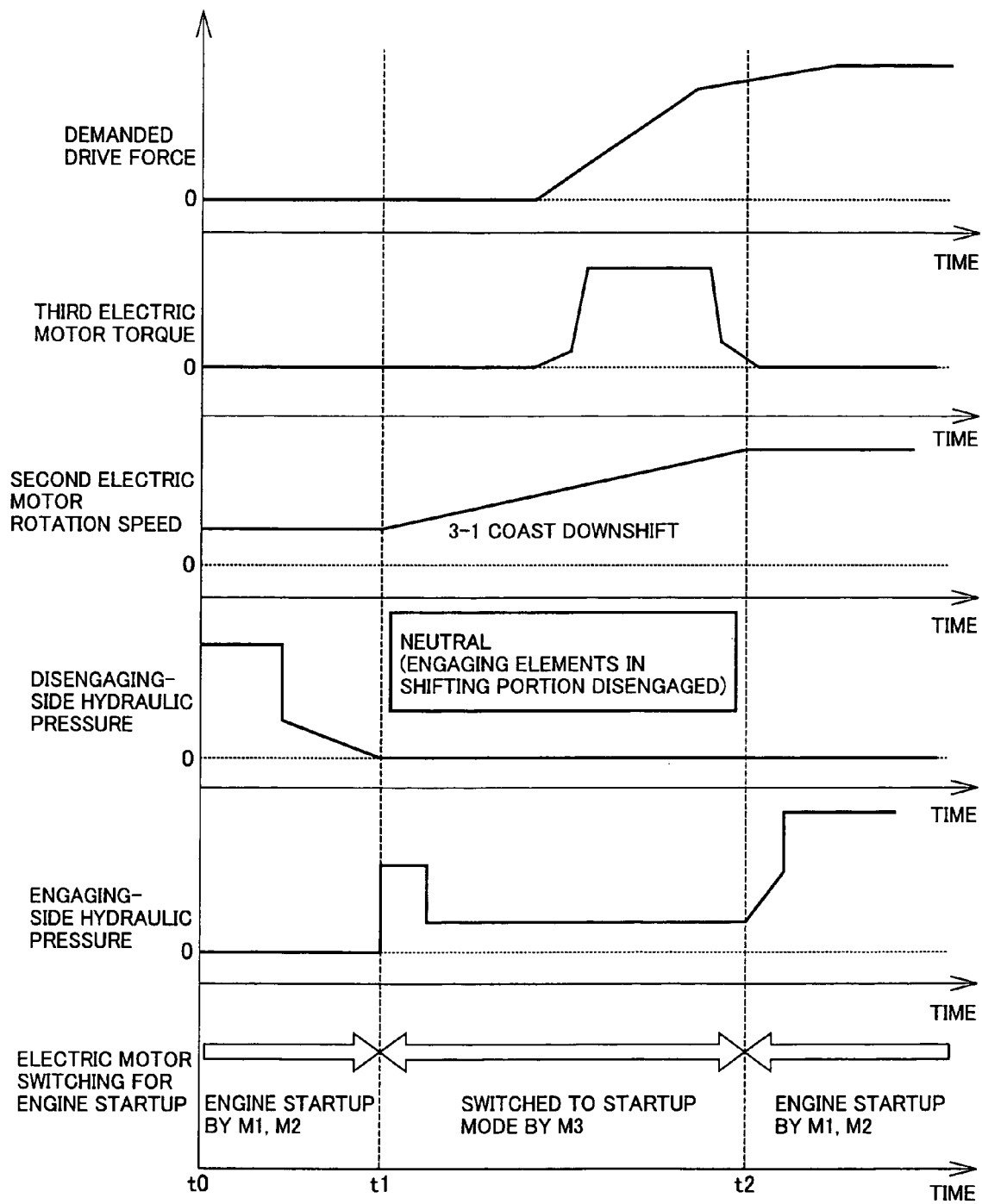
FIG. 17 is a timing chart, illustrating the basic sequence of major control operation to be executed with the electronic control device in accordance with the flow chart shown in FIG. 16.

FIG. 17 is a timing chart, illustrating a basic sequence of control operation to be executed with the electronic control device 80 by referring to the flow chart shown in FIG. 16, which represents a condition under which the engine startup is conducted with the accelerator pedal being depressed during a coast downshift form, for instance, the 3rd-speed gear position to the 1st-speed gear position. During a period from time t0 to time t1, a hydraulic pressure, applied to a disengaging-side engaging element (first brake B1) for the 3rd-speed gear position, is lowered and zeroed at time t1. When starting up the engine 8 during the period from time t0 to time t1, the engine 8 is started up using the first and second electric motors M1 and M2.

Then, at time t1, if the engaging elements of the automatic shifting portion 20 are brought into disengaged states (under a neutral state), the engine startup method is switched to a mode by the third electric motor M3. When starting up the engine 8 during the period from time t0 to time t1 under, for instance, the neutral state, the engine 8 is started up with the third electric motor M3. Further, at time t2, if an engaging hydraulic pressure of an engaging-side engaging element of the automatic shifting portion 20 begins to increase, then the automatic shifting portion 20 has a transfer torque capacity. At time t2 and later, when initiating the engine startup, the engine startup mode is switched to be initiated by the first and second electric motors M1 and M2.

The timing chart, shown in FIG. 17, represents a case in which the startup modes of the engine 8 are switched depending on whether the engaging elements of the automatic shifting portion 20 remain disengaged (under the neutral state). The startup mode of the engine 8 is determined depending on whether or not the automatic shifting portion 20 is under the shifting operation. During a period from time at which the disengaging-side hydraulic pressure of the automatic shifting portion 20 begins to decrease to another time at which the increase in the engaging-side hydraulic pressure is completed, the engine is started up by the electric motor M3.

As the engine 8 is started up by the first and second electric motors M1 and M2 when the automatic shifting portion 20 remains under the neutral state (power interrupting state), a drive load delivered from the drive wheels 34 to the second electric motor M2 remaining under the regenerative control may disappear. Therefore, deterioration occurs in controllability of the second electric motor M2 under torque control for causing the first electric motor M1 to generate reactive force. Under such a situation, starting up the engine 8 by the third electric motor M3 enables the engine startup to be immediately performed.

With the present embodiment, as set forth above, the drive-force source start control means 86 switches the startup modes of the engine 8 depending on the shifting state of the automatic shifting portion 20, enabling the engine 8 to be started up in an appropriate method depending on the shifting state. During the shifting operation, for instance, deterioration occurs in controllability of the second electric motor M2 connected to the power transfer member 18. Therefore, if the engine 8 is started up by the first and second electric motors M1 and M2, there is a fear of the occurrence of causing deterioration in startability of the engine 8. In such a case, starting up the engine 8 by the third electric motor M3 can suppress deterioration in the startability of the engine 8.

With the present embodiment set forth above, further, the drive-force source start control means 86 switches the startup modes of the engine 8 depending on the engaging state of the engaging element of the automatic shifting portion 20, enabling the engine 8 to be started up in an appropriate method depending on the engaging state of the engaging element. For instance, if the engine 8 is started up by the first and second electric motors M1 and M2 with the engaging element of the automatic shifting portion 20 remaining disengaged, then deterioration may occur in startability of the engine 8. In such a case, starting up the engine 8 by the third electric motor M3 can suppress deterioration in the startability of the engine 8.

Fourth Embodiment

With the present embodiment, the drive-force source start control means 86 switches the startup modes of the engine 8 depending on a temperature THG of a high-voltage system battery 57 from which electric power is supplied to the first and second electric motors M1 and M2. Here, the high-voltage system battery 57 corresponds to the battery of the present invention.

Figures 18, 19:
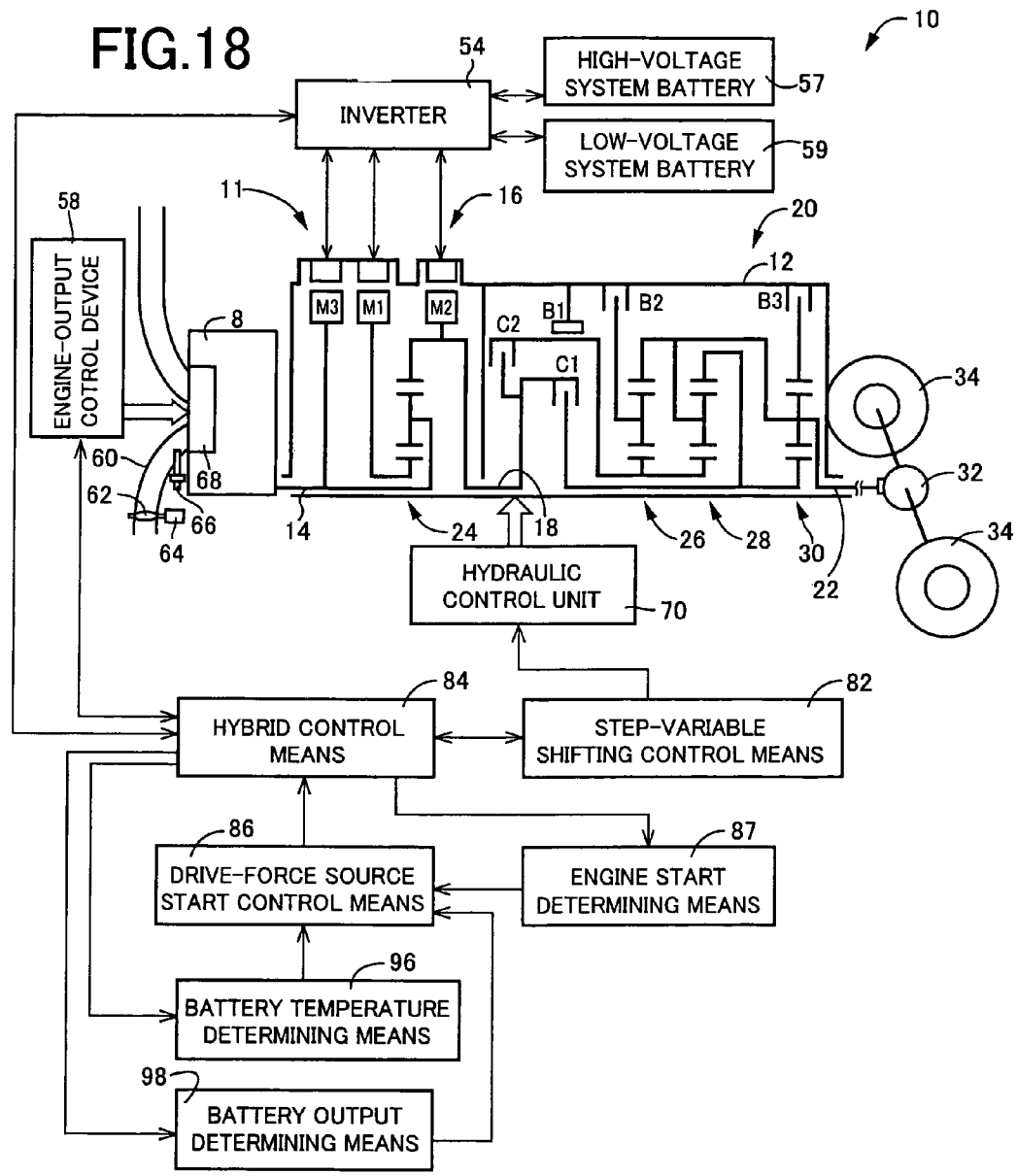
FIG. 18 is a functional block diagram illustrating a major control operation to be executed by the electronic control device in another embodiment of the present invention.
FIG. 19 is a view representing the relationship between electric motors to be used for starting up the engine and operating temperatures of a battery.

FIG. 18 is the functional block diagram illustrating major control operation to be executed with the electronic control device 80 of the another embodiment according to the present invention. Battery temperature determining means 96 detects the temperature THG of the high-voltage system battery 57 arranged to supply the first and second electric motors M1 and M2 with electric power. Then, a query is made as to whether the temperature THG remains in a predetermined temperature range that is predetermined. As shown in FIG. 19, for instance, the predetermined temperature range is preset in a value ranging from −10° C. to 120° C.

Further, it is determined such that when the temperature THG of the battery 57 is deviated from the predetermined temperature range, electric power to be supplied from the battery 57 is limited. If an attempt is made to start up the engine 8 by the first and second electric motors M1 and M2 under a condition in which electric power is limited, the first and second electric motors M1 and M2 cannot provide adequate torque outputs for starting up the engine 8, resulting in a fear with the occurrence of causing deterioration in controllability. Under such a situation, the drive-force source start control means 86 allows the engine 8 to be started up using the third electric motor M3. Also, the third electric motor M3 is supplied with electric power from a low-voltage system battery 59, which is determined to be normally usable in a range wider than that of the limitation related to the temperature of the high-voltage system battery 57.

FIG. 20 shows another flow chart illustrating major control operation to be executed with the electronic control device 80 of the present embodiment, i.e., the control operation to be executed for switching the engine startup modes depending on a vehicle condition.

First, at SA1 corresponding to the engine start determining means 87, a determination is made to start up the engine 8. Then, at SA30 corresponding to the battery temperature determining means 96, a query is made as to whether the temperature THG of the high-voltage system battery 57 remains in the predetermined temperature range. If the answer to SA30 is YES, then at SA5 corresponding to the drive-force source start control means 86, the engine startup is conducted by the first and second electric motors M1 and M2. In contrast, if the answer to SA30 is NO, then at SA6 corresponding to the drive-force source start control means 86, the engine startup is conducted by the third electric motor M3.

With the present embodiment, as set forth above, the drive-force source start control means 86 switches the startup modes of the engine 8 depending on the temperature THG of the high-voltage system battery 57 supplying electric power to the first and second electric motors M1 and M2. This enables the engine 8 to be started up in an appropriate method depending on the temperature THG of the high-voltage system battery 57.

For instance, when the temperature THG of the high-voltage system battery 57 lies in the predetermined temperature range, the high-voltage system battery 57 has limitations in a discharging amount and a charging amount. Under such limitations, selecting the engine startup mode by the third electric motor M3, supplied with electric power from the low-voltage system battery 59, enables the engine 8 to be immediately started up. In addition, it is assigned that the first and second electric motors M1 and M2 are supplied with electric power from the high-voltage system battery 57, and the third electric motor M3 is supplied electric power from the low-voltage system battery 59.

Fifth Embodiment

In the present embodiment, the drive-force source start control means 86 switches the startup modes of the engine 8 depending on an electric power output of the high-voltage system battery 57 supplying electric power to the first and second electric motors M1 and M2.

In the functional block diagram shown in FIG. 18, battery output determining means 98 makes a query as to whether the power output of the battery 57 is limited due to, for instance, a remnant state of charge SOC of the battery 57. If, for instance, the state of charge SOC becomes less than a predetermined amount, the maximum value of the power output of the battery 57 is limited. Under such a status, if the engine 8 is started up with the first and second electric motors M1 and M2, then the first and second electric motors M1 and M2 cannot output torques at rates required for starting up the engine 8 with resultant deterioration in controllability. Therefore, when the power output of the battery 57 is limited within a predetermined value, the drive-force source start control means 86 allows the engine 8 to be started up with the third electric motor M3. As shown in FIG. 21, for instance, if the power output of the battery 57 is limited to a value below 10 kw, then the drive-force source start control means 86 allows the engine 8 to be started up with the third electric motor M3.

Figure 22:
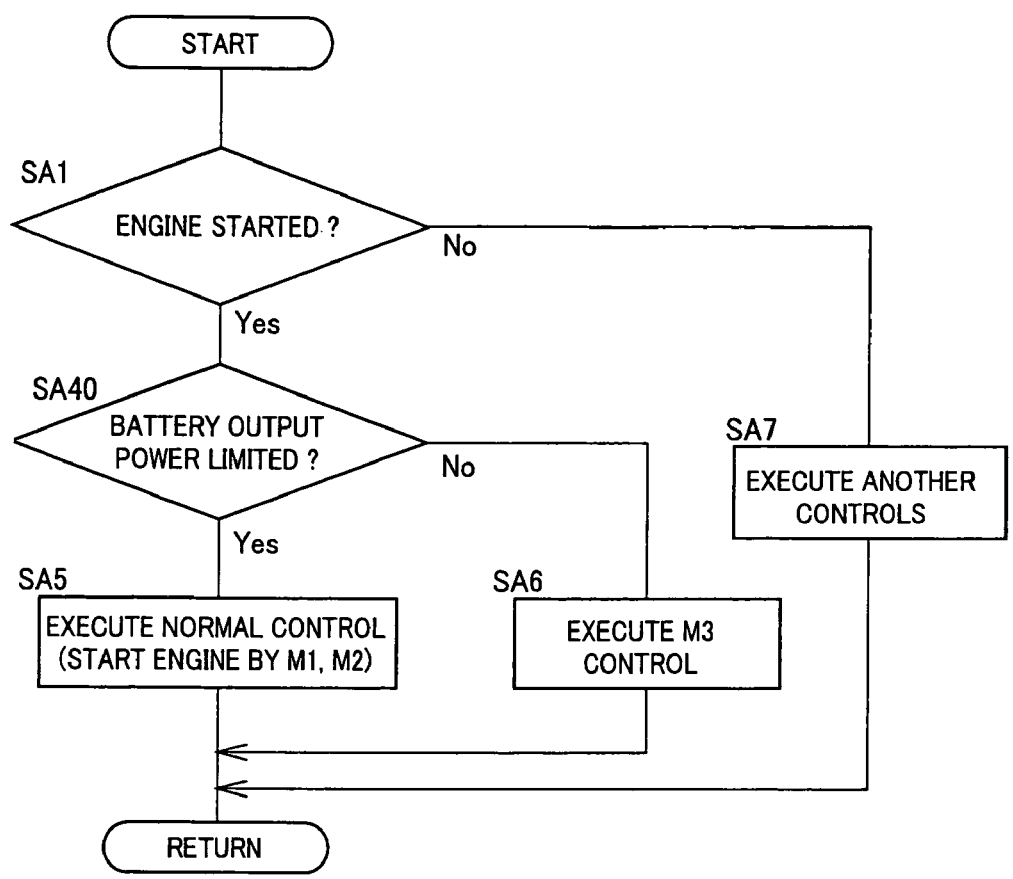
FIG. 22 is a flowchart illustrating a major control operation to be executed with an electronic control device of the present invention, i.e., a control operation to switch engine startup modes depending on a condition of a vehicle.

FIG. 22 is a flow chart illustrating a basic sequence of major control operation to be executed with an electronic control device 80 of the present embodiment, i.e., the control operation for switching the engine startup modes depending on the vehicle condition.

First, at SA1 corresponding to the engine start determining means 87, a determination is made to start up the engine 8. Subsequently, at SA40 corresponding to the battery output determining means 98, a query is made as to whether the power output of the battery 57 is limited within the predetermined value. If the answer to SA40 is NO, then at SA5 corresponding to the drive-force source start control means 86, the engine startup is initiated by the first and second electric motors M1 and M2. On the contrary, if the answer to SA40 is YES, then at SA6 corresponding to the drive-force source start control means 86, the engine startup is initiated by the third electric motor M3.

With the present embodiment, as set forth above, the drive-force source start control means 86 switches the startup modes of the engine 8 depending on the electric power output of the battery 57 supplying electric power to the first and second electric motors M1 and M2. This enables the engine 8 to be started up in an appropriate method depending on the power output of the battery 57. For instance, if no electric power is supplied from the battery 57 or if the power output is limited, the engine startup mode is conducted by the third electric motor M3 supplied with electric power from the low-voltage system battery 59, thereby enabling the engine 8 to be started up.

Sixth Embodiment

In the present embodiment, the drive-force source start control means 86 switches the startup modes of the engine 8 to an appropriate mode depending on a shifting range. FIG. 23 is a functional block diagram illustrating major control operation to be executed with the present embodiment according to the present invention. Shift range determining means 100 executes the operation based on an operated position of a shift lever 52 of a shift operation device 50 to make a query as to whether a shift range remains in a shift range other than an "N" range. Then, the drive-force source start control means 86 allows the engine startup to be initiated by the first and second electric motors M1 and M2 when the shift range remains in the shift range other than the "N" range.

With the present embodiment, as shown in FIG. 24, with a view to precluding the first electric motor M1 or the second electric motor M2 from reaching a high-speed rotation, the first and second electric motors M1 and M2 are permitted in use if the shift range remains in the position other than the "N" range. Meanwhile, it is determined such that if the shift lever remains in the "N" range, then the use of the first and second electric motors M1 and M2 is inhibited. With the shift lever remained in the "N" range, the engine 3 is started up by the third electric motor M3. This enables the engine 8 to be started up without causing the first and second electric motors M1 and M2 to rotate at a high speed.

Figures 25, 26:
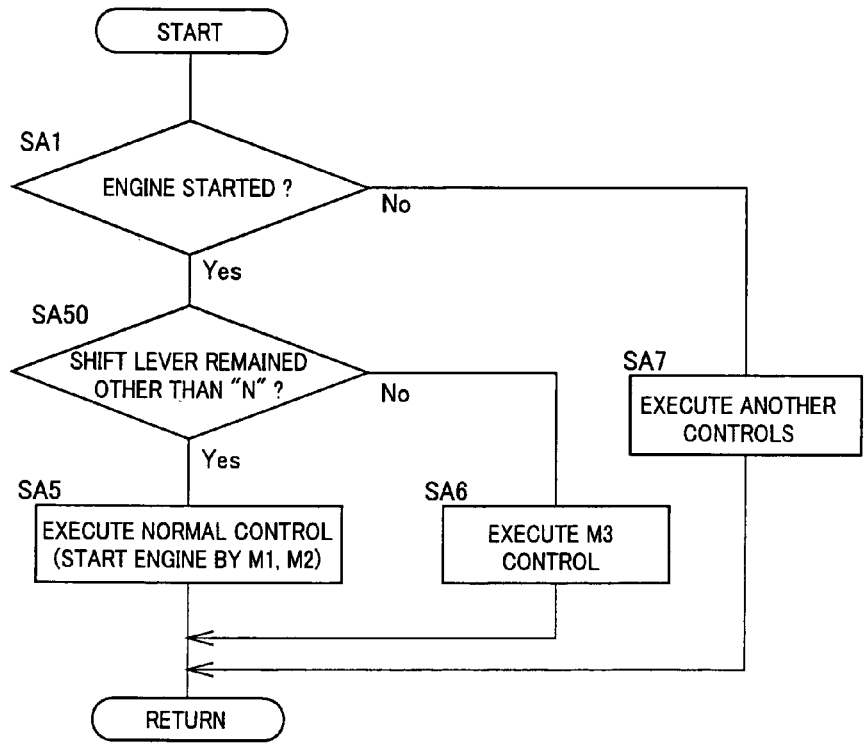
FIG. 25 is a flowchart illustrating a major control operation to be executed with an electronic control device of the present invention, i.e., a control operation to switch engine startup modes depending on a condition of a vehicle.
FIG. 26 is a view representing the relationship between electric motors to be used for starting up the engine and low voltage and high voltage systems.

FIG. 25 is a flow chart illustrating major control operation to be executed with the electronic control device 80 of the present embodiment, i.e., the control operation to be executed for switching the engine startup modes depending on the vehicle condition.

First, at SA1 corresponding to the engine start determining means 87, a determination is made to start up the engine 8. Then, at SA50 corresponding to the shift range determining means 100, a query is made as to whether the shift lever remains in a shift range other than the "N" range. If the answer to SA50 is YES, i.e., when the shift range is placed in the range except for the "N" range, then at SA5 corresponding to the drive-force source start control means 86, the engine startup is initiated by the first and second electric motors M1 and M2. On the contrary, if the answer to SA50 is NO, then at SA6 corresponding to the drive-force source start control means 86, the engine startup is initiated by the third electric motor M3.

With the present embodiment, as set forth above, the drive-force source start control means 86 switches the startup modes of the engine 8 depending on the selected shift range. This enables the engine 8 to be started up in an appropriate method depending on the selected shift range. If the shift range remains in, for instance, the neutral range ("N" range), then there is a fear of the occurrence of causing the first and second electric motors M1 and M2 to reach a high-speed rotation. When this takes place, switching the engine startup mode by the third electric motor M3 enables the engine 8 to be started up without causing the first and second electric motors M1 and M2 from reaching the high-speed rotation.

Seventh Embodiment

With the present embodiment, the drive-force source start control means 86 switches the startup modes of the engine 8 to an appropriate method depending on a failure or deterioration in function of electric motor control equipment. In the functional block diagram shown in FIG. 23, high-voltage system failure determining means 102 makes a query as to whether a failure is detected in an electrical circuit for a high voltage system involving the first and second electric motors M1 and M2. FIG. 26 shows a switching condition for the engine startup plotted on a Table. For instance, if the high voltage system remains in a normal state, then the engine 8 is started up by the first and second electric motors M1 and M2. On the contrary, if a failure is detected in the high voltage system, then the engine 8 is started up by the third electric motor M3.

Figure 27:
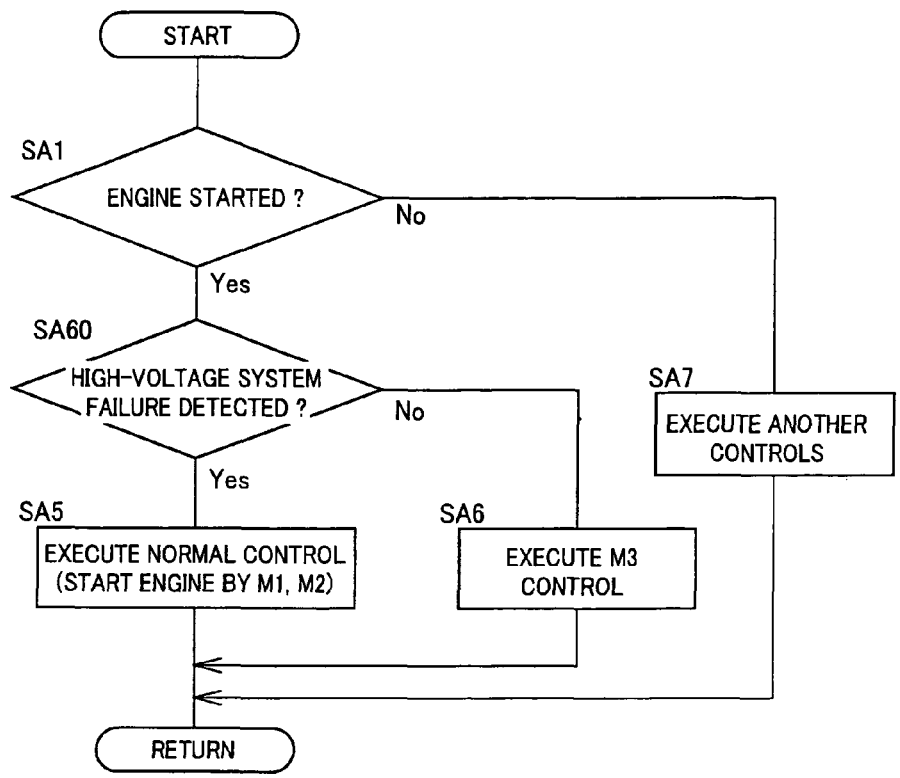
FIG. 27 is another flowchart illustrating major control operation to be executed with an electronic control device of the present invention, i.e., the control operation to switch engine startup modes depending on a condition of a vehicle.

FIG. 27 is a flow chart illustrating major control operation to be executed with the electronic control device 80 of the present embodiment, i.e., the control operation to be executed for switching the engine startup modes depending on the vehicle condition.

First, at SA1 corresponding to the engine start determining means 87, a determination is made to start up the engine 8. Subsequently, at SA60 corresponding to the high-voltage system failure determining means 102, a query is made as to whether a failure or deterioration in function is detected in the electric motor control equipment of the high voltage system. If the answer to SA60 is NO, i.e., at SA5 corresponding to the drive-force source start control means 86, the engine startup is initiated by the first and second electric motors M1 and M2. On the contrary, if the answer to SA60 is YES, then at SA6 corresponding to the drive-force source start control means 86, the engine startup is initiated by the third electric motor M3.

With the present embodiment, as set forth above, the drive-force source start control means 86 switches the startup modes of the engine 8 depending on the deteriorated function caused in the electric motor control equipment of the high voltage system. This enables the engine 8 to be started up depending on the resulting deteriorated function. For instance, when a failure is detected in the electric motor control equipment of the high voltage system, switching the engine startup mode by the third electric motor M3 makes it possible to start up the engine 8.

Eighth Embodiment

Figure 28:
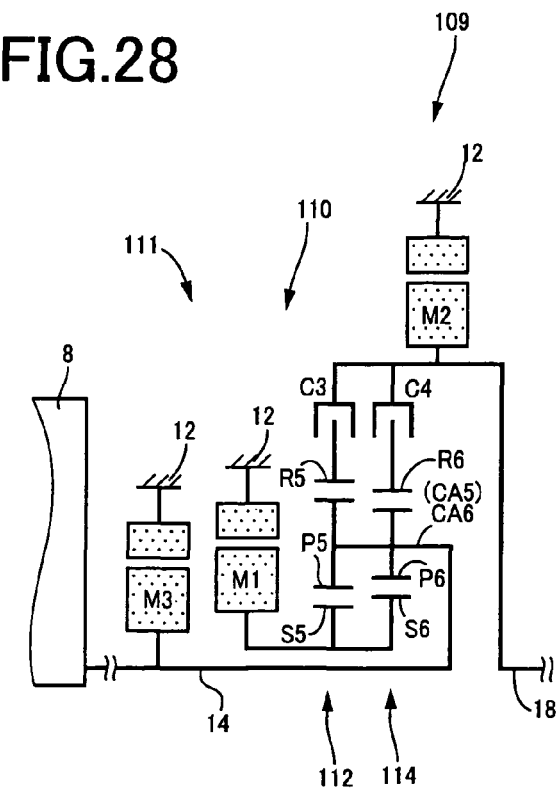
FIG. 28 is another skeleton view showing a differential portion of a shifting mechanism with an enlarged scale applied to the present invention.

With the present embodiment, the drive-force source start control means 86 switches the startup modes of the engine 8 depending on a varying rate of the rotation speed of the first electric motor M1 during a startup control of the engine 8. FIG. 28 is a skeleton view showing a differential portion 110 of a shifting mechanism 109 in an enlarged scale to be applied to the present embodiment. Also, the shifting portion provided in a rear stage of the power transmitting member 18 having the same structure as that of the automatic shifting portion 20, is omitted herein. In addition, the shifting mechanism 109 of the present embodiment corresponds to the vehicle power transmitting apparatus of the present invention, and the differential portion 110 corresponds to the electrically controlled differential portion of the present invention.

A power distributing mechanism 111, corresponding to the differential mechanism of the present invention, mainly includes a fifth planetary gear unit 112 of a single pinion type having a predetermined gear ratio ρ5, a sixth planetary gear unit 114 of a single pinion type having a predetermined gear ratio ρ6, and third and fourth clutches C3 and C4 composed of hydraulic type friction engaging elements, respectively. The fifth planetary gear unit 112 includes rotary elements (elements) such as a fifth sun gear S5, fifth planetary gears P5, a fifth carrier CA5 supporting the fifth planetary gears P5 so as to cause the same to rotate on their axes and revolve, and a fifth ring gear R5 held in meshing engagement with the fifth sun gear S5 via the fifth planetary gears P5.

The sixth planetary gear unit 114 includes rotary elements (elements) such as a sixth sun gear S6, sixth planetary gears P6, a sixth carrier CA6 supporting the sixth planetary gears P6 so as to cause the same to rotate on their axes and revolve, and a sixth ring gear R6 held in meshing engagement with the sixth sun gear S6 via the sixth planetary gears P6. With the fifth sun gear S5 and the fifth ring gear R5 assigned to have the numbers of teeth represented by ZS5 and ZR5, respectively, the gear ratio ρ5 is expressed by ZS5/ZR5 in a value of, for example, about "0.7". Further, with the sixth sun gear S6 and the sixth ring gear R6 assigned to have the numbers of teeth represented by ZS6 and ZR6, respectively, the gear ratio ρ6 is expressed by ZS6/ZR6 in a value of, for example, about "0.3".

With such a power distributing mechanism 111, the fifth and sixth carriers CA5 and CA6 integrally connected to each other are connected to the input shaft 14, i.e., the engine 8 and the third electric motor M3; the fifth and sixth sun gears S5 and S6 are connected to the first electric motor M1; the fifth ring gear R5 is selectively connected to the power transmitting member 18 via the third clutch C3; and the sixth ring gear R6 is selectively connected to the power transmitting member 18 via the fourth clutch C4.

Here, either the third clutch C3 or the fourth C4 is selectively caused to engage depending on the vehicle condition. As the third clutch C3 is caused to engage, the power distributing mechanism 111 allows the fifth planetary gear unit 112, having the gear ratio of about "0.7", to function as a main unit. As the fourth clutch C4 is caused to engage, the power distributing mechanism 111 allows the sixth planetary gear unit 114, having the gear ratio of about "0.3", to function as a main unit.

Figure 29:
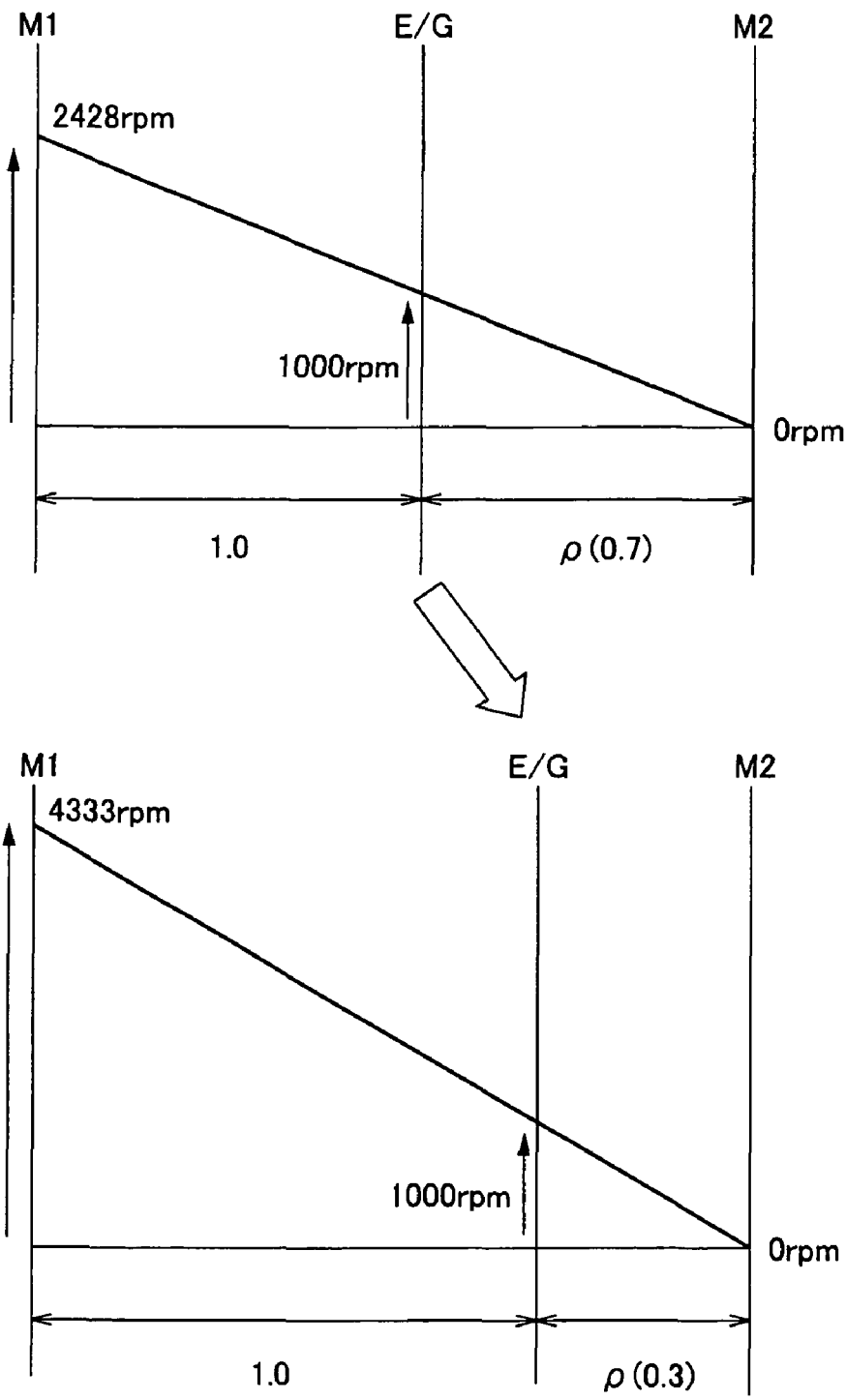
FIG. 29 is a collinear chart, illustrating rotating states of respective rotary elements of the differential portion shown in FIG. 28, which particularly shows the rotating states of the rotary elements upon startup of the engine.

With the differential portion 110 formed in such a structure, when starting up the engine 8, the drive-force source start control means 86 preliminarily calculates the amount of variation in the rotation speed $N_{M1}$ of the first electric motor M1 during the startup control of the engine 8, upon which the startup mode of the engine 8 is selected and executed depending on the amount of such variation. FIG. 29 is a collinear chart representing rotating states of various rotary elements of the differential portion 110 to specifically show the rotating states achieved during the engine startup. With, for instance, the third clutch C3 is caused engage with the fourth clutch C4 remained disengaged, the gear ratio marks a value of about "0.7". In this case, if it is supposed that of, for instance, an ignitable rotation speed of the engine 8 is 1000 rpm, then the rotation speed of the first electric motor M1 needs to increase up to a value of 2428 rpm. In addition, the second electric motor M2 remains under a state in a zeroed rotation speed.

On the contrary, as the third clutch C3 is caused to disengage while the fourth clutch C4 is caused to engage, the gear ratio marks a value of about "0.3". In order to raise the rotation speed of the engine 8 up to 1000 rpm, then the rotation speed of the first electric motor M1 needs to increase up to a value of 4333 rpm. Therefore, the drive-force source start control means 86 allows the engine 8 to be started up by the first and second electric motors M1 and M2 when the amount of variation in rotation speed of the first electric motor M1 is below a predetermined amount.

Meanwhile, if the amount of variation in rotation speed of the first electric motor M1 exceeds the predetermined amount, then the engine 8 is started up by the third electric motor M3. Also, the predetermined amount is preliminarily determined based on experimental tests to be set to an amount of boundary variation available to rapidly start up the engine during the engine startup. In FIG. 29, under a condition (with the gear ratio of "0.7") where the third clutch C3 is engaged, for instance, the drive-force source start control means 86 allows the engine 8 to be started up by the first and second electric motors M1 and M2. Under another condition (with the gear ratio of "0.3") where the fourth clutch C4 is engaged, the drive-force source start control means 86 allows the engine 8 to be started up by the third electric motor M3.

With the present embodiment, as set forth above, the drive-force source start control means 86 switches the startup modes of the engine 8 depending on the amount of variation in the rotation speed $N_{M1}$ of the first electric motor M1 during the startup control of the engine 8. This enables the engine 8 to be started up in an appropriate method depending on the amount of such variation. When it is predicted that the rotation speed $N_{M1}$ of the first electric motor M1 increases with the engine startup mode initiated by for instance the first and second electric motors M1 and M2, the engine startup mode is switched to another mode in which the third electric motor M3 is used. This enables the suppression of deterioration in startability of the engine 8.

Ninth Embodiment

Figures 30, 31:
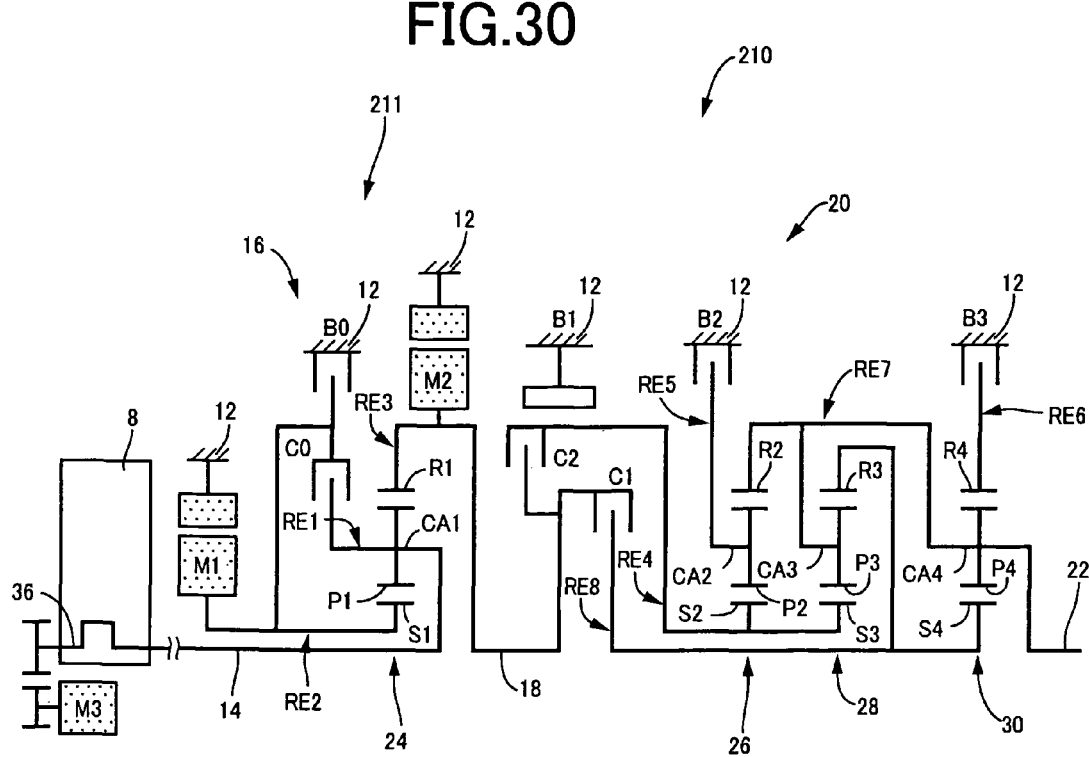
FIG. 30 is a skeleton view explaining a structure of a power transmitting apparatus for a hybrid vehicle to which one control device of the present invention is applied.
FIG. 31 is an operation table illustrating the relationship between a shifting operation in which the power transmitting apparatus shown in FIG. 30 is placed in a continuously variable or step-variable shifting state, and the combination of a hydraulic-type frictional engaging device used therein.

FIG. 30 is a skeleton view illustrating a shifting mechanism 210 forming part of a power transmitting apparatus to which the present invention is applied. The shifting mechanism 210 shown in FIG. 30, differs from the shifting mechanism 10 shown in FIG. 1 described above, in that a differential portion 211 includes, in addition to the first planetary gear set 24 of the single pinion type having a predetermined gear ratio ρ0 of for instance, about "0.418", the switching clutch C0 and the switching brake B0, and the third electric motor M3 being connected to a crankshaft 36 (see FIG. 30) of the engine 8 through gears. Further, the third electric motor M3 may be operatively connected to the crankshaft 36 through another power transmitting member such as a belt and, in addition, the third electric motor M3 may be operatively connected to the crankshaft 36 via a device operable to interrupt a power transmitting member such as a clutch or the like. Moreover, the third electric motor M3 may be a so-called motor generator having an electric power generating function.

In the power distributing mechanism 16 of such a structure, the switching brake B0 is disposed between the first sun gear S1 and the casing 12, and the switching clutch C0 is disposed between the first sun gear S1 and the first carrier CA1. With both the switching clutch C0 and the switching brake B0 being disengaged, the power distributing mechanism 16 is rendered operative such that the first sun gear S1, the first carrier CA1 and the first ring gear R1, forming the three elements of the first planetary gear unit 24, are caused to rotate relative to each other to enable the operation in a differential action, i.e., in a differential state under which the differential action is effectuated.

Thus, the output of the engine 8 is distributed to the first electric motor M1 and the power transmitting member 18 with a part of the engine output distributed to the first electric motor M1 being used to generate electric energy to be stored in a battery or to drivably rotate the second electric motor M2. This renders the differential portion 211 (power distributing mechanism 16) operative as an electrically controlled differential device. Thus, the differential portion 11 is placed in a so-called continuously variable shifting state (electrically controlled CVT state), in which a rotation speed of the power transmitting member 18 varies in a continuous fashion regardless of the engine 8 operating at a predetermined rotation speed. That is, as the power distributing mechanism 16 is placed in the differential state, the differential portion 211 is also placed in differential state. In this casing, the differential portion 211 is placed in the continuously variable shifting state to operate as the electrically controlled continuously variable transmission with a speed ratio γ0 (rotation speed of the driving device input shaft 14/rotation speed of the power transmitting member 18) continuously varying in a value ranging from a minimum value γ0min to a maximum value γ0max.

Under such a state, as the switching clutch C0 or the switching brake B0 is engaged, the power distributing mechanism 16 is disenabled to perform the differential action, i.e., placed in a non-differential state in which no differential action is effectuated. In particular, as the switching clutch C0 is engaged to cause the first sun gear S1 and the first carrier CA1 to be unitarily coupled to each other, the power distributing mechanism 16 is placed in a locked state under which the first sun gear S1, the first carrier CA1 and the first ring gear R1, serving as the three elements of the first planetary gear unit 24, are caused to rotate together, i.e., in a unitarily rotating state under the non-differential state in which no differential action is effectuated. Thus, the differential portion 211 is placed in the non-differential state. Therefore, the rotation speeds of the engine 8 and the power transmitting member 18 overlap with each other, so that the differential portion 211 (power distributing mechanism 16) is placed in a fixed shifting state, i.e., a step-variable shifting state to function as a transmission with the speed ratio γ0 connected to a value of "1".

Next, instead of the switching clutch C0, if the switching brake B0 is engaged to connect the first sun gear S1 to the casing 12, then, the power distributing mechanism 16 is placed in the locked state. Thus, the first sun gear S1 is placed in the non-rotating state under the non-differential state in which no differential action is initiated, causing the differential portion 211 to be placed in the non-differential state. Since the first ring gear R1 rotates at a speed higher than that of the first carrier CA1, the power distributing mechanism 16 functions as a speed-increasing mechanism. Thus, the differential portion 211 (power distributing mechanism 16) is placed in the fixed shifting state, i.e., the step-variable shifting state to perform a function as a speed-increasing transmission with the speed ratio γ0 connected to a value smaller than "1", i.e., for example, about 0.7. In view of the operations set forth above, it can be said that the switching clutch C0 and the switching brake B0 operative to place the power distributing mechanism 16 in the locked state corresponds to a differential action limiting device for limiting the differential action of the power distributing mechanism.

In the present embodiment, the switching clutch C0 and the switching brake B0 selectively place the shifting state of differential portion 211 (power distributing mechanism 16) in the differential state, i.e., the unlocked state, and the non-differential state, i.e., the locked state. That is, the switching clutch C0 and the switching brake B0 serves as a differential state switching device that selectively switches the differential portion 211 (power distributing mechanism 16) in one of (i) the continuously variable shifting state operative to perform the electrically and continuously controlled variable shifting operation, under which the differential portion 211 (power distributing mechanism 16) is placed in the differential state (coupled state) to perform the function as the electrically controlled differential device operative to function as the continuously variable transmission with, for instance, the shifting ratio is continuously variable; and (ii) the fixed shifting state under which the differential portion 211 (power distributing mechanism 16) is placed in the shifting state, disenabling the function of the electrically controlled continuously variable shifting operation, such as the locked state disenabling the function of the continuously variable transmission in which no continuously variable shifting operation is effectuated with a speed ratio being locked at a connected level. In the locked state, the differential portion 211 (power distributing mechanism 16) is rendered operative as a transmission of a single-stage or a multi-stage with a speed ratio of one kind or speed ratios of more than two kinds to function in the fixed shifting state (non-differential state), disenabling the electrically controlled continuously variable shifting operation, under which the differential portion 211 (power distributing mechanism 16) operates as the transmission of the single-stage or the multi-stage with the speed ratio kept at a connected level.

The switching clutch C0 and the switching brake B0 are, similar to the first clutch C1, the second clutch C2, the first brake B1, the second brake B2 and the third brake B3, the hydraulic-type frictionally coupling devices used in a vehicular step-variable type automatic transmission of the related art. An example of the frictionally coupling device includes a wet-type multiple-disc type that includes a plurality of superposed friction plates pressed against each other with a hydraulic actuator or a band brake comprised of a rotary drum having an outer circumferential surface on which one band or two bands are wound to be tightened at one ends with a hydraulic actuator to allow associated component parts, between which the rotary drum intervenes, to be selectively connected to each other.

In the shifting mechanism 210 of this embodiment, as indicated in an engagement operation Table shown FIG. 31, the switching clutch C0, the first clutch C1, the second clutch C2, the switching brake B0, the first brake B1, the second brake B2 and the third brake B3 are selectively engaged in operation. This selectively establishes either one of a 1st-speed gear position (1st-speed gear shift position) to a 5th-speed gear position (5th-speed gear shift position) or one of a reverse-drive gear position (reverse-drive gear shift position) and a neural position with a speed ratios γ (input-shaft rotation speed $N_{IN}$/output-shaft rotation speed $N_{OUT}$) varying in nearly equal ratio for each gear position.

In particular, in the present embodiment, the power distributing mechanism 16 is provided with the switching clutch C0 and the switching brake B0, either one of which is engaged in operation. This can cause the differential portion 211 to be placed in the continuously variable shifting state enabling the operation as the continuously variable transmission while establishing the fixed shifting state enabling the transmission to operate with the speed ratio maintained at a fixed level. With either one of the switching clutch C0 and the switching brake B0 being engaged in operation, accordingly, the differential portion 211 is placed in the two-positions fixed shifting state to cooperate with the automatic shifting portion 20 to allow the shifting mechanism 210 to operate as the step-variable transmission placed in the step-variable shifting state. With both of the switching clutch C0 and the switching brake B0 being disengaged in operation, the differential portion 211 is placed in the continuously variable shifting state to cooperate with the automatic shifting portion 20 to allow the shifting mechanism 210 to operate as the electrically controlled continuously variable transmission placed in the continuously variable shifting state.

In other words, the shifting mechanism 210 is switched to the step-variable shifting state, upon engagement of either one of the switching clutch C0 and the switching brake B0, and the continuously variable shifting state with both of the switching clutch C0 and the switching brake B0 being brought into disengagement. In addition, it can be said that the differential portion 211 is the transmission that can also be switched to the two-positions step-variable shifting state and the continuously variable shifting state.

For example, as shown in FIG. 31, under a circumstance where the shifting mechanism 210 is caused to function as the step-variable transmission, engaging the switching clutch C0, the first clutch C1 and the third brake B3 results in the 1st-speed gear position with the speed ratio γ1 having a maximum value of, for instance, about "3.357". Engaging the switching clutch C0, the first clutch C1 and the second brake B2 results in the 2nd-speed gear position with the speed ratio γ2 of, for instance, about "2.180", which is lower than that of the 1st-speed gear position. Engaging the switching clutch C0, the first clutch C1 and the first brake B1 results in the 3rd-speed gear position with the speed ratio γ3 of, for instance, about "1.424", which is lower than that of the 2nd-speed gear position. Engaging the switching clutch C0, the first clutch C1 and the second clutch C2 results in the 4th-speed gear position with the speed ratio γ4 of, for instance, about "1.000", which is lower than that of the 3rd-speed gear position.

With the first clutch C1, the second clutch C2 and the switching brake B0 being engaged, the 5th-speed gear position is established with the speed ratio γ5 of, for example, about "0.705", which is smaller than that of the 4th-speed gear position. With the second clutch C2 and the third brake B3 being engaged, further, the reverse-drive gear position is established with the speed ratio γR of, for example, about "3.209", which lies at a value between those of the 1st- and 2nd-speed gear positions. For the neutral "N" state to be established, for instance, all the clutches C0, C1, C2 and the brakes, B0, B1, B2 and B3 are disengaged.

When the automatic shifting portion 20 is shifted up or down, the engaging action of the clutch C or the brake B on the engagement side and the releasing action of the clutch C or the brake B on the release side are performed simultaneously. Therefore, the power transmitting path in the automatic shifting portion 20 reaches a cut-off state or an almost completely cut-off state during gear shifting, and the connection between the output shaft 22 and the differential portion 211 is cut or weakened. As a result, the transmitting capacity of the power transmitting path extending from the differential portion 211 to the drive wheel 34 is decreased. Additionally, since the clutches C1 and C2, and the brakes B1, B2 and B3 included in the automatic shifting portion 20 are engagement elements that can cut off or open up the power transmitting path extending from the differential portion 211 to the drive wheel 34, these clutches and brakes correspond to the power transmitting/interrupting means of the present invention, and it can be said that the automatic shifting portion 20 functions as a power transmitting/interrupting means.

However, for the shifting mechanism 210 to function as the continuously variable transmission, both the switching clutch C0 and the switching brake B0 are disengaged as indicated in the engagement operation table shown in FIG. 31. With such operation, the differential portion 211 is rendered operative to function as the continuously variable transmission and the automatic shifting portion 20 connected thereto in series is rendered operative to function as the step-variable transmission. This causes the rotation speed input to the automatic shifting portion 20, i.e., the rotation speed of the power transmitting member 18 to be continuously varied for each of the 1st-speed gear position, the 2nd-speed gear position, the 3rd-speed gear position and the 4th-speed gear position. This allows each of the various gear positions to be established in an infinitely variable shifting ratio. Accordingly, a speed ratio can be continuously variable across the adjacent gear positions, making it possible for the shifting mechanism 210 as a whole to obtain an infinitely variable total speed ratio (overall speed ratio) γT.

Figure 32:
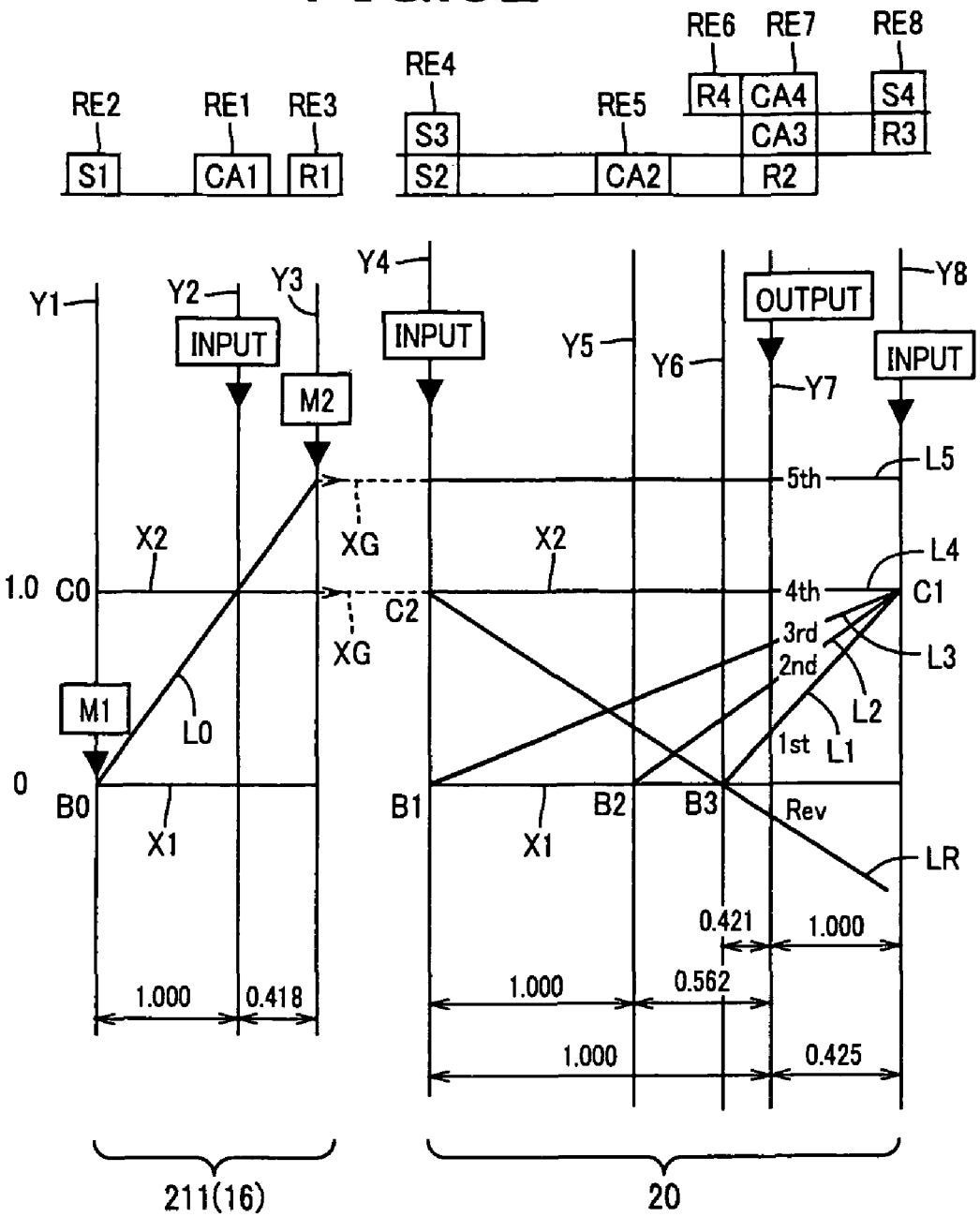
FIG. 32 is a collinear chart illustrating the relative rotation speed of rotary elements in respective different gear positions when the power transmitting apparatus shown in FIG. 30 is operated in the step-variable shifting state.

FIG. 32 shows a collinear chart plotted in straight lines that can represent a correlation among the rotation speeds of the various rotary elements available to accomplish clutch engagement states in different modes depending on the gear positions of the shifting mechanism 210 comprised of the differential portion 211 functioning as the continuously variable shifting portion or the first shifting portion, and the automatic shifting portion 20 functioning as the step-variable shifting portion or the second shifting portion. The collinear chart of FIG. 32 is similar to that of FIG. 3, but differs in that the operations of the switching clutch C0 and the switching brake B0 are added.

In the power distributing mechanism 16, with the switching clutch C0 being engaged to couple the first sun gear S1 and the first carrier CA1 to each other, the power distributing mechanism 16 is brought into the non-differential state where the three rotary elements are caused to integrally rotate as a unitary unit. Thus, the straight line L0 matches the lateral line X2, so that the power transmitting member 18 is caused to rotate at the same rotation speed as the engine rotation speed $N_E$. In contrast, with the switching brake B0 being engaged to halt the rotation of the first sun gear S1, the power distributing mechanism 16 is brought into the non-differential state to function as the speed increasing mechanism. Thus, the straight line L0 describes a state as shown in FIG. 32, under which the rotation of the first ring gear R1, i.e., the power transmitting member 18, represented by an intersecting point between the straight line L0 and the vertical line Y3, is input to the automatic shifting portion 20 at a rotation speed higher than the engine rotation speed $N_E$.

As shown in FIG. 32, with the automatic shifting portion 20, by engagement of the first clutch C1 and the third brake B3, and by engagement of the switching clutch C0, the rotation speed of the output shaft 22 for the 1st-speed gear position is represented by an intersecting point between the inclined straight line L1 and the vertical line Y7 representing the rotation speed of the seventh rotary element RE7 connected to the output shaft 22. Here, the inclined straight line L1 passes across an intersecting point between the vertical line Y8 indicative of the rotation speed of the eighth rotary element RE8, and the horizontal line X2, and an intersecting point between the vertical line Y6 indicative of the rotation speed of the sixth rotary element RE6, and the horizontal line X1. Similarly, the rotation speed of the output shaft 22 for the 2nd-speed gear position is represented by an intersecting point between an inclined straight line L2, determined upon engagement of the first clutch C1 and the second brake B2, and the vertical line Y7 indicative of the rotation speed of the seventh rotary element RE7 connected to the output shaft 22. The rotation speed of the output shaft 22 for the 3rd-speed gear position is represented by an intersecting point between an inclined straight line L3 determined upon engagement of the first clutch C1 and the first brake B1, and the vertical line Y7 indicative of the rotation speed of the seventh rotary element RE7 connected to the output shaft 22.

The rotation speed of the output shaft 22 for the 4th-speed gear position is represented by an intersecting point between a horizontal line L4 determined upon engagement of the first and second clutches C1 and C2, and the vertical line Y7 indicative of the rotation speed of the seventh rotary element RE7 connected to the output shaft 22. For the 1st-speed to 4th-speed gear positions, the switching clutch C0 remains engaged. Therefore, a drive force is applied from the differential portion 211, i.e., the power distributing mechanism 16 to the eighth rotary element RE8 at the same rotation speed as that of the engine rotation speed $N_E$. However, in place of the switching clutch C0, if the switching clutch B0 is engaged, then, the drive force is applied from the differential portion 211 to the eighth rotary element RE8 at a higher rotation speed than the engine rotation speed $N_E$. Thus, an intersecting point between a horizontal line L5 and the vertical line Y7 represents the rotation speed of the output shaft 22 for the 5th-speed gear position. Here, the horizontal line L5 is determined upon engagement of the first clutch C1, the second clutch C2 and the switching brake B0 and the vertical line Y7 represents the rotation speed of the seventh rotary element RE7 connected to the output shaft 22.

Figure 33:
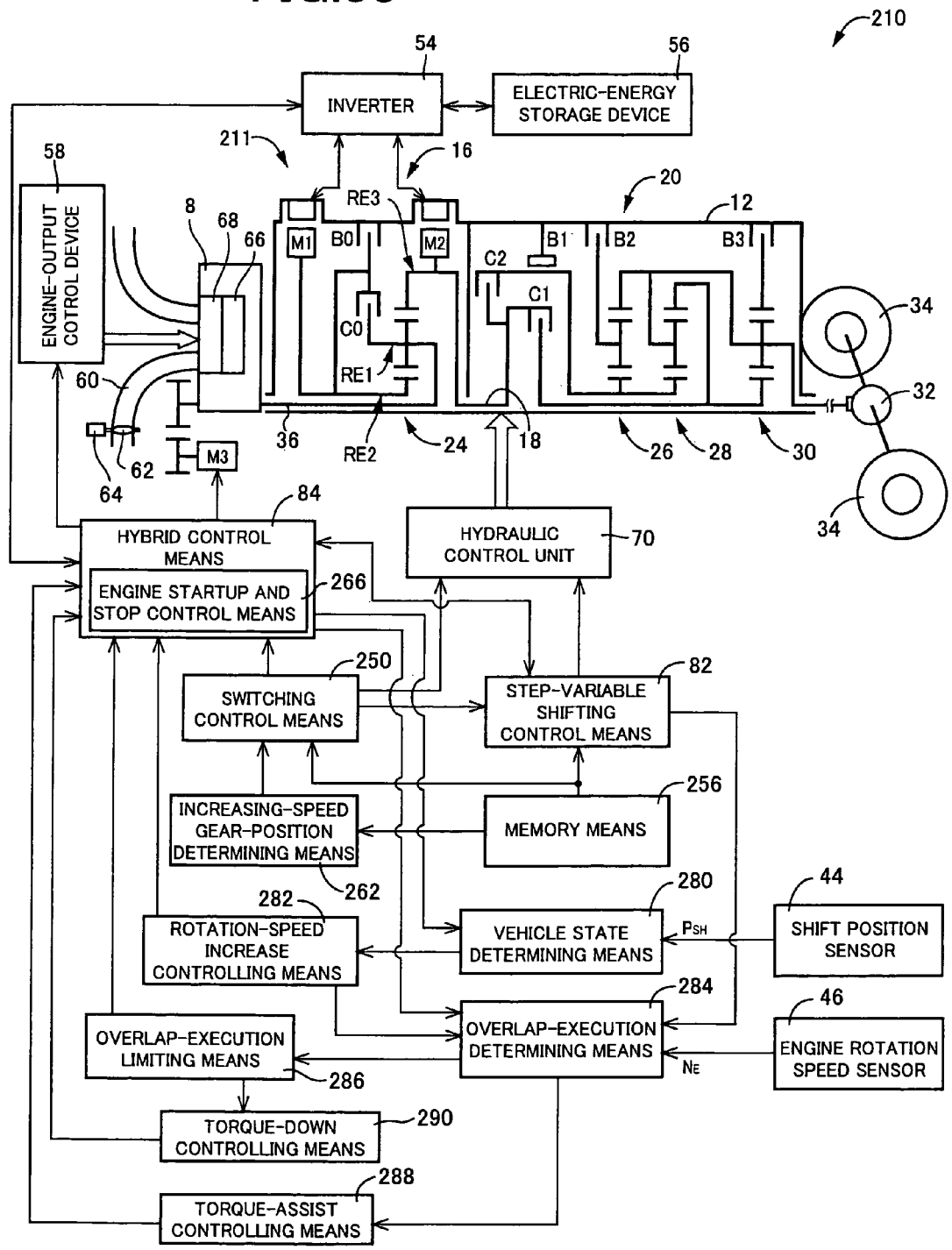
FIG. 33 is a functional block diagram illustrating another major control function to be executed by the electronic control device shown in FIG. 4.
Figure 34:
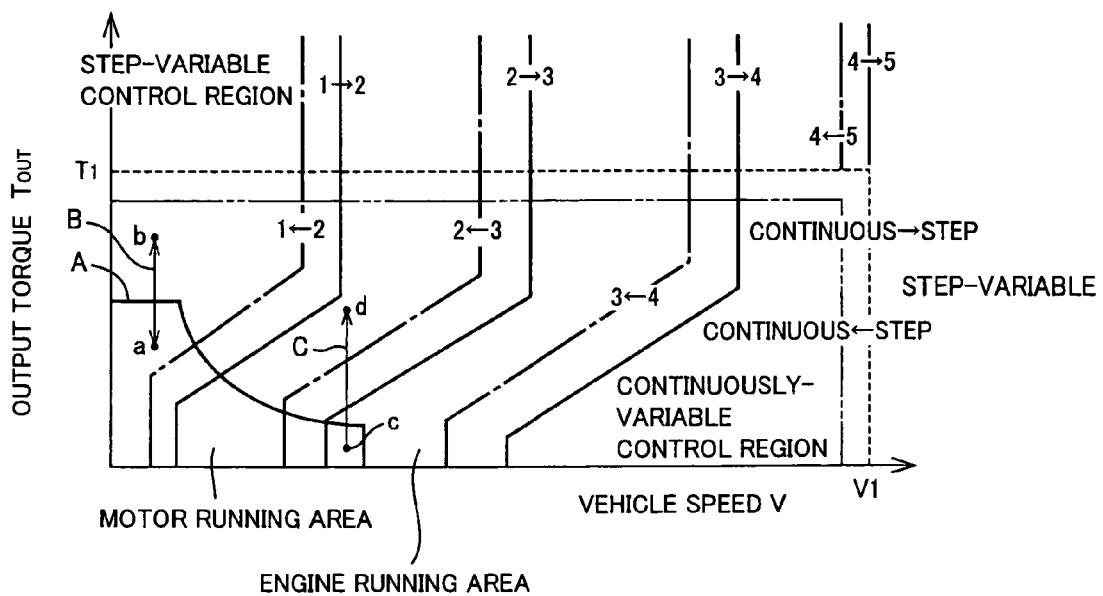
FIG. 34 is a view representing one example of a preliminarily stored shifting diagram plotted on a two-dimensional coordinate in terms of parameters including a vehicle speed and output torque based on which whether execution of the shifting in an automatic shifting portion is determined, one example of preliminary stored switching diagram on which switching of the shifting state of the shifting mechanism is determined, and one example of a preliminarily stored drive-force source switching diagram having a boundary line based on which an engine drive mode and a motor drive mode is switched, also showing relation thereamong.

FIG. 33 is a functional block diagram illustrating an essential part of a control function to be performed with the electronic control device 80. In FIG. 33, step-variable shifting control means 82 functions as shifting control means for the shifting the shifting the automatic shifting portion 20. For instance, the step-variable shifting control means 82 discriminates whether to execute the shifting in the automatic shifting portion 20 on the basis of a vehicle condition represented by the vehicle speed V and the demanded output torque $T_{OUT}$ for the automatic shifting portion 20 by referring to the relationships (including the shifting diagram and the shifting map), preliminarily stored in memory means 256, which are plotted in solid lines and single dot lines as shown in FIG. 34. That is, the step-variable shifting control means 82 discriminates a shifting position to be shifted in the automatic shifting portion 20, thereby causing the automatic shifting portion 20 to execute the shifting so as to obtain the discriminated shifting position. When this takes place, the step-variable shifting control means 54 outputs a command (shifting output command) to the hydraulic control circuit 42 for engaging and/or disengaging the hydraulically operated frictional engaging devices including the switching clutch C0 and the switching brake B0 in the step variable shifting mode, and for engaging and/or disengaging the hydraulically operated frictional engaging devices excepting the switching clutch C0 and the switching brake B0, in the continuously variable mode, in accordance with, for instance, the engagement operation table shown in FIG. 31.

The hybrid control means 84 includes engine-start stop control means 266 that switches an operating state of the engine 8 between a drive state and a stop state to select one of the engine drive mode and the motor drive mode. As used herein, the term "switches" refers to an operation in which the engine 8 is started up or stopped in operation. With the hybrid control means 84 executed the operation based on the vehicle condition by referring to, for instance, the drive-force source switching diagram shown in FIG. 34 to determine that the motor drive mode and the engine drive mode need to be switched, the engine-start stop control means 266 executes the operation to start up or stop the engine 8.

If the accelerator pedal is depressed in operation to cause an increase in demanded engine output torque $T_{OUT}$, the vehicle condition varies from the motor drive region to the engine drive region as shown by a transition in points "a"→"b" on a solid line B in FIG. 34. When this takes place, the engine-start stop control means 266 turns on the first electric motor M1 to raise the first-motor rotation speed $N_{M1}$. That is, the first electric motor M1 is rendered operative to function as a starter. This allows the engine 8 to start up with an increase in the engine rotation speed $N_E$. During such operation, the engine-start stop control means 266 causes the ignition device 68 to initiate an ignition at a predetermined engine rotation speed $N_E'$, i.e., for instance, at an engine rotation speed $N_E$ enabling an autonomous rotation, after which the hybrid control means 84 switches the motor drive mode to the engine drive mode.

During such operation, the engine-start stop control means 266 may cause the first-motor rotation speed $N_{M1}$ to immediately raise for increasing the engine rotation speed $N_E$ up to the predetermined engine rotation speed $N_E'$. This can immediately avoid the occurrence of a resonating region from an engine rotating speed region remaining below an idling rotation speed $N_{IDLE}$ that is well known, thereby suppressing the possibility of the engine 8 vibrating at startup thereof.

Basically, the engine 8 is started by allowing the first electric motor M1 to function as a starter as described above. However, when rotation-speed increase controlling means 282 mentioned below execute an engine rotation speed increase controlling operation mentioned below while the automatic shifting portion 20 is under shifting up or down, the engine 8 is started by allowing the third electric motor M3 to function as a starter instead of the first electric motor M1.

If the accelerator pedal is released with a decrease in demanded engine output torque $T_{OUT}$, the vehicle condition varies from the engine drive region to the motor drive region as shown by another transition in points "b"→"a" on the solid line B in FIG. 34. When this takes place, the engine-start stop control means 266 causes the fuel injection device 98 to interrupt the supply of fuel to the engine 8. That is, a fuel cutoff operation is executed to stop the engine 8. In such a way, the hybrid control means 84 switches the engine drive mode to the motor drive mode. During such an operation, the engine-start stop control means 266 may execute the operation to immediately lower the first-motor rotation speed $N_{M1}$ for immediately lowering the engine rotation speed $N_E$ to a zeroed or nearly zeroed level. This immediately avoids the engine 8 from entering the resonating region, thereby suppressing the possibility of the engine 8 vibrating at startup thereof. In an alternative, the engine-start stop control means 266 may execute the operation to stop the engine 8 upon executing an operation to lower the first-motor rotation speed $N_{M1}$ to decrease the engine rotation speed $N_E$ on a stage prior to the fuel cutoff operation being executed for effectuating the fuel cutoff operation at the predetermined engine rotation speed $N_E'$.

Further, even under the engine drive region, the hybrid control means 84 may execute the operation to allow the second electric motor M2 to be supplied with electric energy generated by the first electric motor M1, and/or electric energy delivered from the battery 56 via the electric path mentioned above. This causes the second electric motor M2 to be driven for performing a torque assisting operation to assist the drive force of the engine 8. Thus, for the illustrated embodiment, the term "engine drive mode" may refer to an operation covering the engine drive mode and (plus) the motor drive mode in combination.

Further, the hybrid control means 84 can cause the differential portion 2 to perform the electrical CVT function through which the engine 8 can be maintained under the operating state regardless of the vehicle left in a halted condition or a low speed condition. For instance, if a drop occurs in a state of charge SOC of the battery 56 during the halt of the vehicle with a need occurring on the first electric motor M1 to generate electric power, the drive force of the engine 8 drives the first electric motor M1 to generate electric power with an increase in the rotation speed of the first electric motor M1. Thus, even if the second-motor rotation speed $N_{M2}$ uniquely determined with the vehicle speed V is zeroed (nearly zeroed) due to the halted condition of the vehicle, the power distributing mechanism 16 performs the differential action, causing the engine rotation speed $N_E$ to be maintained at a level beyond an autonomous rotation speed.

The hybrid control means 84 executes the operation to cause the differential portion 211 to perform the electrical CVT function for controlling the first-motor rotation speed $N_{M1}$ and the second-motor rotation speed $N_{M2}$ to maintain the engine rotation speed $N_E$ at an arbitrary level regardless of the vehicle remaining under the halted or running state. As will be understood from the collinear chart shown in FIG. 32, for instance, when raising the engine rotation speed $N_E$, the hybrid control means 84 executes the operation to maintain the second-motor rotation speed $N_{M2}$ bound with the vehicle speed V at a nearly fixed level while raising the first-motor rotation speed $N_{M1}$.

In placing the shifting mechanism 210 in the step-variable shifting state, increasing-speed gear-position determining means 262 determines which of the switching clutch C0 and the switching brake B0 is to be engaged. To this end, the increasing-speed gear-position determining means 262 executes the operation based on for instance the vehicle condition according to the shifting diagram shown in FIG. 34, which is preliminarily stored in the memory means 256, to determine whether or not a gear position to be shifted in the shifting mechanism 210 is an increasing-speed gear position, i.e., for instance, a 5th-speed gear position.

Switching control means 250 switches the engaging and/disengaging states of the differential-state switching means (switching clutch C0 and switching brake B0) based on the vehicle condition, thereby selectively executing a switchover between the continuously variable shifting state and the step-variable shifting state, i.e., between the differential state and the locked state. For instance, the switching control means 250 executes the operation based on the vehicle condition, represented with the vehicle speed V and demanded output torque $T_{OUT}$, by referring to the relationships (shifting diagram and shifting map) preliminarily stored in the memory means 256, which are shown in the broken line and the double dot line in FIG. 34, thereby determining whether to switch the shifting state of the shifting mechanism 210 (differential portion 211).

That is, the operation is executed to determine whether there exist a continuously variable shifting control region for the shifting mechanism 210 to be placed in the continuously variable shifting state or a step-variable shifting control region for the shifting mechanism 210 to be placed in the step-variable shifting state. This allows the operation to be executed for determining the shifting state to be switched in the shifting mechanism 210, thereby executing the operation to selectively switch the shifting state to one of the continuously variable shifting state and the step-variable shifting state.

More particularly, if the determination is made that the shifting mechanism 210 lies in the step-variable shifting control region, then, the switching control means 250 outputs a signal to the hybrid control means 84 for disenabling or interrupting the hybrid control or the continuously variable shifting control, while permitting the step-variable shifting control means 82 to perform the shifting for the step-variable shifting operation that has been preliminarily determined. When this takes place, the step-variable shifting control means 82 allows the automatic shifting portion 20 to perform the automatic shifting in accordance with, for instance, the shifting diagram shown in FIG. 34 and preliminarily stored in the memory means 256. For instance, the engagement operation table, shown in FIG. 31 and preliminarily stored in the memory means 256, represents the operations in combination of the hydraulically operated frictional engaging devices, that is, the clutches C0, C1 and C2 and the brakes B0, B1, B2 and B3 to be selected in such a shifting operation. That is, a whole of the shifting mechanism 210, i.e., the differential portion 211 and the automatic shifting portion 20, functions as a so-called step-variable automatic transmission, thereby establishing the gear positions according to the engagement operation table shown in FIG. 31.

For instance, if the increasing-speed gear-position determining means 262 determines that the 5th-gear position is to be selected, the shifting mechanism 210 as a whole can obtain a so-called overdrive-gear position on an increasing-speed gear position with a speed ratio less than "1.0" as a whole. To this end, the switching control means 250 outputs a command to the hydraulic control circuit 42 for disengaging the switching clutch C0 and engaging the switching brake B0 to allow the differential portion 11 to function as an auxiliary power transmission with a fixed speed ratio γ0, i.e., for instance, the speed ratio γ0 equal to "0.7".

If the increasing-speed gear-position determining means 262 determines that no 5th-gear position is to be selected, the shifting mechanism 210 as a whole can obtain a decreasing-speed gear position with a speed ratio of "1.0" or more. To this end, the switching control means 250 outputs another command to the hydraulic control circuit 70 for engaging the switching clutch C0 and disengaging the switching brake B0 to allow the differential portion 211 to function as the auxiliary power transmission with the fixed speed ratio γ0, i.e., for instance, the speed ratio γ0 equal to "1".

Thus, the switching control means 250 causes the shifting mechanism 210 to be switched in the step-variable shifting state under which the operation is executed to selectively switch the gear positions of two kinds to either one gear position. With the differential portion 211 rendered operative to function as the auxiliary power transmission while the automatic shifting portion 20, connected to the differential portion 211 in series, is rendered operative to function as the step-variable transmission, the shifting mechanism 210 as a whole is rendered operative to function as the so-called step-variable automatic transmission.

On the contrary, if the switching control means 250 determines that the shifting mechanism 210 remains in the continuously variable shifting control region to be switched in the continuously variable shifting state, the shifting mechanism 210 as a whole can obtain the continuously variable shifting state. To this end, the switching control means 250 outputs a command to the hydraulic control circuit 70 for disengaging both the switching clutch C0 and the switching brake B0 so as to place the differential portion 211 in the continuously variable shifting state to enable an infinitely variable shifting operation to be executed.

Simultaneously, the switching control means 250 outputs a signal to the hybrid control means 84 for permitting the hybrid control to be executed, while outputting a predetermined signal to the step-variable shifting control means 82. As used herein, the term "predetermined signal" refers to a signal, by which the shifting mechanism 210 is fixed to a gear position for a predetermined continuously variable shifting state, or a signal for permitting the automatic shifting portion 20 to perform the automatic shifting according to, for instance, the shifting diagram, shown in FIG. 34, which is preliminarily stored in the memory means 256.

In this case, the step-variable shifting control means 82 performs the automatic shifting upon executing the operation excepting the operations to engage the switching clutch C0 and the switching brake B0 in the engagement operation table shown in FIG. 31. This causes the switching control means 250 to switch the differential portion 211 to the continuously variable shifting state to function as the continuously variable transmission, while rendering the automatic shifting portion 20, connected to the differential portion 211 in series, operative to function as the step-variable transmission. This allows a drive force to be obtained with an appropriate magnitude. Simultaneously, the rotation speed input to the automatic shifting portion 20, i.e., the rotation speed of the power transmitting member 18 is continuously varied for each gear position of the 1st-speed, 2nd-speed, 3rd-speed and 4th-speed positions of the automatic shifting portion 20, enabling the respective gear positions to be obtained in infinitely variable speed ratio ranges. Accordingly, since the speed ratio is continuously variable across the adjacent gear positions, the shifting mechanism 210 as a whole can obtain the overall speed ratio γT in an infinitely variable mode.

Now, FIG. 34 will be described more in detail. FIG. 34 is a view showing the relationships (shifting diagram and shifting map), preliminarily stored in the memory means 256, based on which the shifting of the automatic shifting portion 20 is determined, and representing one example of the shifting diagram plotted on a two-dimensional coordinate with parameters including the vehicle speed V and demanded output torque $T_{OUT}$ indicative of the drive force correlation value. In FIG. 34, the solid lines represent upshift lines and single dot lines represent downshift limes.

In FIG. 34, the broken lines represent a determining vehicle speed V1 and a determining output torque T1 for the switching control means 250 to determine the step-variable control region and the continuously variable control region. That is, the broken lines in FIG. 34 represent a high vehicle-speed determining line forming a series of a determining vehicle speed V1 representing a predetermined high-speed drive determining line for determining a high speed running state of a hybrid vehicle, and a high-output drive determining line forming a series of determining output torque T1 representing a predetermined high-output drive determining line for determining the drive force correlation value related to the drive force of the hybrid vehicle. As used herein, the term "drive force correlation value" refers to determining output torque T1 that is preset for determining a high output drive for the automatic shifting portion 20 to provide output torque at a high output.

A hysteresis is provided for determining the step-variable control region and the continuously variable control region as indicated by a double dot line in FIG. 34 in contrast to the broken line. That is, FIG. 34 represents a shifting diagram (switching map and relationship) preliminarily stored in terms of the parameters including the vehicle speed V, including the determining vehicle speed V1 and determining output torque T1, and output torque $T_{OUT}$, based on which the switching control means 250 executes the determination on a region as to which of the step-variable control region and the continuously variable control region belongs to the shifting mechanism 210. The memory means 256 may preliminarily store the shifting map, inclusive of such a shifting diagram. Moreover, the shifting diagram may be of the type that includes at least one of the determining vehicle speed V1 and determining output torque T1 and may include a preliminarily stored shifting diagram with a parameter taking any of the vehicle speed V and output torque $T_{OUT}$.

The shifting diagram, the switching diagram or the drive-force source switching diagram or the like may be stored not in the map but in a determining formula for making comparison between a current vehicle speed V and a determining vehicle speed V1, and another determining formula or the like for making comparison between output torque $T_{OUT}$ and determining output torque T1. In this casing, the switching control means 250 places the shifting mechanism 210 in the step-variable shifting state when the vehicle condition such as, for instance, an actual vehicle speed exceeds the determining vehicle speed V1. In addition, the switching control means 250 places the shifting mechanism 210 in the step-variable shifting state when the vehicle condition such as, for instance, output torque $T_{OUT}$ of the automatic shifting portion 20 exceeds determining output torque T1.

When a malfunction or functional deterioration occurs in electrical control equipment such as an electric motor or the like used for rendering the differential portion 211 operative as the electrically controlled continuously variable transmission, the switching control means 250 may be configured to place the shifting mechanism 210 in the step-variable shifting state, on a priority basis for the purpose of ensuring the running of the vehicle to even if the shifting mechanism 210 remains in the continuously variable control region. As used herein, the term "malfunction or functional deterioration in electrical control equipment" refers to a vehicle condition in which: functional degradation occurs in equipment related to the electrical path involved in the operation of the first electric motor M1 to generate electric energy and the operation executed in converting such electric energy to mechanical energy; that is, failures or functional deteriorations caused by a breakdown or low temperature occur in the first electric motor M1, the second electric motor M2, the inverter 54, the battery 56 and transmission paths interconnecting these component parts.

As used herein, the term "drive force correlation value" described above refers to a parameter corresponding to the drive force of the vehicle in one-to-one relation. Such a parameter may include not only drive torque or drive force delivered to the drive wheels 34 but also: output torque $T_{OUT}$ of the automatic shifting portion 20; engine output torque $T_E$; an acceleration value of the vehicle; an actual value such as engine output torque $T_E$ calculated based on, for instance, the accelerator operating or the throttle valve opening $\theta_{TH}$ (or an intake air quantity, an air/fuel ratio or a fuel injection amount) and the engine rotation speed $N_E$; or an estimated value such as engine output torque $T_E$ or demanded vehicle drive force calculated based on a displacement value of the accelerator pedal actuated by the driver or the throttle valve operating or the like. In addition, the drive torque may be calculated upon taking a differential ratio and a radius of each drive wheel 34 into consideration by referring to output torque $T_{OUT}$ or the like or may be directly detected using a torque sensor or the like. This is true for each of other torques mentioned above.

For instance, the operation of the shifting mechanism 210 under the continuously variable shifting state during the running of the vehicle at the high speed turns out a consequence of deterioration in fuel economy. The determining vehicle speed V1 is determined to a value that can render the shifting mechanism 210 operative in the step-variable shifting state during the running of the vehicle at the high speed so as to address such an issue. Further, determining torque T1 is determined to a value that prevents reactive torque of the first electric motor M1 from covering a high output region of the engine during the running of the vehicle at a high output. That is, determining torque T1 is determined to such a value depending on, for instance, a characteristic of the first electric motor M1 that is possibly mounted with a reduced maximum output in electric energy for miniaturizing the first electric motor M1.

Figure 35:
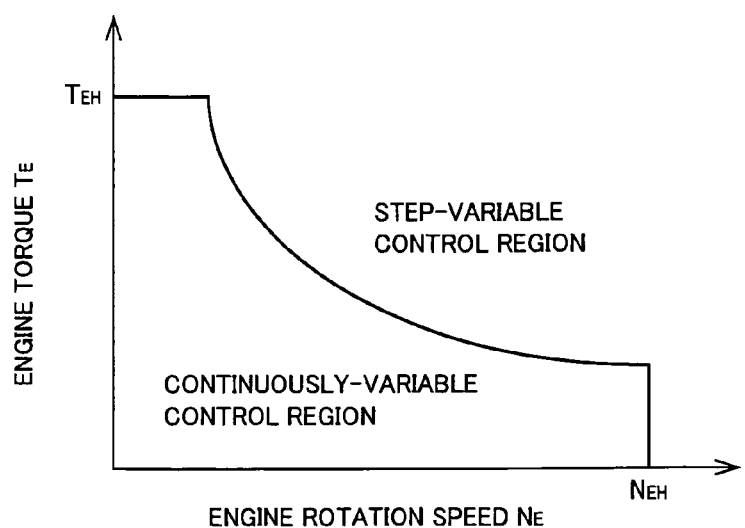
FIG. 35 is a conceptual view, showing the preliminarily stored relationship having a boundary line between a continuously variable control region and a step-variable control region, which maps a boundary between the continuously variable control region and the step-variable control region shown in broken lines in FIG. 34.

FIG. 35 represents a switching diagram (switching map and relationship), preliminarily stored in the memory means 256, which has an engine output line in the form of a boundary line to allow the switching control means 250 to determine a region based on the step-variable control region and the continuously variable control region using parameters including the engine rotation speed $N_E$ and engine torque $T_E$. The switching control means 250 may execute the operation based on the engine rotation speed $N_E$ and engine torque $T_E$ by referring to the switching diagram shown in FIG. 35 in place of the switching diagram shown in FIG. 34. That is, the switching control means 250 may determine whether the vehicle condition, represented with the engine rotation speed $N_E$ and engine torque $T_E$, lies in the step-variable control region or the continuously variable control region. Further, FIG. 35 is also a conceptual view based on which the broken line in FIG. 34 is to be created. In other words, the broken line in FIG. 34 is also a switching line rewritten on a two-dimensional coordinate in terms of the parameters including the vehicle speed V and output torque $T_{OUT}$ based on the relational diagram (map) shown in FIG. 35.

As indicated on the relationships shown in FIG. 34, the step-variable control region is set to lie in a high torque region, where output torque $T_{OUT}$ is greater than the predetermined determining output torque T1, or a high vehicle speed region where the vehicle speed V is greater than the predetermined determining vehicle speed V1. Therefore, a step-variable shift drive mode is effectuated in a high drive torque region, where the engine 8 operates at relatively high torque, or the vehicle speed remaining in a relatively high speed region. Further, a continuously variable shift drive mode is effectuated in a low drive torque region, where the engine 8 operates at relatively low torque, or the vehicle speed remaining in a relatively low speed region, i.e., during a phase of the engine 8 operating in a commonly used output region.

As indicated by the relationship shown in FIG. 35, similarly, the step-variable control region is set to lie in a high-torque region with engine torque $T_E$ exceeding a predetermined predetermined value $T_{EH}$, a high-speed rotating region with the engine rotation speed $N_E$ exceeding a predetermined value $N_{EH}$, or a high output region where the engine output calculated, based on engine torque $T_E$ and the engine rotation speed $N_E$, is greater than a predetermined value. Therefore, the step-variable shift drive mode is effectuated at relatively high torque, relatively high rotation speed or relatively high output of the engine 8. The continuously variable shift drive mode is effectuated at relatively low torque, relatively low rotation speed or relatively low output of the engine 8, i.e., in the commonly used output region of the engine 8. The boundary line shown in FIG. 35 between the step-variable control region and the continuously variable control region corresponds to a high vehicle-speed determining line which is a series of a high vehicle-speed determining line and a high-output drive determining value which is a series of a high-output drive determining value.

With such a boundary line, for instance, during the running of the vehicle at a low/medium speed and low/medium output, the shifting mechanism 210 is placed in the continuously variable shifting state to ensure the vehicle to have improved fuel economy performance. During the running of the vehicle at a high speed with an actual vehicle speed V exceeding the determining vehicle speed V1, the shifting mechanism 210 is placed in the step-variable shifting state to act as the step-variable transmission. In this moment, the output of the engine 8 is transferred to the drive wheels 34 mainly through a mechanical power-transmitting path. This suppresses a loss in conversion between the drive force and electric energy, generated when the shifting mechanism 210 is caused to act as the electrically controlled continuously variable transmission, providing improved fuel consumption.

During the running of the vehicle on the high output drive mode with the drive force correlation value, such as output torque $T_{OUT}$ or the like, which exceeds determining torque T1, the shifting mechanism 210 is placed in the step-variable shifting state to act as the step-variable transmission. In this moment, the output of the engine 8 is transferred to the drive wheels 34 mainly through the mechanical power transmitting path. In this case, the electrically controlled continuously variable transmission is caused to operate in the low/medium speed running region and the low/medium output running region of the vehicle. This enables a reduction in the maximum value of electric energy to be generated by the first electric motor M1, i.e., electric energy to be transmitted by the first electric motor M1, thereby causing the first electric motor M1 per se or a vehicle drive apparatus including such a component part to be further miniaturized in structure.

Figure 36:
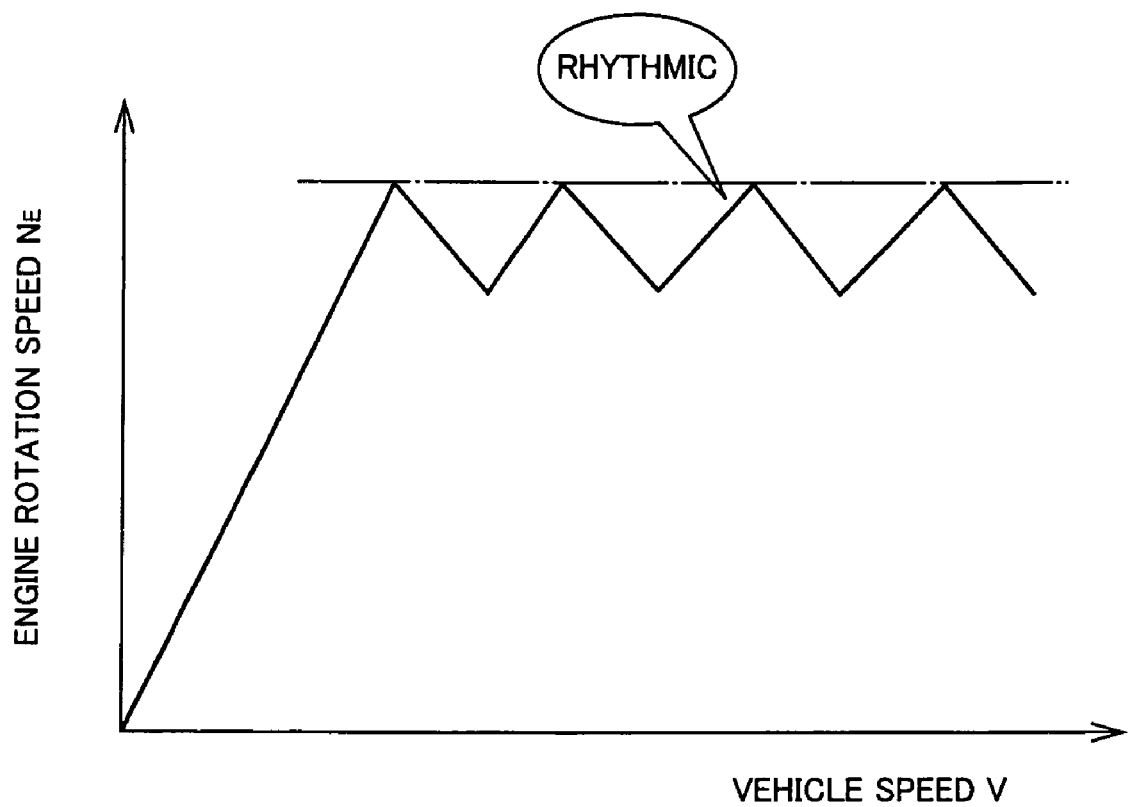
FIG. 36 is a graph showing one example of a fluctuation in an engine rotation speed upon an up shift in a step-variable transmission.

Further, according to another viewpoint, during the running of the vehicle on such a high output drive mode, the driver places more emphasis on a requirement for the drive force and less emphasis on a requirement for a mileage and, thus, the shifting mechanism 210 is switched to the step-variable shifting state (fixed shifting state) rather than to the continuously variable shifting state. With such a switching operation, the driver can enjoy a fluctuation in the engine rotation speed $N_E$, i.e., a rhythmical variation in the engine rotation speed $N_E$ caused by the upshifting in the step-variable automatic shift running mode as shown, for instance, in FIG. 36.

In such a way, the differential portion 211 (shifting mechanism 210) of this embodiment can be selectively switched to one of the continuously variable shifting state and the step-variable shifting state (fixed shifting state). The switching control means 250 executes the operation based on the vehicle condition to determine the shifting state to be switched in the differential portion 211, thereby causing the shifting state to be selectively switched to either one of the continuously variable shifting state and the step-variable shifting state. With the first embodiment, the engine startup and stop control means 266 operates to start up or stop the engine 8 such that the hybrid control means 84 can execute the operation based on the vehicle condition to switch the engine drive mode and the motor drive mode.

There is a possible case in which the start of the engine 8 by the engine start and stop control means 266 and the shifting of the automatic shifting portion 20 by the step-variable shifting control means 82 are concurrently carried out depending on a vehicle state. For example, there is a case in which a requested output torque $T_{OUT}$ becomes great by the operation of an accelerator pedal as shown by "point c→point d" of the solid line C of FIG. 34 when the accelerator pedal is suddenly depressed during motor running to change the vehicle state from the motor running mode to the engine running mode, and at the same time, the automatic shifting portion 20 is shifted. In this case, a starting shock caused from the engine 8 occurs concurrently with a shifting shock caused from the automatic shifting portion 20, and there has been a possibility that vehicle occupants will feel these shocks as a great one.

Therefore, these shocks caused by the concurrent execution of the start of the engine 8 by the engine start and stop control means 266 and the shifting of the automatic shifting portion 20 by the step-variable shifting control means 82 are restrained so that vehicle occupants do not feel the shocks as a great one, and a control operation to swiftly start the engine 8 is performed. This control operation will be hereinafter described.

Referring back to FIG. 33, the vehicle state determining means 280 determines whether two conditions are satisfied, i.e., determines whether (a) the shift position (operating position) $P_{SH}$ detected by the shift position sensor 44 is in D position and whether (b) motor running is being performed by the hybrid controlling means 284. If both conditions are satisfied, an affirmative determination is made, and, if either one of the two conditions is denied, a negative determination is made.

The reason why a determination of these conditions is made is as follows. If either one of the two conditions is denied, the overlapping of the shifting shock and the starting shock of the engine 8 never occurs. If the shift position (operating position) $P_{SH}$ is placed in a position other than D position, e.g., is placed in P position or N position, the engine rotation speed $N_E$ is not increased by the third electric motor M3 described later. Instead, the rotation speed of the first ring gear R1 is kept at a predetermined rotation speed by driving the second electric motor M2, and the engine rotation speed $N_E$ is increased by driving the first electric motor M1. Therefore, the following control operations are not needed.

When the vehicle state determining means 280 makes an affirmative determination, and when shifting output, by which the automatic shifting portion 20 is forced to be shifted, is output from the step-variable shifting control means 82, the rotation-speed increase controlling means 282 performs the following control operation. To start the engine 8, an engine rotation speed increase control operation is performed to make the engine rotation speed $N_E$ greater than engine-start rotation speed $N_{EST}$ (e.g., 400 rpm) that is a predetermined target rotation speed at which the engine 8 can start. In this case, since the automatic shifting portion 20 is under shifting, the rotation-speed increase controlling means 282 increases the engine rotation speed $N_E$ by energizing and driving the third electric motor M3.

If an engine start command that is a command to start the engine 8 is not output during the period from the output of the shifting output to the completion of the shifting, i.e., shifting completion of the automatic shifting portion 20, the rotation-speed increase controlling means 282 releases the engine rotation speed increase control operation. The engine-start rotation speed $N_{EST}$ is pre-stored in the rotation-speed increase controlling means 282.

The concurrent-execution determining means, i.e., overlap-execution determining means 284 pre-stores shifting time taken from the start to the end or completion of shifting in each gear position of the automatic shifting portion 20. When the engine start command, which is issued based on an engine start determination showing that the engine 8 should be started, is output, the concurrent-execution determining means 284 forecasts the shifting completion or completion time based on information about the time taken for gear shifting and about gear positions occupied before and after the gear shifting obtained, from the step-variable shifting control means 82 or based on a shifting progression degree determined by, for example, a difference in rotation speed between the input and the output of the automatic shifting portion 20 at the present moment.

At the same time, based on the engine rotation speed $N_E$ detected by an engine rotation speed sensor 46, the concurrent-execution determining means 284 confirms whether an engine start can be immediately executed. Based on the forecast and the confirmation, the concurrent-execution determining means 284 determines whether the shifting completion time of the automatic shifting portion 20 started by the shifting output overlaps with the start (ignition start) of the engine 8.

In order not to make a vehicle occupant feel the shock as a great one, a concurrence determination value is predetermined by, for example, an experiment. The concurrence determination value is a minimum time difference between the shifting completion time and the engine start, and is also an intended gap therebetween. If the time difference therebetween falls within the concurrence determination value, the concurrent-execution determining means 284 pre-storing the concurrence determination value determines that the shifting completion time and the engine start overlap with each other.

If the concurrent-execution determining means 284 makes an affirmative determination of the overlapping between the shifting completion time and the engine start i.e., engine start, the concurrent-execution limiting means 286 delays the start time (ignition start time) of the engine 8. That is, the concurrent-execution determining means 284 starts a supply of fuel, i.e., fuel supply to the engine 8 prior to a predetermined time to start the engine 8, and at the same time, after the shifting completion of the automatic shifting portion 20, with setting a time difference exceeding the concurrence determination value, and the engine 8 is started as early as possible. Here, the shifting completion of the automatic shifting portion 20 can be known from, for example, control information of the step-variable shifting control means 82. This can also be known from the engagement-side oil pressure to be supplied to the clutch C or the brake B of the automatic shifting portion 20, or from the engagement of a one-way clutch (if provided) disposed in parallel to the engagement side of clutch C or the brake B during gear shifting.

On the other hand, if the concurrent-execution determining means 284 makes a negative determination of the overlapping between the shifting completion time and the engine start, the concurrent-execution limiting means 286 starts the fuel supply prior to the predetermined time to start the engine 8, without delaying the start time (ignition start time) thereof.

If the concurrent-execution determining means 284 makes an affirmative determination of the overlapping between the shifting completion time and the engine start, the concurrent-execution limiting means 286 delays the start time of the engine. Therefore, to cover a delay in rise time of engine torque $T_E$ after the shifting completion, which is caused by delaying the start time of the engine 8, a torque-assist controlling means 288 allows the hybrid controlling means 84 to drive the second electric motor M2. Torque assistance assisting the power of the engine 8 is temporarily executed in this way.

For example, when the motor running is switched to the engine running by depressing an accelerator pedal, satisfying the requested driving torque swiftly is expected to improve acceleration performance. In other words, occurrence of a delay in rise time of the output torque of the automatic shifting portion 20, i.e., a delay in rise time of the torque of the drive wheel is undesirable, even upon depression of an accelerator pedal. To attend this, the torque-assist controlling means 288 allows the hybrid controlling means 84 to temporarily execute torque assistance.

When the engine is started during the shifting of the automatic shifting portion 20, the torque-down controlling means 290 performs a shifting-completion torque-down control operation that temporarily decreases an engine torque $T_E$ generated upon the shifting completion if the shifting is the down-shifting. This is performed to decrease of suppress a shifting shock caused upon shifting completion. If the second electric motor M2 is being driven, the same effect as in the shifting-completion torque-down control operation may be obtained by temporarily decreasing the torque output from the second electric motor M2 upon the shifting completion.

Figure 37:
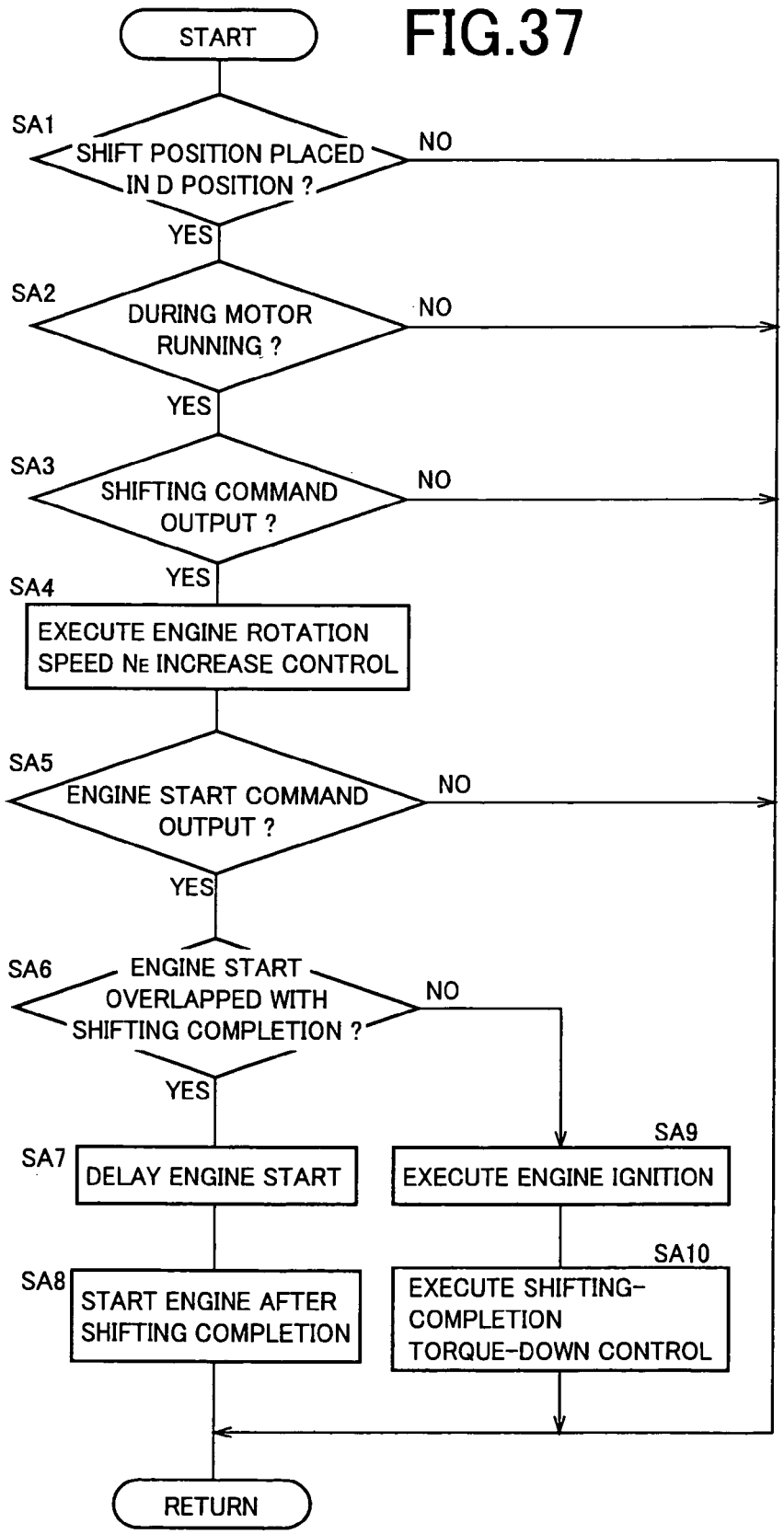
FIG. 37 is a flow chart illustrating another major control operation of the electronic control device of FIG. 4, i.e., control operations performed to avoid overlapping between the gear shifting completion and an engine startup.

FIG. 37 is a flow chart explaining the major part of control operations of the electronic control device 80, i.e., explaining a control operation performed to avoid the overlapping between the shifting completion time and the engine start.

First, in step SA1 (hereinafter, "step" is omitted), it is determined whether the shift position (operating position) $P_{SH}$ detected by the shift position sensor 44 is placed in D position. If this determination is negative (i.e., no), the control operation of FIG. 37 is ended, and, if this determination is affirmative (i.e., yes), the process proceeds to SA2. In SA2, whether the above-mentioned motor running is executed, is determined. If this determination is negative, the control operation of FIG. 37 is ended, and, if this determination is affirmative, the process proceeds to SA3. Here, SA1 and SA2 correspond to the vehicle state determining means 280.

In SA3, whether the shifting output which commands the shifting of the automatic shifting portion 20 is output, is determined. If this determination is negative, the control operation of FIG. 37 is ended, and if this determination is affirmative, the process proceeds to SA4.

In SA4, an engine rotation speed increase control operation is executed to increase the engine rotation speed $N_E$ so as to exceed the engine-start rotation speed $N_{EST}$ for starting the engine 8. In this case, since the automatic shifting portion 20 is under shifting, the engine rotation speed $N_E$ is increased by energizing and driving the third electric motor M3. Here, SA3 and SA4 correspond to the rotation-speed increase controlling means 282.

In SA5, whether the engine start command is issued, is determined. If this determination is negative, the control operation of FIG. 37 is ended, and, if this determination is affirmative, the process proceeds to SA6.

In SA6, the shifting completion time is forecasted or predicted based on pre-stored information regarding necessary gear shifting time and regarding gear positions placed before and after the gear shifting, or based on a shifting progression degree determined by for example a difference in the rotation speed between the input and the output of the automatic shifting portion 20 at the present moment. At the same time, based on the engine rotation speed $N_E$ detected by the engine rotation speed sensor 46, whether the engine can be immediately started is confirmed. Based on the prediction and the confirmation, whether the shifting completion time of the automatic shifting portion 20 started by the shifting output overlaps with the start (ignition start) of the engine 8, is determined.

If this determination is negative the process proceeds to SA9, and if this determination is affirmative the process proceeds to SA7. If a time difference between the shifting completion time or timing and the engine start falls within the pre-stored concurrence or overlapping determination value, overlapping between the shifting completion time and the engine start with each other is determined. Here, SA5 and SA6 correspond to the concurrent-execution determining means 284.

In SA7, the start time (ignition start time) of the engine 8 is delayed. To attend a delay in rise time of engine torque $T_E$ after the shifting completion, which is caused by delaying the start time of the engine 8, the second electric motor M2 is driven to temporarily execute torque assistance that assists the power of the engine 8. In SA8 subsequent thereto, the fuel supply is started prior to the start of the engine 8 by a predetermined time. Additionally, after the shifting completion of the automatic shifting portion 20, with setting a time difference exceeding the concurrence determination value, the engine 8 is started as early as possible.

In SA9, the fuel supply is started prior to the engine start by the predetermined time, so that the engine is started without delaying the start time (ignition start time) of the engine. Here, SA7 to SA9 correspond to the concurrent-execution limiting means 286 and the torque-assist controlling means 288.

The engine 8 is already started in SA9. Therefore, in SA10 corresponding to the torque-down controlling means 290, if the shifting of the automatic shifting portion 20 is the down-shifting, the on-shifting-completion torque-down control operation is performed to temporarily decrease the engine torque $T_E$ upon the shifting completion, for decreasing a shifting shock caused upon the shifting completion.

Figure 38:
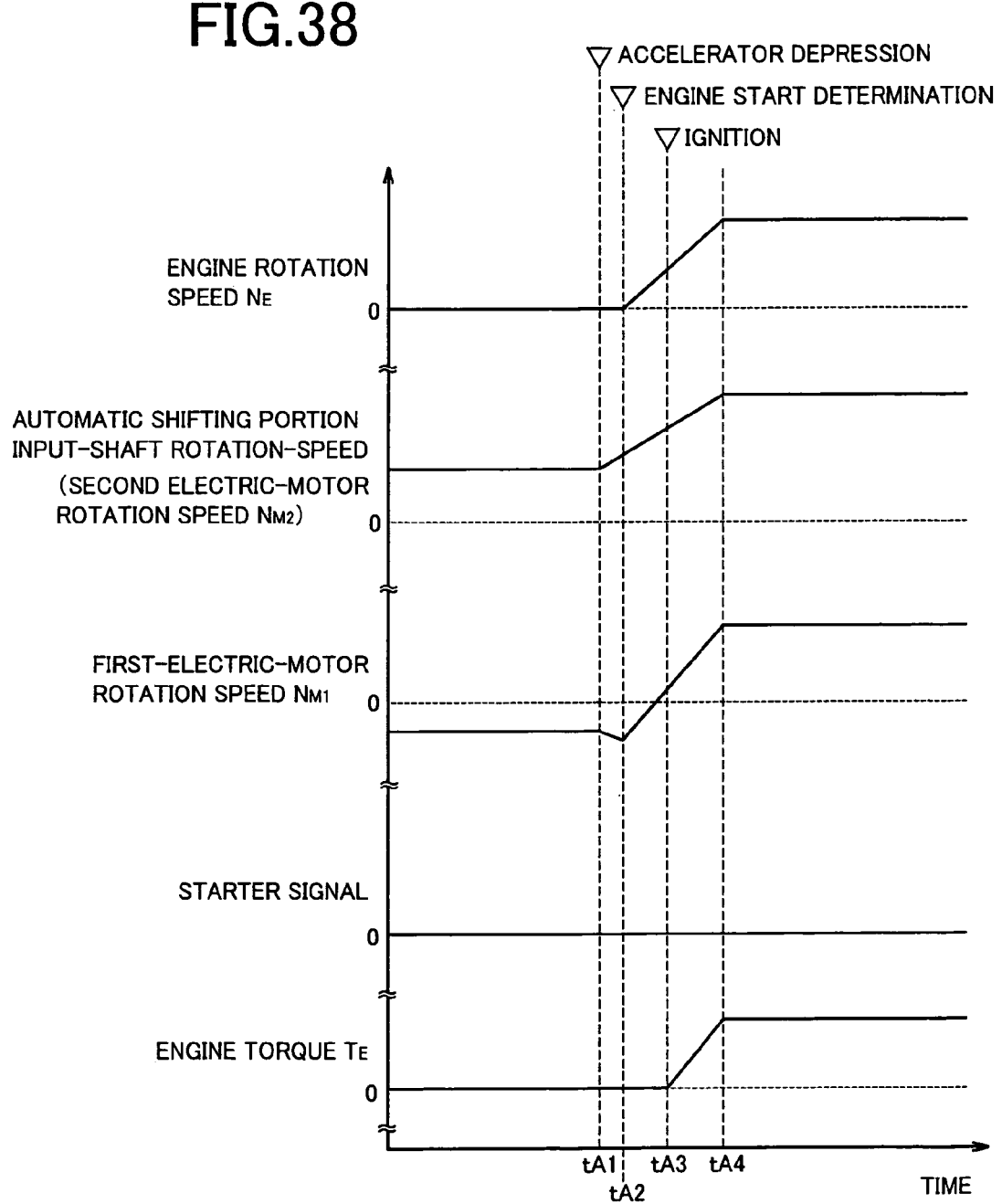
FIG. 38 is a time chart for explaining the control operation illustrated by the flow chart of FIG. 37, showing one example of the engine startup in which the shift position (operating position) $P_{SH}$ is placed in D position during motor running, and the automatic shifting portion is not under shifting.
Figure 39:
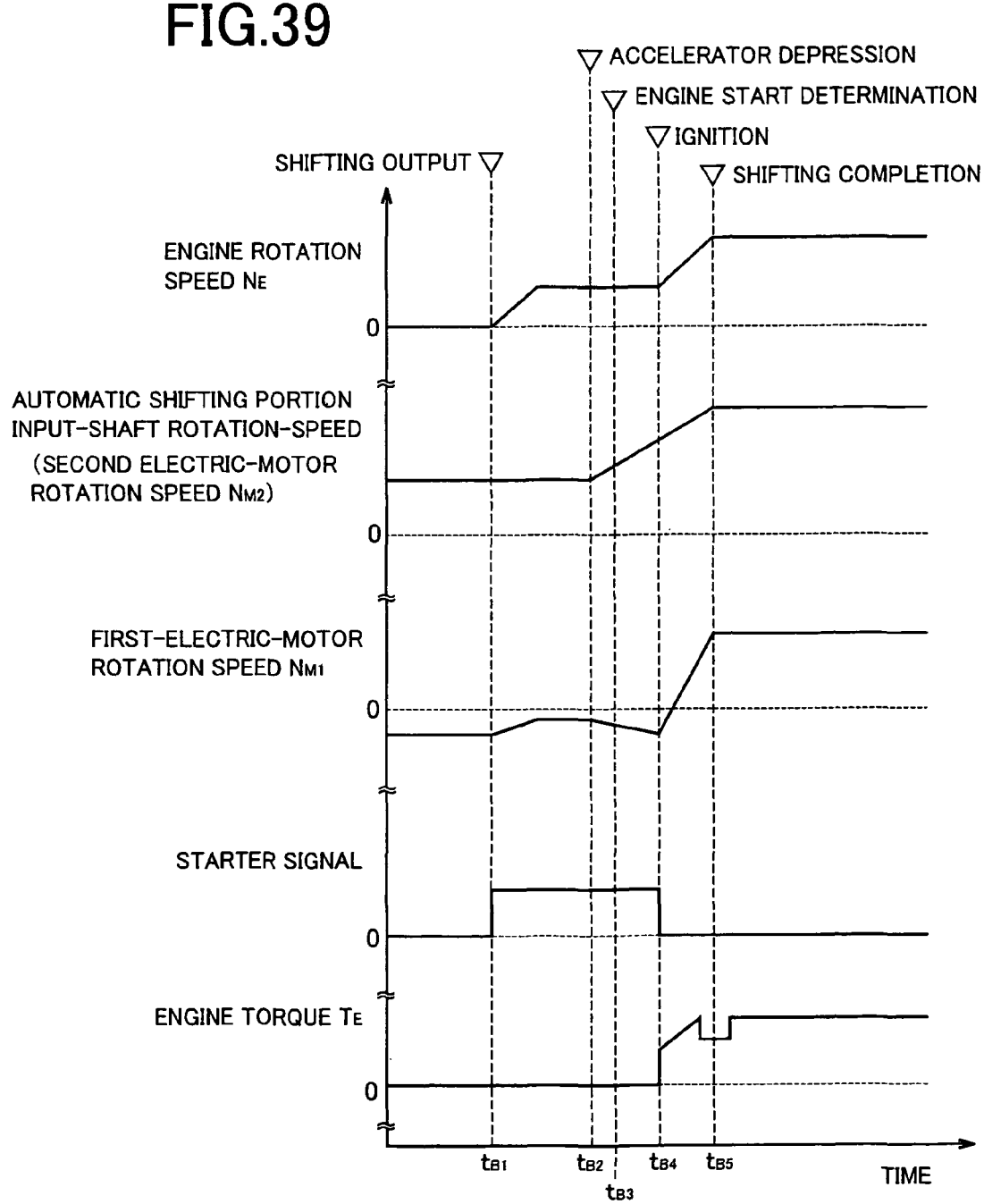
FIG. 39 is a time chart for explaining the control operation illustrated by the flow chart in FIG. 37, showing one example in which the gear position is shifted down from a 3rd-gear position to a 1st-gear position during motor running, and an engine start is not delayed.

FIG. 38 and FIG. 39 are time charts for explaining the control operation shown in the flow chart of FIG. 37. FIG. 38 and FIG. 39 illustrate, in order from above, the rotation speed $N_E$ of the engine, the rotation speed of the input shaft of the automatic shifting portion 20 which is also the rotation speed $N_{M2}$ of the second electric motor M2, the rotation speed $N_{M1}$ of the first electric motor M1, a starter signal to command operation of the third electric motor M3, and the engine torque $T_E$.

FIG. 38 shows one example in which the engine 8 is started during motor running, the shift position (operating position) $P_{SH}$ is in the D position, and the automatic shifting portion 20 is not under shifting. Since this is a time chart shown when the automatic shifting portion 20 is not under shifting, a negative determination is made in SA3 of FIG. 37, and a starter signal to command operation of the third electric motor M3 is not issued. Time or timing $t_{A1}$ shows that a requested output torque $T_{OUT}$ becomes great due to depression of the accelerator pedal, based on which the engine start command is issued. An increase in the requested output torque $T_{OUT}$ leads to an increase in the output of the second electric motor M2, so that the rotation speed $N_{M2}$ of the second electric motor M2 is increased from time $t_{A1}$. In accordance with this, the rotation speed $N_{M1}$ of the first electric motor M1 is decreased by the differential action of the power distribution mechanism 16.

Based on a determination to start the engine by the output of the engine start command, the first electric motor M1 is driven from time $t_{A2}$ to increase the rotation speed $N_E$. More specifically, the rotation speed $N_{M1}$ of the first electric motor M1 is increased as shown by arrow $AR_1$ in FIG. 40 by driving the first electric motor M1. As a result, using the differential action of the differential portion 211 (power distribution mechanism 16), the rotation speed $N_E$ of the engine 8 is increased so as to exceed the engine-start rotation speed $N_{EST}$ as shown in arrow $AR_2$. Since the automatic shifting portion 20 is not under shifting at this time, the power transmitting path extending from the second electric motor M2 to the drive wheels 34 is in the completely connected state.

Time $t_{A3}$ shows that the engine rotation speed $N_E$ exceeded the predetermined rotation speed at which the engine 8 can be started, and the engine 8 is started (ignited). With start of the engine 8, the engine torque $T_E$ begins to rise from time $t_{A3}$.

Time $t_{A4}$ shows due to an arrival of the engine torque $T_E$ to a torque corresponding to the operation of the accelerator pedal, the engine torque $T_E$ becomes constant to make the vehicle speed V constant. Due to the constant vehicle speed V, the engine rotation speed $N_E$, the input-shaft rotation speed of the automatic shifting portion 20, and the rotation speed $N_{M1}$ of the first electric motor M1 also become constant from time $t_{A4}$.

FIG. 39 shows one example in which during the motor running the shift position (operating position) $P_{SH}$ is in D position, the gear position is shifted down from the 3rd position to the 1st position, and start of the engine 8 is not delayed. Time $t_{B1}$ of FIG. 39 shows that the shifting is output, based on which an affirmative determination is made in SA3 of FIG. 37, so that the engine rotation speed increase control is executed from time $t_{B1}$ to time $t_{B4}$ that is the start time of the engine 8.

Figure 41:
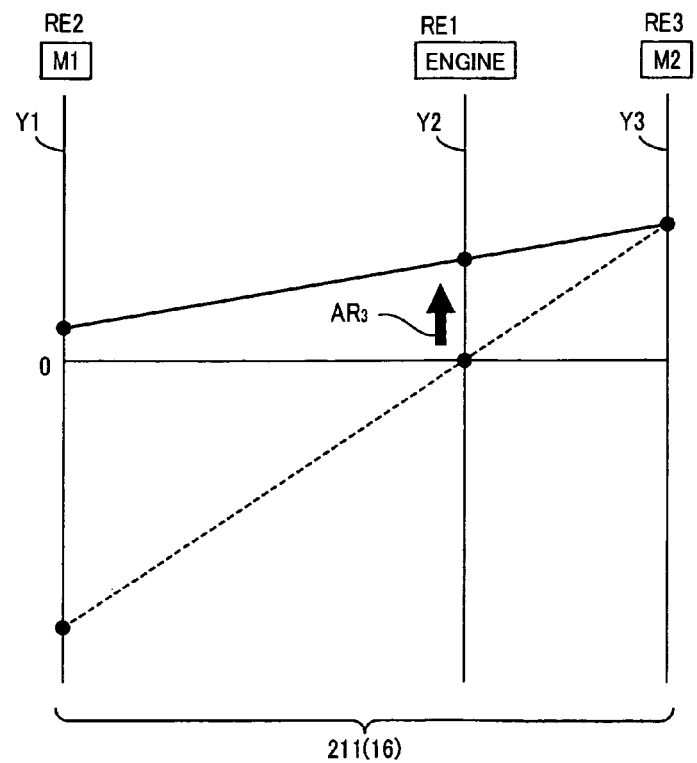
FIG. 41 is a collinear chart for explaining the relative speed of respective rotary elements of the differential portion when the rotation speed of the engine is increased by the third electric motor upon switching from motor running to engine running in the power transmitting apparatus of FIG. 30, which is the collinear chart obtained by extracting the three vertical lines Y1 to Y3 from FIG. 3.

More specifically, based on the starter signal output from time $t_{B1}$ to time $t_{B4}$ that is the time of the engine start, the third electric motor M3 is driven to directly increase the engine rotation speed $N_E$ to exceed the engine-start rotation speed $N_{EST}$ as shown by arrow $AR_3$ of FIG. 41. Therefore, an increase in the engine rotation speed $N_E$ during the period from time $t_{B1}$ to time $t_{B4}$ indicates that the engine 8 is being rotated by the third electric motor M3. A change or variation in the rotation speed $N_{M1}$ of the first electric motor M1 during the period from timing $t_{B1}$ to timing $t_{B5}$ indicates that the first electric motor M1 is idly rotated by the differential operation of the differential portion 211, in association with a change in the engine rotation speed $N_E$ and a change in the input-shaft rotation speed of the automatic shifting portion.

Because of the shifting start of the automatic shifting portion 20 by the shifting output, the input-shaft rotation speed of the automatic shifting portion (i.e., the rotation speed $N_{M2}$ of the second electric motor M2) is increased during the period from time $t_{B2}$ to time $t_{B5}$ indicating the end of the gear shifting of FIG. 39.

Timing $t_{B2}$ indicates that the requested output torque $T_{OUT}$ becomes great by depressing the accelerator pedal, and the engine start command is issued. Although the depression of the accelerator pedal and an increase start in the input-shaft rotation speed of the automatic transmission portion are simultaneously performed at time $t_{B2}$, they are not required to be simultaneously performed, and there being no time relation therebetween.

Time $t_{B3}$ indicates that, in SA6 of FIG. 37, whether the shifting completion time of the automatic shifting portion 20 overlaps with the start (ignition start) of the engine 8 is determined.

Time $t_{B2}$ of FIG. 39 indicating that the issued engine start command is not near time $t_{B5}$ indicating the shifting completion time, and there is enough time to start the engine prior to the gear shifting completion. Therefore, a negative determination is made in SA6 mentioned above, and the engine 8 is started (ignited) in SA9 of FIG. 37. As a result, start of the engine (start of ignition) is executed at time $t_{B4}$ prior to timing $t_{B5}$ indicating the shifting completion time, without delaying the engine start time. The engine torque $T_E$ rises from timing $t_{B4}$, and the engine rotation speed $N_E$ starts increasing therefrom. A time difference between the engine start and the shifting completion time exceeds the concurrence or overlapping determination value, so that a time difference between timing $t_{B4}$ and timing $t_{B5}$ of FIG. 39 exceeds the overlapping determination value.

The on-shifting-completion torque-down control that temporarily decreases the engine torque $T_E$ is performed at timing $t_{B5}$ indicating the shifting completion of the automatic shifting portion 20, so that a shifting shock caused upon the shifting completion is decreased.

The electronic control device 80 of this embodiment has the following effects (A1) to (A18).

(A1) If the transmitting capacity of the power transmitting path extending from the differential portion 211 to the drive wheel 34 is reduced, for example, during the shifting of the automatic shifting portion 20, the engine 8 is started by using the third electric motor M3 connected to the engine 8 without using the first planetary gear unit 24. Therefore, when the engine rotation speed increase control operation is performed, there is no need to control the operating state of the first electric motor M1 for controlling the differential state of the power distribution mechanism 16, so that this control can be easily performed.

If the third electric motor M3 is driven so that the engine rotation speed $N_E$ is directly increased as shown by arrow $AR_3$ of FIG. 41, the first electric motor M1 is kept in a no-load state. As a result, the rotation speed $N_{M2}$ of the second electric motor M2 that is the input-shaft rotation speed of the automatic shifting portion 20 is not decreased by the differential action of the power distribution mechanism 16.

(A2) When the automatic shifting portion 20 is under shifting, the engine 8 is started by using the third electric motor M3, so that the engine rotation speed increase control can be easily performed during the gear shifting.

(A3) Since the differential portion 211 serves as a continuously-variable transmission by controlling the operating state of the first electric motor M1, the driving torque output from the differential portion 211 can be smoothly changed. Besides the fact that the differential portion 211 is allowed to serve as an electric continuously-variable transmission by continuously changing the transmission gear ratio, the differential portion 211 is allowed to serve as a step-variable transmission by changing the transmission gear ratio step by step.

(A4) The third electric motor M3 may be operatively connected to the crankshaft of the engine 8 through a belt. In this case, the crankshaft is rotated and driven by the third electric motor M3 when the engine rotation speed increase control is performed. Therefore, there is no need to control the operating state of the first electric motor M1 for controlling the differential state of the power distribution mechanism 16, so that the engine rotation speed increase control can be easily performed.

(A5) Since the third electric motor M3 is operatively connected to the crankshaft of the engine 8 through a gear, the crankshaft is rotated and driven by the third electric motor M3 when the engine rotation speed increase control is performed. Therefore, there is no need to control the operating state of the first electric motor M1 for controlling the differential state of the power distribution mechanism 16, so that the engine rotation speed increase control can be easily performed.

(A6) If the transmitting capacity of the power transmitting path extending from the differential portion 211 to the drive wheels 34 is not decreased, for example, upon non-shifting of the automatic shifting portion 20, the engine 8 is started by using the first electric motor M1. Therefore, power consumption upon performing the engine rotation speed increase control can be restricted by using the torque transmitted from the drive wheels 34 and the differential action of the power distribution mechanism 16.

Figure 40:
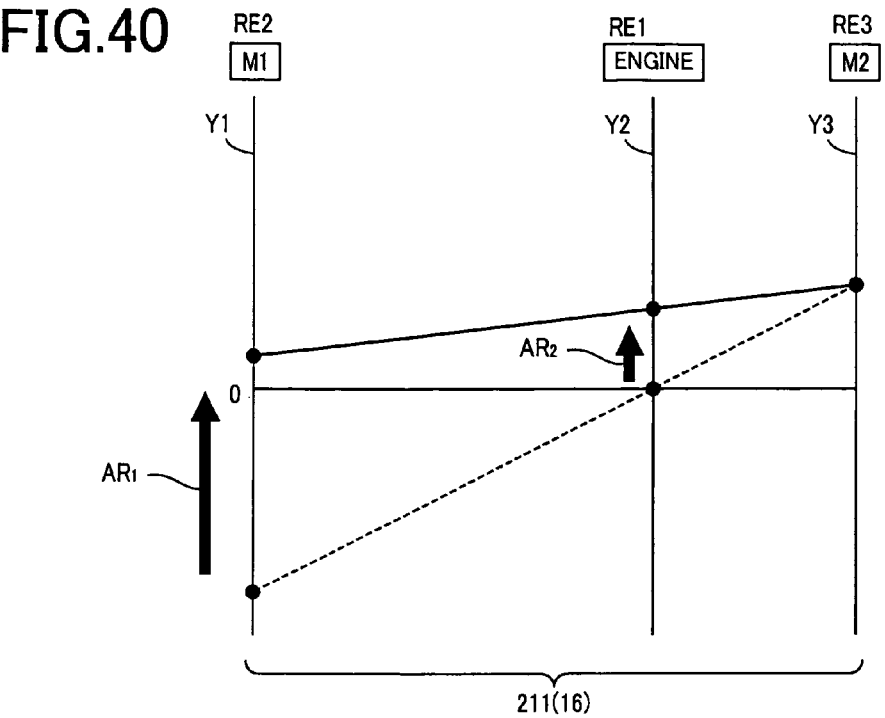
FIG. 40 is a collinear chart for explaining the relative speed of respective rotary elements of the differential portion when the rotation speed of the engine is increased by the first electric motor upon switching from motor running to engine running in the power transmitting apparatus of FIG. 30, which is the collinear chart obtained by extracting the three vertical lines Y1 to Y3 from FIG. 3.

As shown in FIG. 40, when the engine rotation speed $N_E$ is increased by the first electric motor M1, the rotational resistance of the engine 8 acts in a direction to decrease the rotation speed $N_{M2}$ of the second electric motor M2 (third rotary element RE3), i.e., the input-shaft rotation speed of the automatic transmission portion is decreased. However, if the transmitting capacity thereof is not decreased because of the power transmitting path extending from the second electric motor M2 to the drive wheels 34 being in a completely connected state, a reaction torque that is appropriately great with respect to the rotational resistance of the engine 8 is applied to the third rotary element RE3 by the drive wheels 34. Therefore, there is no fear that the input-shaft rotation speed of the automatic shifting portion 20 will be reduced.

(A7) Even if a request to start the engine is not output, the engine rotation speed $N_E$ is increased when the automatic shifting portion 20 is under shifting during the motor running. Therefore, the engine can be more swiftly started upon a request to start the engine than in a case when the engine rotation speed $N_E$ is increased after a request to start the engine is made. Additionally, there occurs a case in which the engine can be started prior to the shifting completion of the automatic shifting portion 20, because of the earlier engine, a vehicle driver almost does not feel a delay in the rise of the driving torque.

(A8) Based on the progression degree of the shifting of the automatic shifting portion 20, whether the shifting completion time of the automatic shifting portion 20 and the start (ignition start) of the engine 8 overlap with each other is determined, based on which whether to start the engine 8 is determined. Therefore, the engine 8 can be started so that a shifting shock caused upon the shifting completion of the automatic shifting portion 20 does not overlap with a shock caused when the engine 8 is started.

(A9) The engine 8 is started so that the shifting completion of the automatic shifting portion 20 and the start time of the engine 8 do not overlap with each other. Therefore, a shifting shock caused upon the shifting completion of the automatic shifting portion 20 and a shock caused upon start of the engine 8 do not occur concurrently with each other, so that the vehicle occupants do not feel these shocks as a great one.

(A10) If an affirmative determination is made of the overlapping between the shifting completion of the automatic shifting portion 20 and the start (ignition start) of the engine 8, the engine 8 is started up after the shifting completion of the automatic shifting portion 20. Therefore, a shifting shock caused upon the shifting completion of the automatic shifting portion 20 and a shock caused upon start of the engine 8 do not occur in the overlapping manner with each other, so that the vehicle occupants do not feel these shocks as a great one.

(A11) If a negative determination is made of the overlapping between the shifting completion of the automatic shifting portion 20 and the start (ignition start) of the engine 8, the engine 8 is started up during the shifting of the automatic shifting portion 20. Therefore, a shifting shock caused upon the shifting completion of the automatic shifting portion 20 and a shock caused upon startup of the engine 8 do not occur concurrently with each other, so that the vehicle occupants do not feel these shocks as a great one. Therefore, in this case, the engine torque $T_E$ can be risen earlier than in a case in which the engine is started up after the gear shifting completion, so that a response to, for example, the accelerator operation by a vehicle driver can be increased.

During the shifting of the automatic shifting portion 20, the engaging action of the clutch C or the brake B on the engagement side and the releasing action of the clutch C or the brake B on the release side are performed simultaneously, and the power transmitting path in the automatic shifting portion 20 is set in a cut-off state or an almost completely cut-off state. Therefore, starting the engine 8 during this time period can raise the engine torque $T_E$ early, so that a shock caused upon startup of the engine 8 is hardly transmitted to the drive wheel 34 and is decreased.

(A12) The transmission mechanism 10 includes the second electric motor M2 connected to the power-transmitting path extending from the engine 8 to the drive wheels 34. Therefore, a driving torque can be generated not only by the engine 8 but also by the second electric motor M2, and a response to for example the accelerator operation of a vehicle driver can be heightened or increased. Additionally, since the vehicle can run by the power transmitted from the second electric motor M2 with stopping the engine 8, fuel efficiency can be improved.

(A13) Since the transmission mechanism 210 includes the second electric motor M2 connected to the power distribution mechanism 16 of the differential portion 211, it can output sum of the output torque from the second electric motor M2 and the output torque from the differential portion 11 to the drive wheels 34. Thus, a response to, for example, the accelerator operation by a vehicle driver can be heightened.

(A14) When the engine started up is performed before the shifting completion, and the shifting is the downshifting, the shifting completion torque-down control is performed, so that a shifting shock caused upon the shifting completion can be reduced.

(A15) When the engine start time is delayed, the torque assistance is executed, and a delay in the rise of the engine torque $T_E$ caused by this delay is attended. Therefore, the disadvantage that a vehicle occupant is caused to feel a delay in the rise of the engine torque $T_E$ does not occur.

(A16) The transmission mechanism 210 includes the automatic shifting portion 20 that forms the part of the power transmitting path extending from the differential portion 211 to the drive wheels 34, and the clutches C1 and C2 and brakes B1, B2 and B3, which are the power transmitting/interrupting means, form the part of the automatic shifting portion 20. Therefore, the variation width of the entire transmission gear ratio γT of the transmission mechanism 210 can be increased by shifting the automatic shifting portion 20.

(A17) The engine 8 is started up so that its startup timing does not overlap with the engagement end of the clutches C1 and C2, and the brakes B1, B2 and B3, which is the shifting completion of the automatic shifting portion 20. Therefore, the engagement shock caused upon the engagement end between the clutches C1 and C2, and the brakes B1, B2 and B3 and the start shock caused upon the startup of the engine 8 do not occur concurrently with each other, so that the vehicle occupant does not feel these shocks as a great one.

(A18) If engagement completion of the clutches C1 and C2, and the brakes B1, B2 and B3, which is the shifting completion of the automatic shifting portion 20, overlaps with the start timing of the engine 8, the engine 8 is started up after the engagement completion of the clutches C1 and C2, and the brakes B1, B2 and B3. Therefore, the engagement shock caused upon the engagement end between the clutches C1 and C2, and the brakes B1, B2 and B3 and the start shock caused upon the startup of the engine 8 do not occur concurrently with each other, so that the vehicle occupant does not feel these shocks as a great one.

Embodiment 10

In this embodiment, the electronic control device 80 performs another control in a shifting mechanism 210 shown in FIG. 30. In the functional block diagram of FIG. 33, the rotation-speed increase controlling means 282 of this embodiment has function different from that of the a rotation-speed increase controlling means 282 in the first embodiment. Remaining means in the first embodiment such as the vehicle state determining means 280, The concurrent-execution determining means 284, the concurrent-execution limiting means 286, the torque-assist controlling means 288, and the torque-down controlling means 290 of the first embodiment are the same as those of this embodiment. Hereinafter, differences therebetween will be chiefly described.

In FIG. 33, when the shifting output is output based on the affirmative determination by the vehicle state determining means 280, upon output of the engine start command, the rotation-speed increase controlling means 282 executes the engine rotation speed increase control operation. In this case, since the automatic shifting portion 20 is under shifting, the rotation-speed increase controlling means 282 drives the third electric motor M3 with supplying of the drive current to increase the engine rotation speed $N_E$. The engine-start rotation speed $N_{EST}$ is pre-stored in the rotation-speed increase controlling means 282.

FIG. 42 is a flow chart explaining the major part of control operations of the electronic control device 80, i.e., a control operation performed to avoid the overlapping between the shifting completion timing and the startup of the engine 8. In FIG. 42 showing another embodiment corresponding to FIG. 37, the execution order of SA4 and SA5 shown in FIG. 37 is reversed. Accordingly, SB1 to SB3, SB4, SB5, and SB6 to SB10 of FIG. 42 correspond to SA1 to SA3, SA5, SA4, and SA6 to SA10 of FIG. 37, respectively. Thus, based on affirmative determination of the output of engine start command in SB4, the third electric motor M3 is driven in SB5 to execute the engine rotation speed increase control. FIG. 42 differs from FIG. 37 in this respect.

FIG. 43 is a time chart for explaining the control operation shown in the flow chart of FIG. 42. In FIG. 43 showing another embodiment corresponding to FIG. 39, timings $t_{C2}$, $t_{C4}$, and $t_{C5}$ thereof correspond to timings $t_{B2}$, $t_{B4}$, and $t_{B5}$ of FIG. 39, respectively. Hereinafter, differences between FIG. 43 and FIG. 39 will be chiefly described.

FIG. 43 shows an example in which the shift position (operating position) $P_{SH}$ is placed in D position during motor running, the gear position is shifted down from the 3rd shift position to the 1st shift position, and the engine start delay is not performed. At timing $t_{C1}$, the start signal is not output irrespective of this shifting output, which differs from timing $t_{B1}$ of FIG. 39.

The engine start command is issued by depressing the accelerator pedal at timing $t_{C2}$ and an affirmative determination is made in SB4 of FIG. 42. Timing $t_{C3}$ indicates that the starter signal is output, and the engine rotation speed increase control is started. Since this engine rotation speed increase control is continuously performed until timing $t_{C4}$ which is the timing of the engine start, the starter signal is continuously output until timing $t_{C4}$. The third electric motor M3 is driven by the output of the starter signal, and increase the engine rotation speed $N_E$ from timing $t_{C3}$ to timing $t_{C4}$ which is the engine start timing. The rotation speed $N_{M1}$ of the first electric motor M1 changes during the period from timing $t_{C2}$ to timing $t_{C5}$, which indicates that the first electric motor M1 is idly rotated by the differential action of the differential portion 211 in association with changes in both the engine rotation speed $N_E$ and in the input-shaft rotation speed of the automatic shifting portion.

At timing $t_{C3}$, whether the shifting completion timing of the automatic shifting portion 20 overlaps with the startup (ignition start) of the engine 8 is determined in SB6 of FIG. 42. Although the engine rotation speed increase control is also started at timing $t_{C3}$, which is not required to synchronize with the determination of SB6.

According to this embodiment, the same effects as the effects (A1) to (A6) and the effects (A8) to (A18) of the first embodiment can be rendered.

While the various embodiments of the present invention has been described above in detail with reference to the drawings, the present invention may also be implemented in other modes.

For instance, the above mentioned embodiments can be implemented by combining in parallel to each other with giving order of priority. In the embodiments mentioned above, the start modes of the engine 8 are switched depending on the rotation speed, torque and power of the first electric motor M1 and the rotation speed, torque and power of the second electric motor M2. However, the start mode of the engine 8 can be switched depending on only one of the first and second electric motors M1 and M2. In addition, any of the rotation speed, torque and power may be determined, instead for the determination of all of them.

In the embodiments mentioned above, the engine 8 is started up by the third electric motor M3 with the shifting position placed in the 1st-speed to the 3rd-speed gear positions, and the engine 8 is started up by the first and second electric motors M1 and M2 with the shifting position placed in the 4th-speed gear position. Such switchover controls represent one example of the embodiments and may be suitably altered depending on the gear ratios achieved in the shifting portion.

In the embodiments mentioned above, the start modes of the engine 8 are switched depending on the temperature of the battery 57. However, for instance, temperatures of the first and second electric motors M1 and M2 may be detected to allow the start modes of the engine 8 to be switched depending on the detected temperatures. In addition, a determination on a temperature of the low-voltage system battery 59 may be added.

In the embodiments mentioned above, further, the concrete numerical values such as the temperatures and the outputs, used as criteria for determining the starting up the engine 8 represent examples, and it may be suitably altered depending on characteristics of the battery and the electric motors.

In this embodiment mentioned above, although the differential portion 110 have the gear ratio alternatively altered with the third and fourth clutches C3 and C4, the gear ratio of the differential portion 110 is altered by another structure. In addition, although the differential portion 110 has been described above with reference to the structure of the type altered to the two gear ratios, it may take the form of a structure of a type altered in three gear ratios.

In the embodiments described above, the differential portion 110 is of the type that functions as the electrically controlled continuously variable transmission with the gear ratio □0 made continuously variable from the minimum value □0min to the maximum value □0max. However, the present invention may be applied to a case in which, for instance, the gear ratio □0 of the differential portion 11 is not continuously varied but is pretended to vary step-by-step upon utilizing a differential action.

In the embodiments mentioned above, furthermore, the differential device 11 may be of the type including a differential action limiting device provided in the power distributing mechanism 16 with the differential action being limited to allow the differential device 11 to act as a step-variable transmission of a forward-drive two-stage type.

In the power distributing mechanism 16 of the embodiments set forth above, moreover, the first carrier CA1 is connected to the engine 8, the first sun gear S1 is connected to the first electric motor M1 and the first ring gear R1 is connected to the power transmitting member 18. However, the present invention is not necessarily limited to such connecting relationships and the engine 8, the first sun gear S1 and the power transmitting member 18 may be connected to either one of the three elements CA1, S1 and R1 of the first planetary gear set 24.

In the embodiments set forth above, further, although the engine 8 is directly connected to the input shaft 14, it may suffice for the engine 8 to be operatively connected to the input shaft 14 by means of, for instance, gears and belts or the like. No need arises for the engine 8 and the input shaft 14 to be axially aligned on a common axis.

With the embodiments set forth above, furthermore, the first and second electric motors M1 and M2 are connected to the input shaft 14 in coaxial relationship with the first electric motor M1 being connected to the first sun gear S1 and the second electric motor M2 being connected to the power transmitting member 18. However, these component parts may have no need to be placed in such connecting relationships, and the first electric motor M1 may be operatively connected to the first sun gear S1 via, for instance, gears, a belt and a reduction gear unit or the like while the second electric motor M2 may be connected to the power transmitting member 18.

With the embodiments set forth above, moreover, the hydraulic type friction engaging devices such as the first and second clutches C1 and C2 may be comprised of magnetic powder type clutches, such as powder (magnetic powder) clutches, electromagnetic clutches and dog-clutches of a meshing type, and mechanical type engaging devices. However, under a circumstance where, for instance, the electromagnetic clutch is employed, the hydraulic control circuit 70 may not include the valve device for the hydraulic passageways to be switched but may include a switching device and electromagnetic switching devices for switching a command signaling circuit.

In the embodiments set forth above, although the automatic shifting portion 20 is connected to the differential device 11 in series via the power transmitting member 18, a countershaft may be disposed in parallel to the input shaft 14 to allow the automatic shifting portion 20 to be placed in coaxial relationship to the countershaft. In this case, the differential portion 11 and the automatic shifting portion 20 may be connected to each other in power transmissive state via for instance the power transmitting member 18 such as a pair of power transmitting members comprised of a counter gear pair and a sprocket and chain.

Further, the power distributing mechanism 16, acting as the differential mechanism of the embodiments set forth above, may include a pinion, drivably rotated with for instance the engine, and a differential gear unit including a pair of bevel gears, meshing with the pinion, which are operatively connected to the first electric motor M1 and the power transmitting member 18 (second electric motor M2).

Further, although the power distributing mechanism 16 of the embodiments mentioned above is comprised of one set of planetary gear sets, the power distributing mechanism 16 may be comprised of more than two sets of planetary gear sets acting as a transmission of the type providing more than three gear positions under a non-differential state (fixed shifting state). Furthermore, the planetary gear sets are not limited to that of the single pinion type and may include a planetary gear set of a double-pinion type. Moreover, even with a structure comprised of such more than two planetary gear sets, the planetary gear sets may have rotary elements to which the engine 8, the first and second electric motors M1 and M2 and the power transmitting mechanism 18 are connected in power transmissive state. In addition, these planetary gear sets may take the form of a structure wherein controlling the clutch C and the brake B connected to the respective rotary elements of the planetary gear sets allows a step-variable shifting state and a continuously variable shifting state to be switched.

Further, although the embodiments mentioned above employ the engine 8 and the differential portion 11 that are directly connected to each other, these component parts may have no need to be directly connected to each other and may be connected to each other via a clutch.

Furthermore, although the embodiments mentioned above take the structure in which the differential portion 11 and the automatic shifting portion 20 are directly connected to each other, the present invention is not limited to such a particular structure. That is, the present invention can be applied to a case in which a whole of the shifting mechanism 10 has a function to perform an electrically controlled differential action and another function to perform a shifting on a principle different from the electrically controlled differential action. Thus, the differential portion 11 and the automatic shifting portion 20 may have no need to be mechanically independent from each other.

Moreover, such a layout position and a layout sequence of these component parts may not be limited and may be freely designed in arrangements. In addition, the present invention may be applied a case in which even if the structures of the shifting mechanism partly overlap each other or a whole of the structures are common to each other provided that the shifting mechanism has the function to perform the electrically controlled differential action and another function to perform the shifting.

Further, although the embodiments mentioned above include the automatic shifting portion 20 to which the step-variable transmission is applied to enable the shifting to be effectuated in the four gear positions, the gearshift positions of the automatic shifting portion 20 may not be limited to the four gear positions and may be freely modified in structure to provide, for instance, five gear positions. In addition, the connecting relationship of the automatic shifting portion 20 may not be limited to the structures of the embodiments described above and may be freely altered in design.

Further, in the embodiments shown in FIGS. 37 and 42, if the engine 8 is started when the automatic shifting portion 20 is not under shifting, the first electric motor M1 is allowed to function as a starter, and the engine rotation speed $N_E$ is increased to start the engine 8. However, if the third rotary element RE3 reaches a speed exceeding a predetermined rotation speed at which the engine can be started, the switching clutch C0 or the switching brake B0 may be engaged without driving the first electric motor M1.

As a result, the engine rotation speed $N_E$ can be increased by using the rotation from the drive wheel 34 without driving the first electric motor M1, and the power consumption of the first electric motor M1 can be restricted. If the brake B0 is engaged, the rotation speed of the third rotary element RE3 is decreased to be transmitted to engine 8, so that the durability of the power distribution mechanism 16 can be improved. The predetermined rotation speed for staring the engine may have a difference value between a case in which the switching clutch C0 is engaged or a case in which the switching brake B0 is engaged, and it may be set at a higher value in a case in which the switching brake B0 is engaged than in a case in which the switching clutch C0 is engaged.

In the embodiments shown in FIGS. 37 and 42, upon starting the engine 8 when the automatic shifting portion 20 is under shifting, the engine rotation speed $N_E$ is increased by the third electric motor M3, whereas the engine rotation speed $N_E$ is increased by the first electric motor M1 when the automatic shifting portion 20 is not under shifting. However, regardless of the fact that the automatic shifting portion 20 is under shifting or is not under shifting, a case in which the power transmitting path in the automatic shifting portion 20 is brought into a geared-neutral state is also included in a case in which the transmitting capacity of the power transmitting path extending from the differential portion 211 to the drive wheel 34 is reduced, to which the present invention is applied. The term "geared-neutral state" denotes a state in which a rotary element of the planetary gear unit is freely rotatable, and power is not transmitted. The geared-neutral state mentioned above shows that, in the transmission mechanism 10 in which the first clutch C1 and the third brake B3 are engaged, for example, from the engagement operation table of FIG. 31, the third brake B3 is released for some reason in the first gear position, and the power transmitting path in the automatic shifting portion 20 is cut off.

In the embodiments shown in FIGS. 37 and 42, the concurrent-execution limiting means 286 can confirm the shifting completion of the automatic shifting portion 20 in the following ways. That is, the shifting completion may be confirmed by obtaining information about the shifting completion from the step-variable shifting control means 82, or may be confirmed based on a signal output from for example an oil pressure sensor provided in the automatic shifting portion 20.

In the first embodiment shown in FIGS. 37 and 42, the rotation-speed increase controlling means 282 confirms the shifting output based on information emitted from the step-variable shifting control means 82. However, the rotation-speed increase controlling means 282 may confirm the shifting output based on a signal output from for example the oil pressure sensor provided in the automatic shifting portion 20.

In the embodiments shown in FIGS. 37 and 42, time period taken until the engine start depends on the kind of fuel used for the engine 8, based on which the concurrent-execution determining means 284 may determine whether the shifting completion time of the automatic shifting portion 20 overlaps with the startup of the engine 8.

In the embodiments shown in FIGS. 37 and 42, when the running mode is switched from motor running to engine running, the engine rotation speed $N_E$ is increased to start up the engine. However, the engine rotation speed $N_E$ may be collaterally increased, for example, by performing another control without intention to start the engine.

In the embodiments shown in FIGS. 37 and 42, the rotation-speed increase controlling means 282 raise the engine rotation speed $N_E$ to be more than the engine-start rotation speed $N_{EST}$. However, even if the engine rotation speed $N_E$ is raised only to for example a rotation speed smaller than the lower limit thereof at which the engine 8 can be started, the engine can be more swiftly started than when the engine rotation speed $N_E$ is not at all raised during the shifting of the automatic shifting portion 20. Therefore, the present invention can also be applied to this case.

In the transmission mechanism 210 of the embodiments shown in FIGS. 37 and 42, the first electric motor M1 and the second rotary element RE2 are connected directly to each other, and the second electric motor M2 and the third rotary element RE3 are connected directly to each other. However, the first electric motor M1 may be connected to the second rotary element RE2 by an engagement element such as a clutch, and the second electric motor M2 may be connected to the third rotary element RE3 with an engagement element such as a clutch.

According to the embodiments shown in FIGS. 37 and 42, in the power transmitting path extending from the engine 8 to the drive wheels 34, the automatic shifting portion 20 is connected subsequent to the differential portion 211. However, the order may be altered so that the differential portion 211 is connected subsequent to the automatic shifting portion 20.

While the differential portion 11 and the automatic shifting portion 20 are connected to each other in series in the structure shown FIG. 30, the present invention can be applied to a structure even if the differential portion 11 and the automatic shifting portion 20 are mechanically independent from each other, provided that a whole of the shifting mechanism 210 has a function to achieve an electrically controlled differential action enabling a differential state to be electrically varied and a function to perform a shifting on a principle different from the function of the electrically controlled differential action.

In the embodiments shown in FIGS. 37 and 42, the engine 8 is connected to the first rotary element RE1 of the first planetary gear unit 24 in drive-force transmissive state, the first electric motor M2 is connected to the second rotary element RE2 in drive-force transmissive state, and the power transmitting path for the drive wheels 34 is connected to the third rotary element RE3. However, the present invention may be applied to such the structure including, for instance, two planetary gear units wherein partial rotary elements forming such planetary gear units are connected to each other. With such the structure, the engine, the electric motor and drive wheels are connected to the rotary elements of the planetary gear units in drive-force transmissive state such that the clutch or the brake, connected to the rotary elements of the planetary gear units, can be controlled to switch the shifting mode between the step-variable shifting mode and the continuously variable shifting mode.

In the embodiments shown in FIGS. 37 and 42, although the automatic shifting portion 20 is a transmission portion that functions as a step-variable automatic transmission, it may be a continuously variable transmission (CVT), or may be a transmission portion that functions as a manual transmission.

In the embodiments shown in FIGS. 37 and 42, the second electric motor M2 is connected directly to the transmitting member 18. However, the second electric motor M2 may be connected directly to the power transmitting path extending from the differential portion 211 to the drive wheels 34, or may be connected indirectly thereto with intervention of a transmission gear or the like.

In the embodiments shown in FIGS. 37 and 42, further, the second electric motor M2 is connected to the power transmitting member 18 forming part of the power transmitting path between the engine 8 and the drive wheels 38. Instead for such a structure, the shifting mechanism 10 may have a structure wherein the second electric motor M2 is connected to the power transmitting member 18 and can be connected to the power distributing mechanism 16 via the engaging element such as the clutch or the like, to control a differential state of the power distributing mechanism 16 by the second electric motor M2 in place of the first electric motor M1.

Further, the embodiments described above are considered only as illustrative of the present invention and the present invention can be embodied in modes with various modifications and improvements based on knowledge of those skilled in the art.

The invention claimed is:

1. A control device for a vehicular power transmitting apparatus having an electrically controlled differential portion in which controlling an operating state of a first electric motor connected to rotary element of a differential mechanism controls a differential state between a rotation speed of an input shaft connected to a drive force source and a rotation speed of an output shaft, the control device for the vehicular power transmitting apparatus comprising:
   a drive-force source driving electric motor that is connected to the drive force source in a power transmissive state; and
   a drive-force source start control portion that switches start modes of the drive force source depending on a vehicle condition,
   wherein the drive-force source start control portion is operative to switch the start modes of the drive force source depending on a variation amount in a rotation speed of a first electric motor based on a change of gear ratios of the differential mechanism during a start control of the drive-force source.

2. A control device for a vehicular power transmitting apparatus having an electrically controlled differential portion in which controlling an operating state of a first electric motor connected to rotary element of a differential mechanism controls a differential state between a rotation speed of an input shaft connected to a drive force source and a rotation speed of an output shaft, the control device for the vehicular power transmitting apparatus comprising:
   a drive-force source driving electric motor that is connected to the drive force source in a power transmissive state; and
   a drive-force source start control portion that switches start modes of the drive force source depending on a vehicle condition
   wherein the vehicular power transmitting apparatus includes a power transmitting/interrupting portion that connects/interrupts a power transmitting path extending from the electrically-controlled differential portion to drive wheels, and the drive-force source start control portion starts the drive force source by using the drive-force source driving electric motor when a transmitting capacity in the power transmitting path extending from the electrically-controlled differential portion to the drive wheels is decreased.

3. The control device for the vehicular power transmitting apparatus according to claim 2, wherein the power transmitting apparatus includes a shifting portion that forms a portion of the vehicular power transmitting path, a part of which is formed by the power transmitting/interrupting portion.

4. The control device for the vehicular power transmitting apparatus according to claim 3, wherein decrease of the transmitting capacity in the power transmitting path extending from the electrically-controlled differential portion to the drive wheel occurs when the shifting portion is under shifting.

5. The control device for the vehicular power transmitting apparatus according to claim 2, wherein the electrically-controlled differential portion operates as a continuously-variable transmission by being controlled an operating state of the first electric motor.

6. The control device for the vehicular power transmitting apparatus according to claim 2, wherein a third electric motor is operatively connected to a crankshaft provided in the drive force source.

7. The control device for the vehicular power transmitting apparatus according to claim 6, wherein the third electric motor is connected to the crankshaft provided in the drive force source via a gear.

8. The control device for the vehicular power transmitting apparatus according to claim 2, wherein when the transmitting capacity in the power transmitting path extending from the electrically-controlled differential portion to the drive wheels is not decreased, the drive force source is started by using the first electric motor.

9. The control device for the vehicular power transmitting apparatus according to claim 3, wherein when the shifting portion is under shifting a rotation speed of the drive force source is increased.

10. The control device for the vehicular power transmitting apparatus according to claim 3, wherein the start of the drive force source is determined based on a shifting progression degree in the shifting portion.

11. The control device for the vehicular power transmitting apparatus according to claim 10, wherein the drive force source is started so that a shifting completion of the shifting portion and a start timing of the drive force source are not overlapped.

12. The control device for the vehicular power transmitting apparatus according to claim 11, wherein when the shifting completion of the shifting portion and the start timing of the drive force source are overlapped, the drive force source is started after the shifting completion of the shifting portion.

13. The control device for the vehicular power transmitting apparatus according to claim 10, wherein the drive force source is started when the shifting portion is under shifting.

14. The control device for the vehicular power transmitting apparatus according to claim 2, wherein the drive force source is started so that an engagement completion of the power transmitting/interrupting portion and the start timing of the drive force source are not overlapped.

15. The control device for the vehicular power transmitting apparatus according to claim 14, wherein when the engagement completion of the power transmitting/interrupting portion and the start timing of the drive force source are overlapped, the drive force source is started after the engagement completion of the power transmitting/interrupting portion.

16. The control device for the vehicular power transmitting apparatus according to claim 2, wherein the vehicular power transmitting apparatus includes a second electric motor connected to the power transmitting path extending from the drive force source to the drive wheels.

17. The control device for the vehicular power transmitting according to claim 2, wherein the vehicular power transmitting apparatus includes a second electric motor connected to the electrically-controlled differential portion in a power transmissive state.

18. The control device for the vehicular power transmitting apparatus according to claim 1, wherein the drive-force source start control portion is operative to switch the start modes of the drive force source depending on a temperature of a battery for supplying electric power to the first and second electric motors.

19. The control device for the vehicular power transmitting apparatus according to claim 1, wherein the drive-force source start control portion is operative to switch the start modes of the drive force source depending on a power output of a battery for supplying electric power to the first and second electric motors.

20. The control device for the vehicular power transmitting apparatus according to claim 1, wherein the drive-force source start control portion is operative to switch the start modes of the drive force source depending on functional degradation in an electric motor control equipment of a high-voltage system.

* * * * *